(12) United States Patent
Grubsky et al.

(10) Patent No.: US 8,705,694 B2
(45) Date of Patent: Apr. 22, 2014

(54) X-RAY IMAGING SYSTEM AND METHOD

(75) Inventors: Victor Grubsky, Chatsworth, CA (US);
Tomasz Jannson, Torrance, CA (US);
Edward Matthew Patton, Torrance, CA
(US); Volodymyr Romanoov, Torrance,
CA (US); Gennady Medvedkin,
Torrance, CA (US); Paul Shnitser,
Irvine, CA (US); Keith Shoemaker,
Harbor City, CA (US)

(73) Assignee: Physical Optics Corporation, Torrance, CA (US)

( * ) Notice: Subject to any disclaimer, the term of this patent is extended or adjusted under 35 U.S.C. 154(b) by 247 days.

(21) Appl. No.: 12/624,332

(22) Filed: Nov. 23, 2009

(65) Prior Publication Data

US 2011/0122994 A1    May 26, 2011

Related U.S. Application Data

(60) Provisional application No. 61/275,713, filed on Nov. 11, 2009.

(51) Int. Cl.
*G01N 23/04* (2006.01)
(52) U.S. Cl.
USPC ............................................. 378/62; 378/147

(58) Field of Classification Search
USPC .......................... 378/62, 84, 85, 87, 145, 147
See application file for complete search history.

(56) References Cited

U.S. PATENT DOCUMENTS

| | | | |
|---|---|---|---|
| 7,116,405 B2 * | 10/2006 | Johnson | 355/67 |
| 7,555,099 B2 | 6/2009 | Rothschild et al. | |
| 8,004,762 B2 * | 8/2011 | Cathey et al. | 359/558 |
| 2002/0041653 A1 * | 4/2002 | Wilkins et al. | 378/98.9 |
| 2007/0127041 A1 * | 6/2007 | Dowski | 356/637 |
| 2008/0084967 A1 * | 4/2008 | Matsuo et al. | 378/149 |

OTHER PUBLICATIONS

International Search Report and the Written Opinion for International App. No. PCT/US2010/046377, maling date, May 25, 2011.

* cited by examiner

*Primary Examiner* — Hoon Song
(74) *Attorney, Agent, or Firm* — Sheppard Mullin Richter & Hampton LLP

(57) ABSTRACT

The present invention provides systems and methods for x-ray imaging. In some embodiments, an aperture, or a plurality thereof, are configured to have image transfer functions lacking a zero within a usable spatial frequency range. In further embodiments, the image transfer function is determined according to the shape of the aperture and the usable spatial frequency range is determined according to a usable signal to noise ratio.

18 Claims, 60 Drawing Sheets

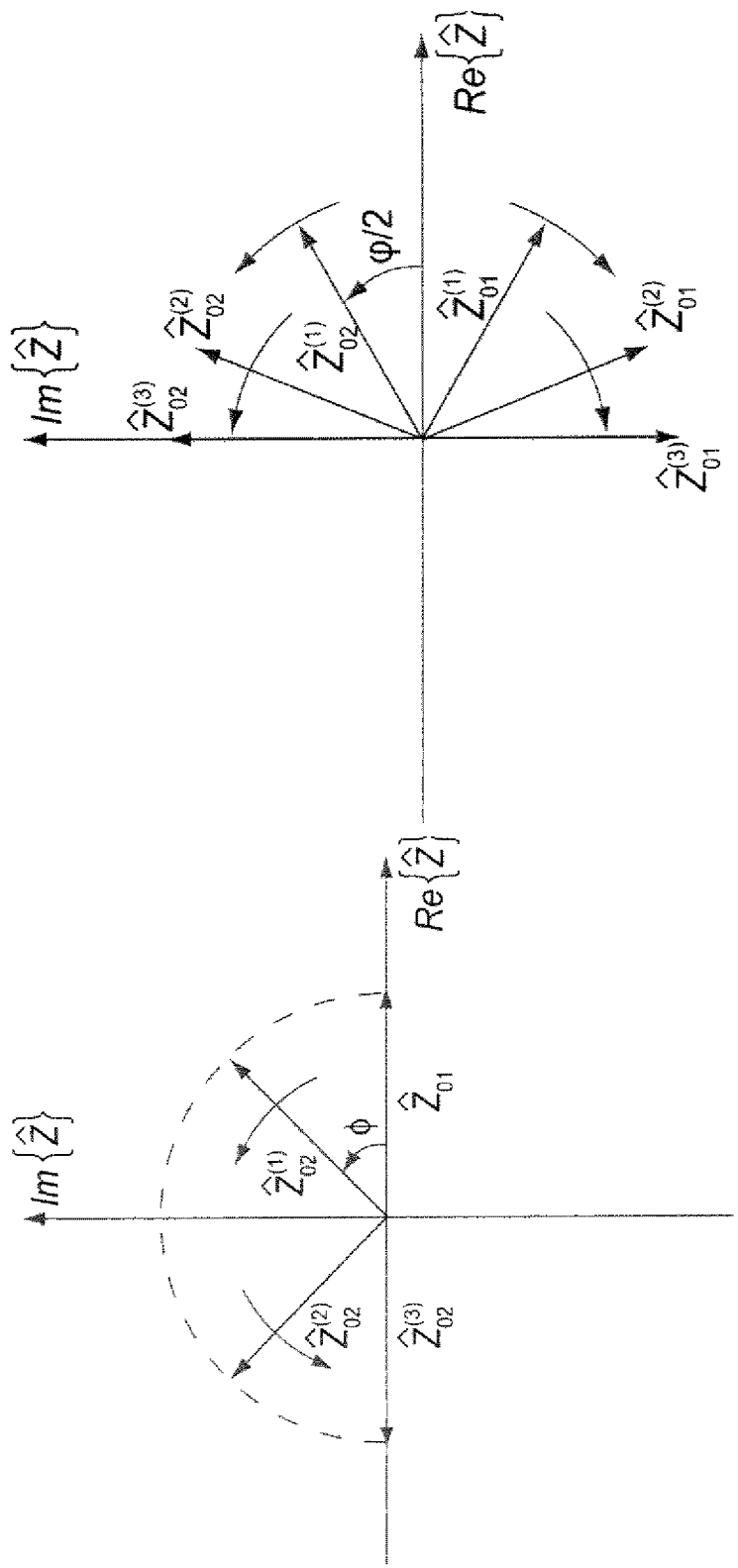

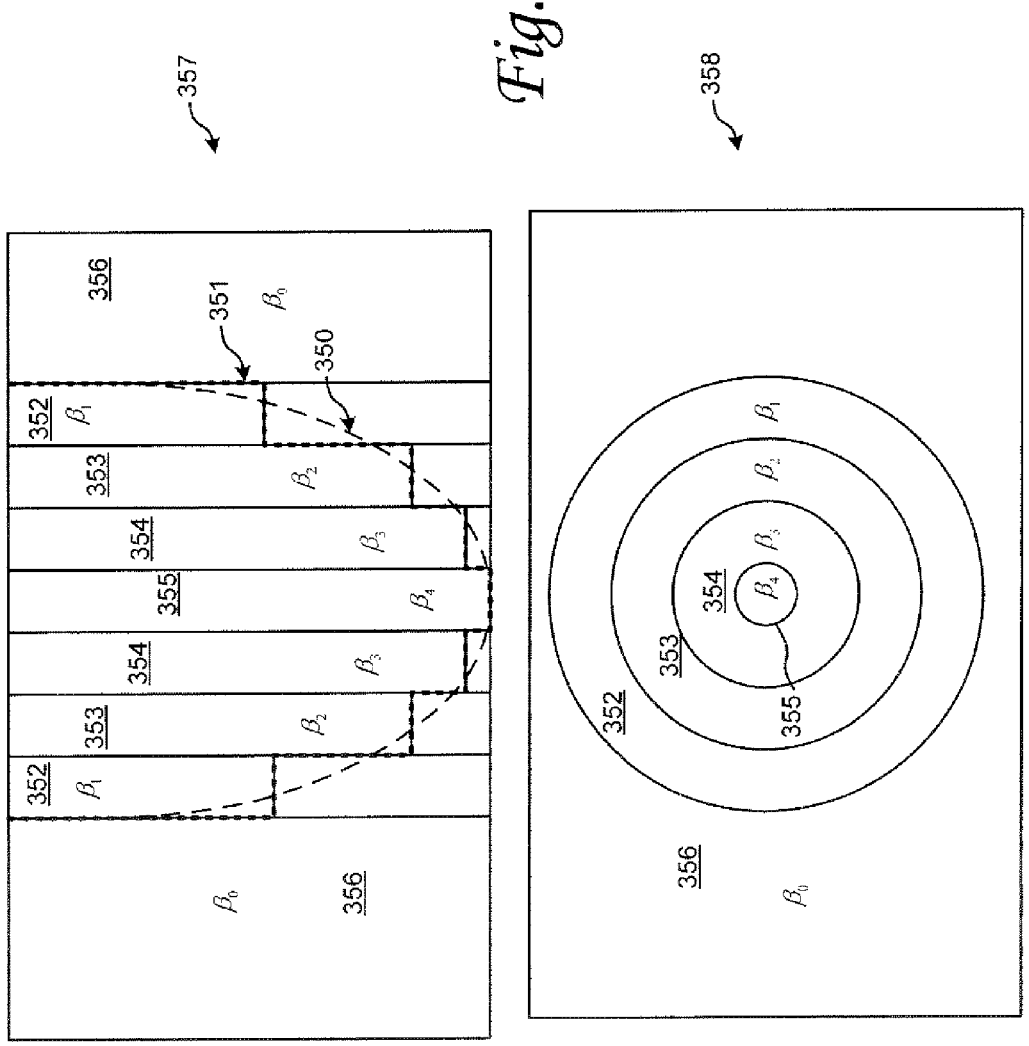

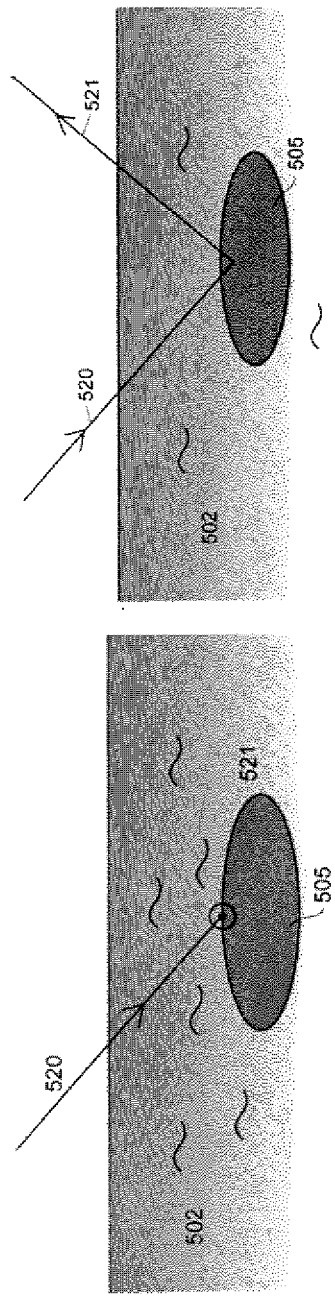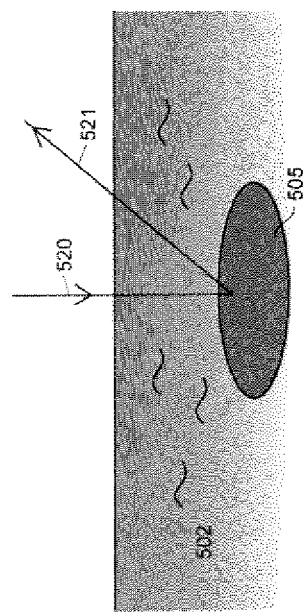
Fig. 41A
Fig. 41B
Fig. 41C

X-RAY IMAGING SYSTEM AND METHOD

CROSS-REFERENCE TO RELATED APPLICATIONS

This application claims priority from U.S. application Ser. No. 12/616,730, filed Nov. 11, 2009, which is hereby incorporated herein by reference in its entirety.

TECHNICAL FIELD

The present invention relates to imaging devices, and more particularly, some embodiments relate to x-ray imaging devices.

DESCRIPTION OF THE RELATED ART

It is difficult to perform camera like imaging using x-rays because x-rays are difficult to focus using refractive lenses. This occurs because the refractive index of any material for x-ray transmission is very close to one. Accordingly, Snell's law for refraction yields very small ray deflection because of the small difference between the refractive index of the lens material and a transmission medium.

Absorptive zone plate lenses can be created to focus x-rays using diffraction instead of refraction. However, the power efficiency of such a zone plate lenses is limited. X-rays may also be focused using reflective optics. However, reflective mirror optics introduce a number of inconveniences.

U.S. Pat. No. 7,231,017 describes a type of transmissive lens that is based on total external reflection. This lens has similar imaging properties of a convex mirror, except that the virtual rays are replaced by real rays.

X-ray imaging may also be performed using a pinhole type "camera obscura" effect. This optical system is aberration free and can be applied to wide viewing angles. However, it requires (1) long exposure times, and (2) it is only useful in two-dimensional imaging. Furthermore, in x-ray optics, the pinhole imaging system generates singularities at zero points of the image transfer function.

BRIEF SUMMARY OF EMBODIMENTS OF THE INVENTION

According to various embodiments of the invention systems and methods are presented to perform non-refractive imaging using high-energy particle beams. For example, one embodiment employs a volume aperture providing an image transfer function free of spatial singularities for use in x-ray-based imaging systems.

The present invention provides systems and methods for x-ray imaging. In some embodiments, an aperture or a plurality thereof, are configured to have image transfer functions lacking a zero within a usable spatial frequency range. In further embodiments, the image transfer function is determined according to the shape of the aperture and the usable spatial frequency range is determined according to a usable signal to noise ratio.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

The following references are useful to provide background information relevant to the systems and methods described herein. From time-to-time, these references are cited as sources for background material and underlying data. These references are not required reading for an understanding of the manufacture, use function or operation of the embodiments of the invention. The following references are noted herein by corresponding numbers:

1. J. W. Goodman, Introduction to Fourier Optics, Mc. Graw-Hill, 1968. G
2. T. Jannson, et al., "Finite Element Compton Tomography," SPIE Proc., 6707-30, 2007.
3. P. Zhu, et al., "X-Ray Compton Backscattering Techniques for Process Tomography: Imaging and Characterization of Materials," Measuring Science Technology, vol. 1, pp. 281-286, 1996.
4. J. H. Hubbel, et al., "Atomic Form Factors, Incoherent Scattering Functions, and Photon Scattering Cross-Sections," J. Phys. Chem. Ref Data, vol. 4, no. 3, pp. 471-537, 1975.
5. X-Ray Data Booklet, Lawrence Berkeley National Laboratory, January 2001.
6. E. Storm and H. I. Israel, "Photon Cross Sections from 1 keV to 100 MeV for Elements Z=1 to Z=100," Nuclear Data Tables, vol. A7, pp. 565-681, 1970.
7. J. A. Fessler, "Spatial Resolution and Noise Trade-Offs in Pinhole Imaging System Design: a Density Estimation Approach," JOSA, 1998.
8. T. Jannson, Shannon Number of an Image and Structural Information Capacity in Volume Holography, Opt. Acta, vol. 27, no. 9, pp. 1335-1344, 1980

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 13 illustrates another example of phasor addition of exponential functions formed from the aperiodic aperture array according to an embodiment of the invention.

FIG. 41 illustrates the various geometries for using Compton side scattering for imaging according to embodiments of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

The present invention is directed toward a system and method for non-refractive high energy imaging. The Fourier optical formalism to scalar representation of electromagnetic optical fields using so-called complex wave amplitudes may be applied to x-ray noncoherent optics, in the form of image intensities I, in [W/cm$^2$]. In the descriptions of various embodiments contained herein, unless otherwise indicated, the terms x-ray and gamma ray are used interchangeably and synonymously. Although typically, the terms x-ray and gamma ray are used to distinguish between the sources of the photons, as used herein both terms refer to photons having an energy greater than about 120 eV. In some embodiments of the invention, the x-rays used for imaging have energies greater than about 1 keV, with typical energies of about 100 keV. In a given plane (a Cartesian plane), the intensity for a mono-energetic photon with energy $E_{ph}=h\nu$, where h is the Planck constant, and v is the photon frequency (see Eq. (47)) can be represented by the 2D Fourier integral:

$$I(x,y) = \iint \hat{I}(f_x, f_y) \exp[j2\pi(f_x \cdot x + f_y \cdot y)] df_x df_y \quad (1)$$

where $f_x$ and $f_y$ are spatial frequencies, in lines per millimeter, or in [1/mm], and $\hat{I}(f_x,f_y)$ is the Fourier transform of the $I(x,y)$ function, in the form:

$$\hat{I}(f_x, f_y) = \hat{F}\{I(x,y)\} = \iint I(x,y) \exp[-j2\pi(f_x \cdot x + f_y \cdot y)] dx dy \quad (2)$$

Figure 1:
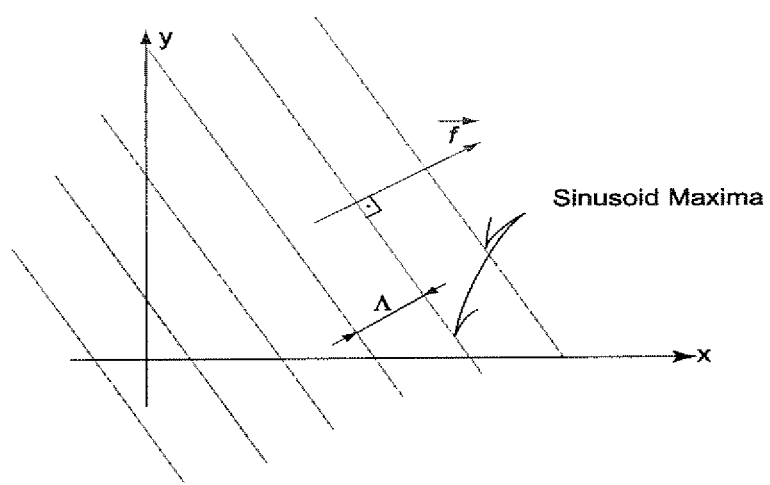
FIG. 1 illustrates an example periodic spatial pattern having a grating constant and frequency period.

Eqs. (1) and (2) are purely mathematical inverse operations. However, it should be noted that the intensity, I, is a real and positive function, while its Fourier transform, $\hat{I}$, is a complex function. These operations have a physical interpretation in the sense that any 2D-function: $I(x,y)$ can be represented by a continuum of 2D-sinusoids, characterized by a spatial frequency vector, $\vec{f}$, where, $$\vec{f} = (f_x, f_y); \quad (3)(a)$$

$$f = \sqrt{f_x^2 + f_y^2}; \text{ and} \quad (3)(b)$$

$$\Lambda = \frac{1}{f} \quad (3)(c)$$

where $\Lambda$ is a "grating constant," as illustrated FIG. 1, and where $f$ is the spatial frequency vector module: $f=|\vec{f}|$.

Figure 2:
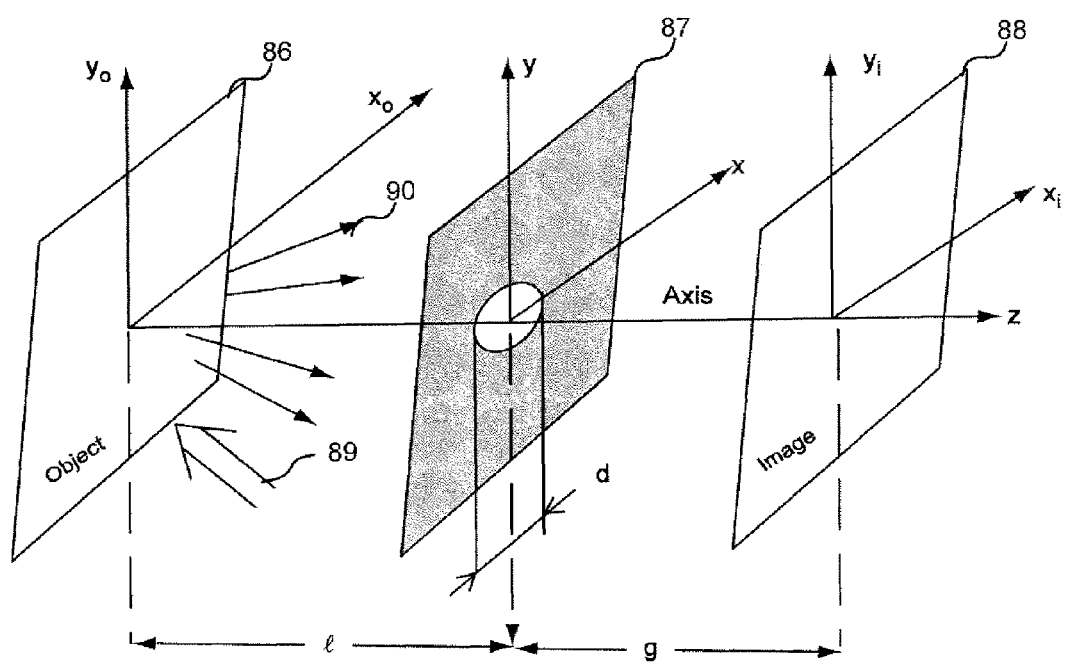
FIG. 2 illustrates an aperture-based imaging system according to an embodiment of the invention.

This 2D-Fourier formalism may be applied to lensless aperture-based type imaging of hard x-rays, with an imaging geometry such as that shown in FIG. 2, for example. FIG. 2 presents three planes: (i) the object plane 86 with axes $(x_0, y_0)$; (ii) the aperture plane 87 with axes $(x,y)$; and (iii) the image plane 88 with axes $(x_i, y_i)$. Arrow 89 illustrates incident x-rays on object 86 and arrows 90 illustrate backscattered x-rays emitted by the object 86.

Figure 3:
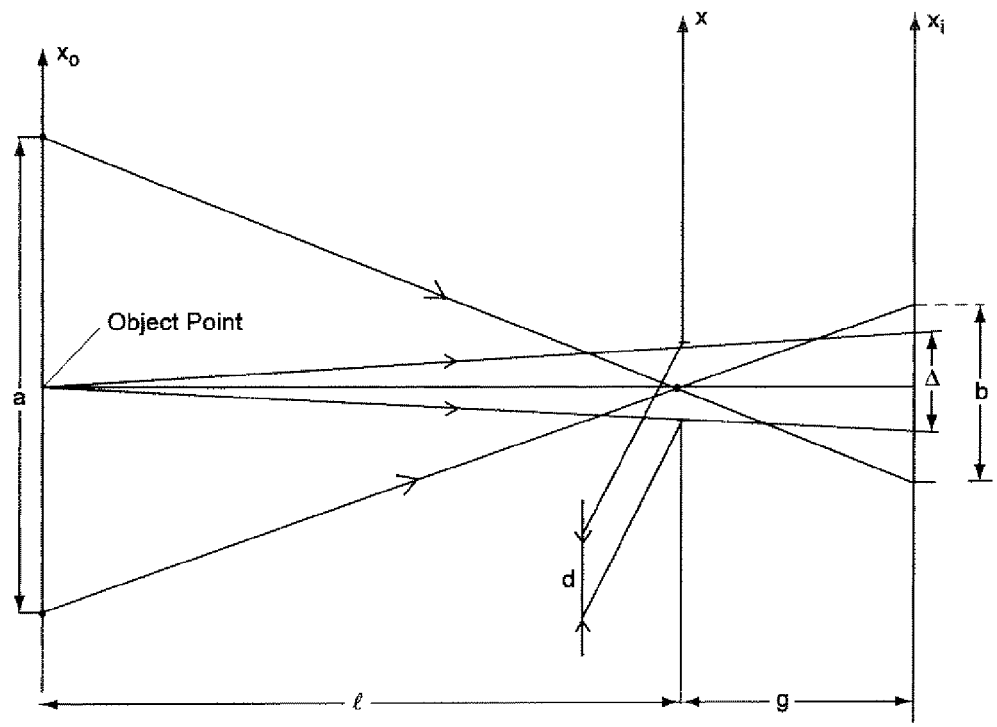
FIG. 3 is a further illustration of a pinhole type imaging system according to an embodiment of the invention.

To aid in description, FIG. 3 illustrates a cross section of the geometry described in FIG. 2 and the projection of a point object onto the image plane. From simple geometrical considerations:

$$\frac{b}{g} = \frac{a}{l} \Rightarrow \quad (4)(a)$$

$$b = a\frac{g}{l} \Rightarrow \quad (4)(b)$$

$$M \triangleq \frac{b}{a} = \frac{g}{l} \ll 1 \quad (4)(c)$$

Eq. (4)(c) defines the de-magnification of the image, M, which is usually much smaller than unity. Also, the size of the point spread function is defined by Eq. (5)(b):

$$\frac{\Delta}{l+g} = \frac{d}{l} \Rightarrow \quad (5)(a)$$

$$\Delta = d\frac{l+g}{l} \quad (5)(b)$$

and, for $l \gg g$:

$$\Delta \cong d \quad (6)$$

For image resolution purposes, the resolution, R, can be defined as a number of "pixels", or $\Delta$-elements within the image size:

$$R \triangleq \frac{b}{\Delta} = \frac{a\frac{g}{l}}{d\frac{l+g}{l}} = \frac{a}{d}\frac{g}{l+g}. \quad (7)$$

Eq. (7) is obtained under the paraxial approximation; i.e., when the $\Delta$ size does not significantly change under object point movement in an off-axial direction (i.e, the cosine of the off-axial angle is assumed to be approximately equal to unity). In some embodiments, the aperture diameter d and the object size a is fixed and the value of $l+g$ is kept constant. In such conditions, the resolution R is proportional to value of g.

As in Goodman (Ref. [1]), the theory of linear systems may be applied to this situation. Under the paraxial approximation, the point response (or, spread) formation, h, is sought and comprises the response for the point-image-intensity of: $I_0(x_0) = \delta(x_0)$, where $\delta(\ldots)$, is the Dirac delta (special) function (a distribution). Then, in the single dimensional case, the Point Spread Function (PSF) is:

$$I_i(x_i) = h(x_i) = rect\left(\frac{x_i}{\Delta}\right), \quad (8)$$

where the rectus function is defined as:

$$h(x) = rect\left(\frac{x}{\Delta}\right) = \begin{cases} 1, & \text{for } x \leq \Delta/2 \\ 0, & \text{for } x \geq \Delta/2. \end{cases} \quad (9)$$

In the paraxial approximation the system is also assumed to be space-invariant, so $$h(x-x') \cong h(x) \quad (10)$$

This space-invariance requirement is satisfied in the paraxial approximation if, approximately, $(b/2) < g/4$, or $b < g/2$.

In real systems, this condition can be satisfied only locally, in the regions of small x'. Therefore, this problem may only be solved numerically. However, if Eq. (10) is assumed to be satisfied exactly, this problem can be solved analytically. Accordingly, this approximate paraxial analysis is sufficient to describe the principle of operation. Assuming that Eq. (10) holds, the following convolution relation is obtained:

$$I(x_i) = \int h(x_i - Mx_0) I_0(x_0) dx_0, \quad (11)$$

which can be re-scaled by using de-magnification formula (4)(c):

$$\tilde{x}_0 = M x_0; \quad (12)(a)$$

$$d\tilde{x}_0 = M dx_0 \quad (b)$$

then, Eq. (11) becomes:

$$I_i(x_i) = \frac{1}{M} \int h(x_i - \tilde{x}_0) \tilde{I}_0(\tilde{x}_0) d\tilde{x}_0, \quad (13)$$

which is representable as a convolution function:

$$I_i = \frac{1}{M} h \otimes \tilde{I}_0, \quad (14)$$

where ⊗ is the symbol for convolution.

The 2D-equivalent of Eq. (11) has the form:

$$I_i(x_i,y_i) = \iint h(x_i - M_x \cdot x_0, y_i - M_y \cdot y_0) I_0(x_0,y_0) dx_0 dy_0, \quad (15)$$

and, assuming: $M_x = M_y = M$, the equivalent of Eq. (13), is $$I_i(x_i, y_i) = \frac{1}{M^2} \iint h(x_i - \tilde{x}_0, y_i - \tilde{y}_0) \tilde{I}_0(\tilde{x}_0, \tilde{y}_0) d\tilde{x}_0 d\tilde{y}_0 \quad (16)$$

where $h(x_i, Y_i; \tilde{x}_o, \tilde{y}_o)$ is the normalized point spread function satisfying the spatial invariance condition.

In the case of a circular aperture, as in FIG. 2, the point spread function is:

$$h(x, y) = \operatorname{circ}\left(\frac{r}{r_0}\right) = \begin{cases} 1, & \text{for } r \leq r_0 \\ 0, & \text{for } r > r_0 \end{cases}, \text{ where} \quad (17)$$

$r = \sqrt{x^2 + y^2}$, and where $r_0 = d/2$. The Fourier transform of Eq. (16), is $$\hat{I}_i(f_x,f_y) = \hat{F}\{I_i(x_i,y_i)\} = \iint I_i(x_i,y_i) \exp\{-j2\pi(f_x \cdot x_i + f_y \cdot y_i)\} dx_i dy_i. \quad (18)$$

Figure 4:
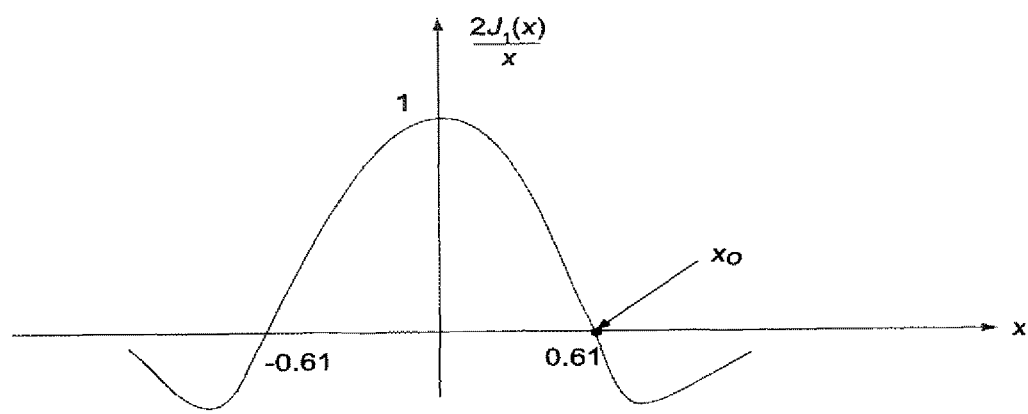
FIG. 4 illustrates a image transfer function of an aperture having a rectus profile according to an embodiment of the invention.

Eq. (16) may be substituted into Eq. (18), to obtain $$\hat{I}_i(f_x, f_y) = \frac{1}{M^2} \hat{H}(f_x, f_y) \hat{\tilde{I}}_0(f_x, f_y), \quad (19)$$

where $\hat{H}(f_x,f_y)$ is the Image Transfer Function (ITF) that is the Fourier transform of Eq. (17), in the form:

$$\hat{H}(f) = r_0^2 \frac{\pi J_1(2\pi f r_0)}{\pi f \cdot r_0} = \pi r_0^2 \frac{2 J_1(2\pi f r_0)}{(2\pi f \cdot r_0)}, \quad (20)$$

where $f = \sqrt{f_x^2 + f_y^2}$, and $J_1$ is the Bessel function of the 1st kind and 1st order, as shown in FIG. 4.

The first zero of the Bessel function is at $x = x_0 = 0.61$ (see FIG. 4); therefore:

$$x_0 = 0.61 = 2\pi f_0 \cdot r_0 \Rightarrow f_0 = \frac{0.61}{2\pi r_0} = \frac{0.61}{\pi d} \quad (21)$$

where $f = f_0$ defines the spatial frequency where the ITF has the 1st zero. For example, if d=0.5 mm, then $f_0$=0.39 1/mm, and if d=0.1 mm=100 µm, then $f_0$=1.9 mm$^{-1}$. This means that for an aperture size of 100 µm, the 1st zero spatial frequency is at 1.9 mm$^{-1}$. However, this frequency corresponds to an image which has been de-magnified M times with respect to an object. For example, for a de-magnification of M=0.1, the geometrical image is 10 times smaller than the object. Thus, its spatial frequencies will be 10 times larger than those of the object; and, inversely, the object spatial frequencies will be 10 times smaller than those for the image. For our specific example, the 1st-zero spatial frequency of the object will be 10 times smaller, or 1.9 1/cm. Thus, it will be describing quite sizable details of about 5 mm. As illustrated in FIG. 4, the spatial frequencies change sign after passing the zero, so the image will be significantly deformed.

Figure 5:
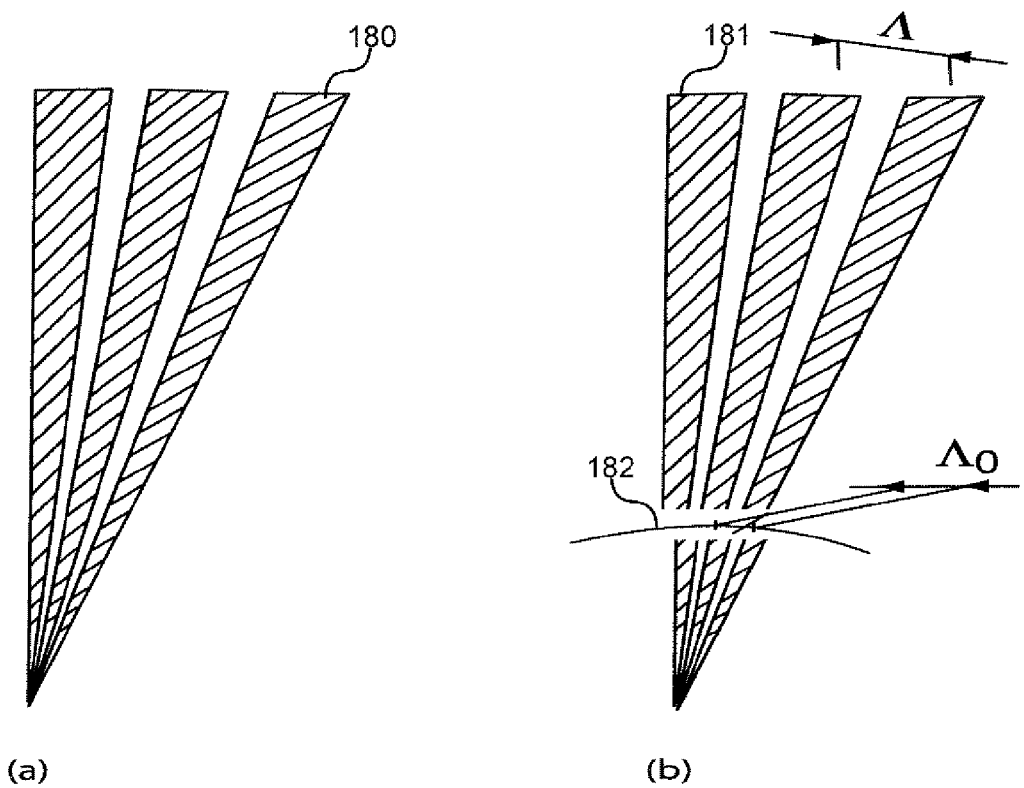
FIG. 5 illustrates a spatial frequency phase change in an image formed by an aperture having a rectus profile according to an embodiment of the invention.

FIG. 5 illustrates such a deformation for a radially-convergent object 180. FIG. 5(a) illustrates the object 180 while FIG. 5(b) illustrates the object's image 181. This object has details with radially-decreasing sizes, from Λ at one end, to $Λ_0$ at the 1st-zero location. As illustrated, after passing the Λ value 182, the image details change phase by π. This is because, after passing $Λ=Λ_0$ (or, $f=f_0$), the ITF changes sign, as shown in FIG. 4.

Figures 6A, 6B:
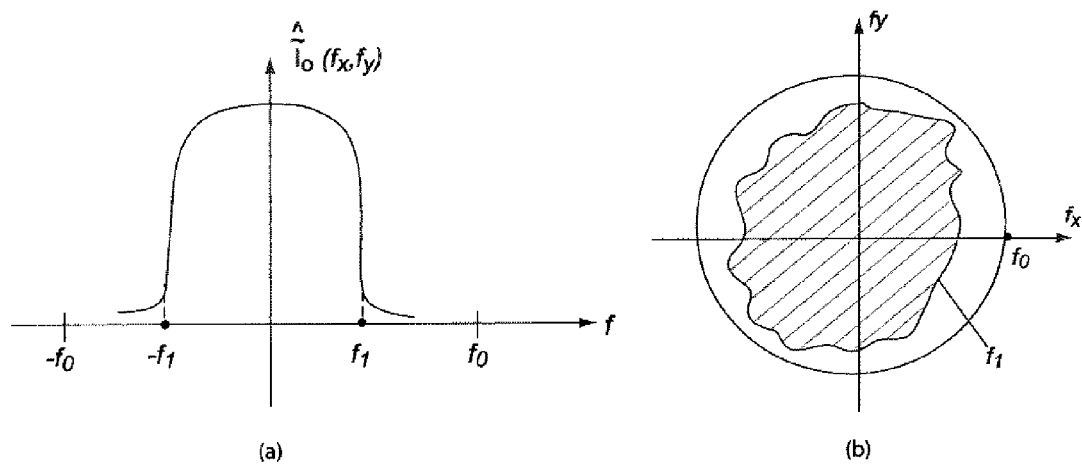
FIG. 6 illustrates an aperture response of an aperture configured according to an embodiment of the invention.

FIG. 6(a) illustrates an example Fourier spectrum limitation to avoid the singularity illustrated in FIG. 5. FIG. 6(b) illustrates an example two-dimensional representation of such a Fourier spectrum limitation. At $f=f_0$ a singularity occurs that deforms images passing the circular aperture with the 1st-zero frequency of $f_0 = 1/Λ_0$. In order to avoid this deformation, the Fourier spectrum of an object can be limited to $f < f_0$, where $f = \sqrt{f_x^2 + f_y^2}$, as shown in FIG. 6. In such a case, the re-scaled object spectrum preferably has cutoff-frequencies $f_1$ that are smaller than $f_0$. In some cases, this frequency limitation results in image degradation.

Figure 6C:
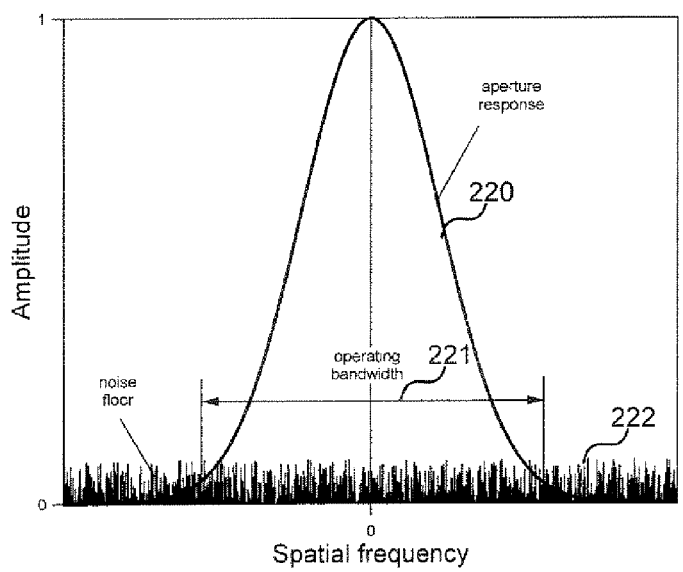

FIG. 6C illustrates a method of determining a usable spatial frequency range according to an embodiment of the invention. The aperture response 220 in the illustrated embodiment is a Gaussian distribution, such as would result from an imaging system using an aperture having a parabolic volume profile, as described herein. In various embodiments, the recorded image will contain a noise component $n(x_i, y_i)$. The noise component may be included in Eqs. (15) and (19) as follows:

$$I_i(x_i,y_i) = \iint h(x_i - M_x x_0, y_i - M_y y_0) I_0(x_0,y_0) dx_0 dy_0 + n(x_i,y_i) \quad (22)$$

$$\hat{I}_i(f_x, f_y) = \frac{1}{M^2} \hat{H}(f_x, f_y) \hat{I}_0(f_x, f_y) + N(f_x, f_y) \quad (23)$$

where $N(f_x,f_y)$ is the spatial frequency spectrum of the noise $n(x_i, y_i)$. This spatial frequency noise spectrum is illustrated as noise floor 222 in the illustrated embodiment.

In some embodiments, the image transfer function $\hat{H}(f_x, f_y)$, illustrated by aperture response 220, is determined by measuring the point spread function (PSF), which is an image formed by a point source $I_0(x_0,y_0) = \delta(x_0)\delta(y_0)$. In the illustrated case, the measured aperture spectrum is:

$$\hat{I}_i(f_x, f_y) = \frac{1}{M^2} \hat{H}(f_x, f_y) + N(f_x, f_y). \quad (24)$$

The usable spatial frequency range is determined according to the portion of the frequencies that can be reconstructed in the presence of the system noise. In some embodiments, the reconstruction of the frequencies dominated by the noise is impractical, and the usable spatial frequency range may be determined according to the condition:

$$\frac{1}{M^2} \hat{H}(f_x, f_y) > N(f_x, f_y). \quad (25)$$

In this embodiment, the cutoff frequency is then defined as the boundary of the spectral region 221 where condition (25) holds true. A usability factor may be accordingly defined as:

$$\upsilon(f_x, f_y) = \frac{1}{M^2} \frac{\hat{H}(f_x, f_y)}{N(f_x, f_y)}, \quad (26)$$

where minimum usability for a spatial frequency pair $(f_{x'}, f_{y'})$ occurs when $\upsilon(f_{x'}, f_{y'}) > 1$. In some embodiments, apertures and arrays thereof may be configured to provide various usability levels as systems require. For example, the accuracy in constructing an object function through performing an inverse Fourier transform, as described herein, may be impeded by attempting to incorporate spatial frequencies that are too near the noise frequency levels. Accordingly, in some embodiments, these operations might be performed under conditions where spatial frequencies are restricted to those frequencies having a larger usability level, for example, a usability level of $\upsilon \geq 3$.

Figure 7:
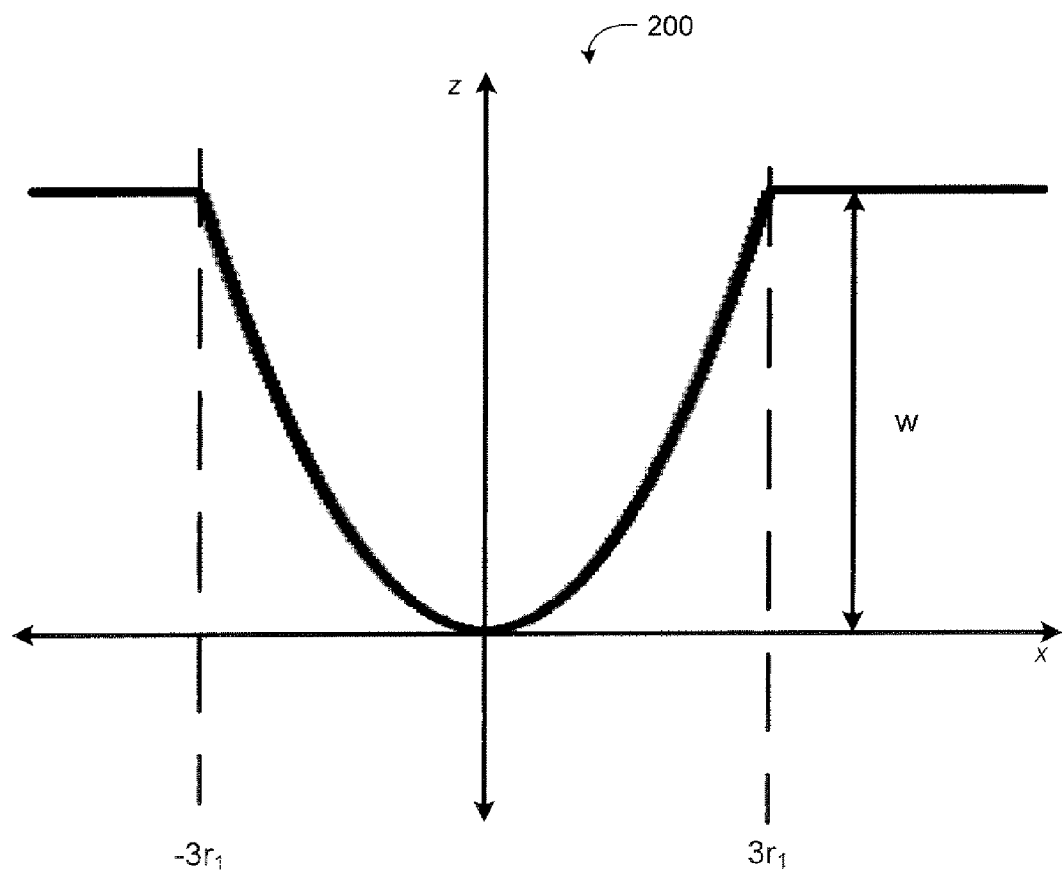
FIG. 7 illustrates a cross-sectional profile of a shape of an aperture configured according to an embodiment of the invention.

FIG. 7 illustrates a cross-section of a volume aperture having a shape that varies with depth according to an embodiment of the invention. The aperture 200 has a cross-sectional profile 201 that has a parabolic shape. The x-ray transmission function of aperture 200 is:

$$t = e^{-\beta z} = e^{-x^2/r_1^2} \Rightarrow \beta z = \frac{x^2}{r_1^2} \quad (27)$$

where $\beta$ is the x-ray attenuation coefficient in $cm^{-1}$. Gaussian dependence may be obtained by setting the relation between x and z to be:

$$z = \frac{x^2}{r_1^2 \beta}, \quad (28)$$

which has parabolic shape, as illustrated in FIG. 7.

In some embodiments, measurement accuracy may vary depending on the x-ray attenuation of the aperture when $z=w$. For example, in order to obtain opacity or usably reduced transparency for $z=w$, x-ray transmission at $z=w$ may be set close to zero. In other embodiments, this restriction may be lessened at the expense of reduced accuracy in measurement. In one embodiment, $\exp(-\beta w) \cong 0$; at $x=3r_1$; then, $w=9r_1^2/r_1^2 \beta = 9/\beta$, and $\exp(-x^2/r_1^2) = e^{-9} = 1.234 \times 10^{-4} \ll 1$. In this embodiment:

$$w = 9/\beta \Rightarrow \beta = 9/w \quad (29)$$

For example, for $\beta = 1$ $mm^{-1}$, $w=9$ mm, and for $\beta = 10$ $mm^{-1} = 100$ $cm^{-1}$, $w=0.9$ mm. In many embodiments, this allows the use of materials with thicknesses on the order of 1 mm. Such materials may be determined, for example, using the NIST tables, using the formula: $\beta = \mu \cdot \rho$, where $\mu$ is mass attenuation coefficient in $cm^2/g$, and $\rho$-material density in $gcm^{-3}$.

For comparison, three materials are considered: Tungsten (W), with $\rho=19.3$ $gcm^{-3}$, and $Z=74$; bismuth (Bi), with $\rho=9.8$ $gcm^{-3}$, and $Z=83$ and titanium (Ti), with $\rho=4.51$ $gcm^{-3}$, and $Z=81$. They are summarized in Tables 1, 2, 3. In all these tables, the NIST tables and Eq. (29) are used.

TABLE 1

| (TUNGSTEN) | | | | | | | |
|---|---|---|---|---|---|---|---|
| Eph [keV] | 10 | 20 | 30 | 40 | 50 | 60 | 80 |
| $\mu$ [$cm^2/g$] | 233.4 | 65.73 | 22.73 | 10.67 | 5.95 | 3.71 | 7.81 |
| $\beta$ [$cm^{-1}$] | 4504.6 | 1268.6 | 438.69 | 205.93 | 114.82 | 71.66 | 150.73 |
| w[mm] | 0.020 | 0.071 | 0.205 | 0.437 | 0.783 | 1.256 | 0.597 |
| Eph [keV] | 100 | 150 | 200 | 300 | 400 | 500 | |
| $\mu$ [$cm^2/g$] | 4.44 | 1.58 | 0.78 | 0.32 | 0.19 | 0.14 | |
| $\beta$ [$cm^{-1}$] | 85.66 | 30.51 | 15.13 | 6.25 | 3.72 | 2.66 | |
| w[mm] | 1.05 | 2.95 | 5.95 | 14.40 | 24.23 | 33.85 | |

TABLE 2

| (BISMUTH) | | | | | | | |
|---|---|---|---|---|---|---|---|
| Eph [keV] | 10 | 20 | 30 | 40 | 50 | 60 | 80 |
| $\mu$ [$cm^2/g$] | 136.0 | 89.52 | 31.52 | 14.95 | 8.38 | 5.23 | 2.52 |
| $\beta$ [$cm^{-1}$] | 1322.8 | 877.3 | 308.9 | 146.51 | 82.11 | 51.28 | 24.72 |
| w[mm] | 0.068 | 0.103 | 0.291 | 0.614 | 1.096 | 1.755 | 3.641 |
| Eph [keV] | 100 | 150 | 200 | 300 | 400 | 500 | |
| $\mu$ [$cm^2/g$] | 5.739 | 2.082 | 1.033 | 0.416 | 0.239 | 0.166 | |
| $\beta$ [$cm^{-1}$] | 56.24 | 20.40 | 10.12 | 4.08 | 2.343 | 1.623 | |
| w[mm] | 1.6 | 4.412 | 8.893 | 22.06 | 38.41 | 55.45 | |

TABLE 3

| (TITANIUM) | | | | | | | |
|---|---|---|---|---|---|---|---|
| Eph [keV] | 10 | 30 | 40 | 50 | 60 | 80 | 100 |
| μ [cm²/g] | 110.7 | 4.97 | 2.21 | 1.21 | 0.78 | 0.41 | 0.27 |
| β [cm⁻¹] | 498.9 | 22.42 | 9.98 | 5.47 | 3.45 | 1.83 | 1.23 |
| w[mm] | 0.18 | 4.014 | 9.013 | 16.95 | 26.05 | 49.29 | 73.35 |

| Eph [keV] | 150 | 200 | 300 | 400 | 500 |
|---|---|---|---|---|---|
| μ [cm²/g] | 0.165 | 0.131 | 0.104 | 0.091 | 0.089 |
| β [cm⁻¹] | 0.774 | 0.593 | 0.469 | 0.41 | 0.402 |
| w[mm] | 120.96 | 151.77 | 191.90 | 219.51 | 223.88 |

As illustrated by these tables, realistic thickness values (in the range of 0.15-3 mm) are distributed within some energy photon ranges, such as (1) 30-150 keV, for Tungsten; (2) 30-60 and 100 keV, for Bismuth; and (3) 10 keV, for Titanium. Thus, globally, they cover $E_{ph}$-range: 10 keV to 150 keV. They are shown in bold, in Tables 1, 2, and 3. In some embodiments, the w-criterion, as in Eq. (29), is somewhat arbitrary or dependent on the amount of transparency that may be tolerated in system use. For example, in less sensitive systems the $e^{-9}$ condition might be replaced with $e^{-4}$ or $e^{-1}$. Additionally, other materials may be used as may be appropriate for a given application. For example, depleted uranium, perhaps alloyed with a small amount of titanium, may serve as a suitable aperture material.

In the Gaussian aperture embodiment: $t=\exp(-x^2/a^2)$, thus there is no singularity; the spatial frequencies are uniformly attenuated and the image function is smooth and without deformations. This occurs because the Fourier transform of the 2D-Gaussian aperture function is $$\hat{F}\left\{\exp\left[-\frac{x^2+y^2}{r_1^2}\right]\right\} = \pi a^2 \exp\left[-\frac{f_x^2+f_y^2}{f_0^2}\right]; \quad f_0 = \frac{1}{\pi r_1}, \quad (30)$$

and there is no singularity as in the case of the circus function shown in FIG. 4, where the Fourier transform (Bessel function) has singularities.

Analogously to the transparency determination in Eq. (29), a particular resolution may be determined by setting the cutoff frequency $f_1$ to $3f_o$; in which case, $$f_1 = 3f_o = \frac{3}{\pi r_1}. \quad (31)$$

Figure 8:
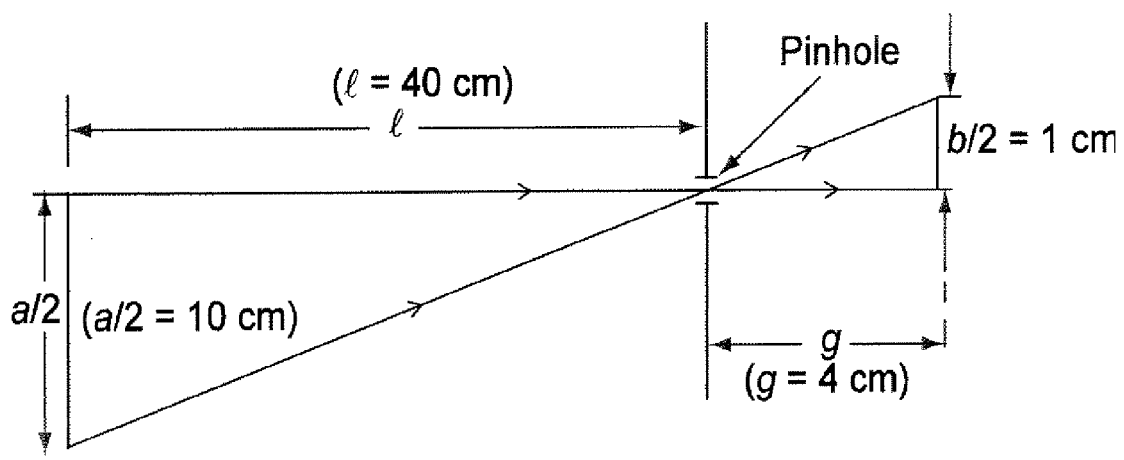
FIG. 8 illustrates a pinhole geometry according to an embodiment of the invention.

For example, for $r_1=0.1$ mm, $f_1 \sim 10$ l/mm, and the resolution detail, $\Lambda_1$, is: $\Lambda_1=1/f_1=0.1$ mm. In other embodiments, the cutoff frequency may be defined in alternative ways. For example, the cutoff frequency may be determined according to a system resolution that depends on system noise, as described herein. In embodiments where the de-magnification M=0.1, this detail will be magnified M times, into object detail, $\Lambda_o$ equal to: $\Lambda_o=1$ mm. FIG. 8 shows an embodiment with a half-image size b/2=1 cm, g=4 cm, l=40 cm, so M=0.1, and the half-object size is h/2=10 cm, or a full object size of 20 cm. Such a geometry will, approximately, satisfy the paraxial approximation.

The so-called Shannon number (Ref. 8) describes a number of resolution elements, or degrees of freedom (for structural information) of an image, or of an object. This number F, for an image, is denoted by $F_I$ and it is equal to:

$$F_I = \frac{b}{\Lambda_1} = \frac{b}{1/f_1} = b \cdot f_1 = 20 \text{ mm} \times 10 \text{ l/mm} = 200. \quad (32)$$

For an object, this number is $$F_o = \frac{h}{\Lambda_o} = \frac{h}{M(1/f_1)} = \frac{hf_1}{M} = bf_1 = F_I. \quad (33)$$

Accordingly, the Shannon number is invariant under the imaging operation.

As another example, an example geometry has a much longer object distance, l=10 m that preserves a practical detector size (so, b/2=1 cm), and a de-magnification M=0.1. Thus, as in FIG. 8: g=l/10=1 m, and assuming a=1 mm, the cutoff frequency remains $f_1=10$ l/mm.

The formal resolution treatment can be derived from general dependence between the cutoff spatial frequency of an object, $f_T$, and Gaussian aperture size, d, as shown, for 1D-case, in FIG. 3 by applying the general relation (5), in the form:

$$\Delta = d\frac{l+g}{l}.$$

Then, instead of Eq. (30), the first ITF zero frequency $$f_o = \frac{2}{\pi d_1}; \quad d_1 = 2r_1, \quad (34)$$

where $r_1$ is a Gaussian decrement, as in Eq. (30). Using this generalization, the following spatial frequency may be obtained:

$$f_o' = \frac{2}{\pi d_1}\frac{l}{l+g} = \frac{2}{\pi d_1}\left(\frac{1}{1+M}\right), \quad (35)$$

where M=g/l is the system magnification, or rather de-magnification because M≤1. In some embodiments, the cutoff frequency of an image may be chosen, as in Eq. (31), to be three times of the value of $f'_o$, in the form:

$$f_1' = 3f_o' = \frac{6}{\pi d_1}\frac{1}{1+M}. \quad (36)$$

In the other embodiments, the cutoff frequency may be chosen to be other multiples of $f'_o$, for example, as would be determined according to a system noise level, or to allow greater or lower resolutions depending on system deployment and available resources. In the embodiment where the cutoff frequency is three times that of $f'_o$, under the resealing process, the cutoff frequency of an object is reduced M-times in respect to the image, in the form:

$$f_T = \frac{6}{\pi d_1}\left(\frac{M}{1+M}\right), \quad (37)$$

where $f_T$ is the cutoff frequency of an object (or, target). In embodiments where $M \leq 1$ $$(f_T)_{MAX} = (f_T)_{M=1} = \frac{3}{\pi d_1}. \quad (38)$$

For example, for $d_1=1$ mm, $(f_T)_{MAX} \cong d_1^{-1}=1$ l/mm. However, for $M \ll 1$, $f_T \cong 6M/\pi d_1$. For example, for $M=0.1$, $f_T \cong 0.17/d_1$, and for $d_1=1$ mm, $f_T=0.17$ l/mm.

Figure 9:
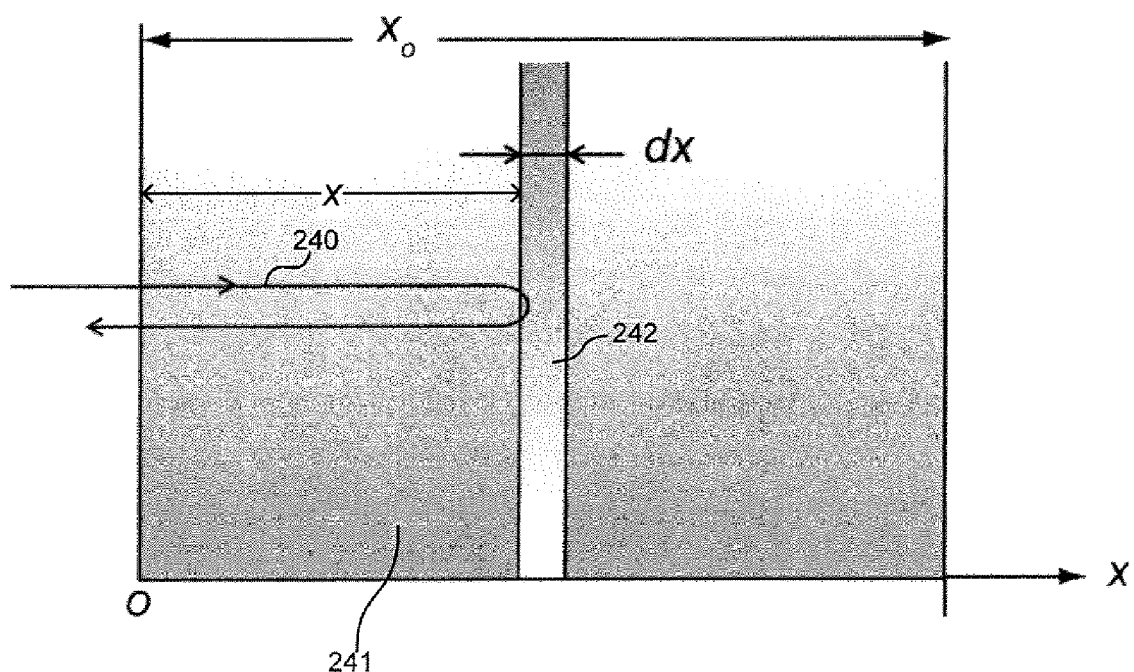
FIG. 9 illustrates a model of Compton backscattering according to an embodiment of the invention.

As illustrated in FIGS. 2 and 9, in some embodiments imaging is obtained by the Compton backscattering effect. In these embodiments, the material composition of imaged objects may be determined according to the object's Compton backscattering effects.

Because the majority of the x-ray flux is blocked, the power budget used in these embodiments is taken into account. FIG. 9 illustrates a simple model of Compton backscattering. The x-ray beam 240 is incident into a homogenous medium, represented by a single element 241, such as carbon, for example. This beam is attenuated through distance x, then Compton backscattered at an infinitesimal layer with thickness dx, and then attenuated again through the same distance x. Thus, an infinitesimal reflection coefficient dR, is $$dR = \Delta R_c e^{-2\beta x} dx, \quad (39)$$

where $\beta$ is the linear attenuation coefficient, and the $\Delta R_c$ parameter, is [2,3]

$$\Delta R_c = n_e \frac{d\delta_{KN}}{d\Omega} \Delta\Omega \times S_N(X, Z), \quad (40)$$

where $n_e$ is the electron density in cm$^{-3}$, $d\delta_{KN}/d\Omega$ is the differential Klein-Nishina (free-electron Compton) collision cross-section per electron [4], $\Delta\Omega$ is the solid angle element, and $S_N$ is the Klein-Nishina correction factor (the so-called Incoherent Scattering Function [4] S, divided by Z, where Z is atomic number) and [4]

$$X = \sin(\theta/2)/\lambda[\text{Å}], \quad (41)$$

where $\theta$ is the Compton scattering angle, where, for backscattering, $\theta=180°$. Accordingly, for Compton backscattering, $$X = \lambda^{-1}[\text{Å}^{-1}]. \quad (42)$$

For integration in the range $(0, x_o)$:

$$R = \Delta R_c \int_o^{x_o} e^{-2\beta x} dx \quad (43)$$

$$= \Delta R_c \left(-\frac{1}{2\beta} e^{-2\beta x}\right)\Big|_o^{x_o}$$

$$= \Delta R_c \frac{1}{2\beta} e^{-2\beta x}\Big|_{x_o}^o$$

$$= \frac{\Delta R_c}{2\beta}(1 - e^{-2\beta x_o}).$$

For example, for $E_{ph}=100$ keV, and lead (Pb): $\mu=5.55$ cm$^2$/g, $\rho=11.3$ g/cm$^3$, so $\beta=62.7$ cm$^{-1}$, and for $x_o=1$ mm, $\beta x_o=6.27$, $e^{-2\beta x_o}=3.6 \times 10^{-6} \ll 1$, while for $E_{ph}=100$ keV, and water (H$_2$O): $\mu=0.171$ cm$^2$/g, $\rho=1$ g/cm$^3$, $\beta=0.171$ cm$^{-1}$; $x_o=5$ cm, 2 $\beta_o x_o=1.71$, and $e^{-2\beta x_o}=0.18$. Thus, for heavy elements, the term: exp $(-2\beta x_o)$ can usually be ignored, while for light elements it must usually be taken into account. For simplicity in description, herein this term will be ignored. From Ref. [2], $$n_e = \left[\frac{Z}{M}\right]\rho \cdot N_A, \quad (44)$$

where Z is the atomic number, M is the atomic mass (not the de-magnification, as in for example, Eq. (37)), $\rho$ is the material density, and $N_A$ is Avogadro's number. Substituting this into Eq. (40):

$$\Delta R_c = \rho\left(\frac{Z}{M}\right)\Delta\Omega\frac{d\sigma_{KN}}{d\Omega}S_N(X, Z). \quad (45)$$

Substituting Eq. (45) into Eq. (43), and assuming exp $(-2\beta x_o) \ll 1$, $$R = \frac{\Delta R_c}{2\beta} \quad (46)$$

$$= \frac{1}{2\beta}\left(\frac{Z}{M}\right)\rho \cdot N_A \frac{d\delta_{KN}}{d\Omega} S_N(X, Z)\Delta\Omega$$

$$= \frac{1}{2\mu}\left(\frac{Z}{M}\right) N_A \frac{d\delta_{KN}}{d\Omega} S_N(X, Z)\Delta\Omega.$$

For material selectivity, material independent factors are separated from material dependent factors. For most elements, the (Z/M)-factor is in the range of 0.4-0.5 g$^{-1}$. $N_A$ is constant, and the Klein-Nishina differential cross-section does not depend on material, nor does $\Delta\Omega$. Also, $S_N(X, Z)$ is very close to 1.00 for $E_{ph}=100$ keV. Thus, the reflection coefficient, R, depends only on $\mu^{-1}$. Accordingly, low Z materials look "flashy" under Compton backscattering, while high Z materials look "dark." The photon wavelength is:

$$\lambda = \frac{c}{v} = \frac{hc}{hv} = \frac{hc}{E_{ph}}, \quad (47)$$

and, from Ref. [5]:

$$\frac{hc}{1 \text{ eV}} = 1.24 \text{ }\mu\text{m}, \quad \frac{hc}{1 \text{ keV}} = 1.24 \text{ nm}, \quad (48)$$

so, $$\frac{hc}{100 \text{ keV}} = 0.0124 \text{ nm} = 0.124 \text{ Å}, \quad (49)$$

and $$X = \sin(\theta/2)/\lambda[\text{Å}] = \lambda^{-1}[\text{Å}^{-1}] = 8.06 \text{ Å}^{-1}. \quad (50)$$

Using this value and other values from NIST tables and Refs. [4,6], Table 4 may be obtained for the selected elements. As this table illustrates, Z/M values are mostly in the range of 0.4-0.5 g$^{-1}$, and $S_N$ values (which are S values, divided by Z) are close to 1.00. Furthermore, as illustrated, aluminum, carbon, and silicon, have low $\mu$ values and so appear "flashy" from Compton back-scattering.

TABLE 4

Compton Backscattering Critical Parameters for Selected Elements, for $E_{ph} = 100$ keV, $\chi = 8\text{Å}^{-1}$

| Element | Symbol | Z | M[g] | Z/M | μ[cm2/g] | ρ[g/cm³] | β[cm⁻¹] | $S_N$ |
|---|---|---|---|---|---|---|---|---|
| Aluminum | Al | 13 | 26.98 | 0.482 | 0.17 | 2.7 | 0.46 | 1.00 |
| Bismuth | Bi | 83 | 208.98 | 0.397 | 5.74 | 9.8 | 56.25 | 0.96 |
| Cadmium | Cd | 48 | 112.41 | 0.427 | 1.52 | 8.6 | 13.07 | 0.98 |
| Carbon | C | 6 | 12.01 | 0.499 | 0.151 | 2.0 | 0.30 | 1.00 |
| Chromium | Cr | 24 | 51.996 | 0.461 | 0.317 | 7.2 | 2.28 | 1.00 |
| Copper | Cu | 29 | 63.55 | 0.456 | 0.458 | 8.9 | 4.07 | 0.99 |
| Gold | Au | 79 | 196.97 | 0.401 | 5.16 | 19.3 | 99.59 | 0.96 |
| Iron | Fe | 26 | 55.85 | 0.465 | 0.372 | 7.9 | 2.94 | 1.00 |
| Lead | Pb | 82 | 207.2 | 0.396 | 5.55 | 11.3 | 62.7 | 0.96 |
| Nickel | Ni | 28 | 58.69 | 0.477 | 0.444 | 8.9 | 3.95 | 0.99 |
| Platinum | Pl | 78 | 195.08 | 0.399 | 4.99 | 21.4 | 106.79 | 0.96 |
| Potassium | K | 19 | 30.97 | 0.486 | 0.234 | 0.86 | 0.20 | 1.00 |
| Silicon | Si | 14 | 28.08 | 0.498 | 0.183 | 2.3 | 0.42 | 1.00 |
| Titanium | Ti | 22 | 47.86 | 0.46 | 0.272 | 4.5 | 1.22 | 1.00 |
| Tungsten | W | 74 | 183.84 | 0.402 | 4.44 | 19.3 | 85.69 | 0.96 |
| Zinc | Zn | 30 | 65.409 | 0.459 | 0.497 | 7.1 | 3.53 | 0.99 |

An example power budget for Compton backscattering is now described. The Klein-Nishina formula is [4]:

$$\frac{d\sigma_{KN}}{d\Omega} = \frac{r_e^2}{2}[1 + k(1 - \cos\theta)]^{-2}\left[1 + \cos^2\theta + \frac{k^2(1 - \cos\theta)^2}{1 + k(1 - \cos\theta)}\right]. \quad (51)$$

For Compton backscattering: θ=180°, so cos θ=−1, and Eq. (51) becomes:

$$\frac{d\sigma_{KN}}{d\Omega} = \frac{r_e^2}{2}(1 + 2k)^{-2}\left(2 + \frac{4k^2}{1 + 2k}\right) \quad (52)$$

where $r_e$ is the so-called classical electron radius [5]:

$$r_e = 2.8179 \cdot 10^{-15} \text{ m} = 2.8179 \cdot 10^{-13} \text{ cm} = 0.28 \cdot 10^{-12} \text{ cm} \quad (53)$$

where 1 barn=$10^{-24}$ cm²; so $$r_e^2 = 0.0795 \text{ barns} = 0.0795 \cdot 10^{-24} \text{ cm}^2 \quad (54)$$

Also, the k coefficient is [4]:

$$k = \frac{E_{ph}}{m_e c^2} = \frac{h\nu}{m_e c^2} = \frac{100 \text{ keV}}{0.511 \text{ MeV}} = 0.1957, \quad (55)$$

where $m_e$ is the rest mass of the election, so $$\frac{d\sigma_{KN}}{d\Omega} = \frac{r_e^2}{2}(0.516)\left(2 + \frac{0.0766}{1.39}\right) \quad (56)$$

$$= 0.53 r_e^2$$

$$= 0.53 \times 0.0795 \cdot 10^{-24} \text{ cm}^2$$

$$= 0.042 \cdot 10^{-24} \text{ cm}^2.$$

For example, for carbon and $E_{ph}$=100 keV, according to Table 4, μ=0.151 cm²/g, (Z/M)=0.499 g⁻¹, and $S_N$=1.00; so the differential reflectivity, is $$\frac{dR}{d\Omega} = \left(\frac{1}{2\mu}\right)\left(\frac{Z}{M}\right)(N_A)\left(\frac{d\sigma_{KN}}{d\Omega}\right)(S_N) \quad (57)$$

$$= (3.31 \text{ g/cm}^2)(0.499 \text{ g}^{-1})(6 \cdot 10^{23})(0.042 \cdot 10^{-24} \text{ cm}^2)(1)$$

$$= 0.416 \cdot 10^{23} \cdot 10^{-24}$$

$$= 0.0416,$$

where M refers atomic mass, not to magnification as it is used elsewhere herein.

Accordingly, in an embodiment where the aperture size is 1 mm and l=10 cm, $$\Delta\Omega \cong \left(\frac{1 \text{ mm}}{10 \text{ cm}}\right)^2 = 10^{-4}. \quad (58)$$

From Eqs. (57) and (58):

$$R = 0.0416 \cdot 10^{-4} = 4.16 \cdot 10^{-6}. \quad (59)$$

Because of the ignored exponential factor as in Eq. (46), this value is only approximate. However, this value provides a range of the magnitude of Compton backscattering reflection coefficients.

In some embodiments, an array of apertures as described herein may be used for imaging purposes. For example, a periodic aperture array comprises a plurality of apertures distributed in a periodic fashion. For simplicity of discussion, only the one-dimensional case with period Λ is described. However, this case can be directly generalized to the two-dimensional case, with periods: $\Lambda_x$ and $\Lambda_y$.

Figure 10:
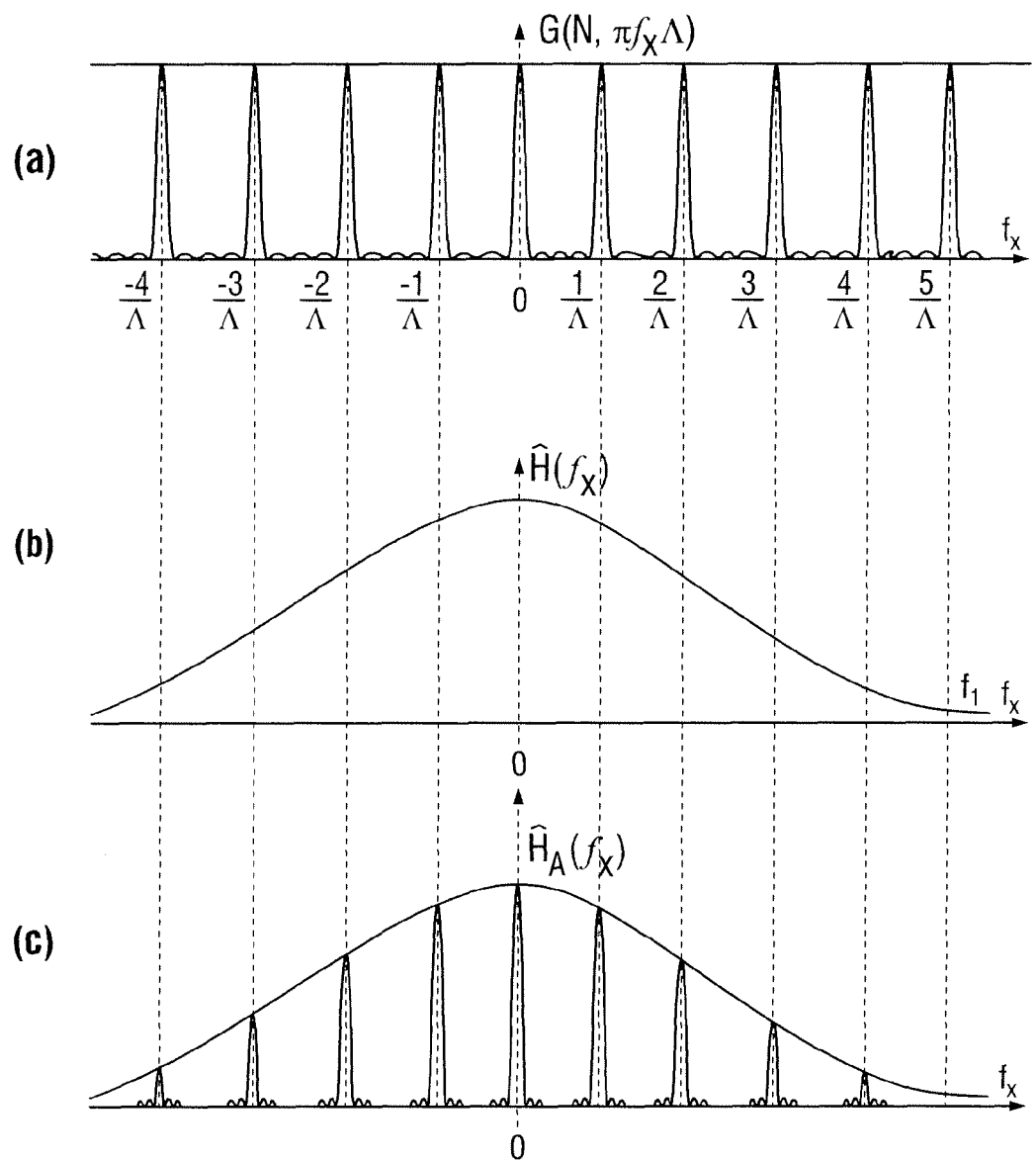
FIG. 10 illustrates the point response function for an array of apertures according to an embodiment of the invention.

In the case of a 1D periodic aperture array, the point response function, $h_A$, is $$h_A(x) = \sum_{n=-N/2}^{n=N/2} h(x - n\Lambda). \quad (60)$$

Where h(x) is point response function for a single aperture and n=−N/2, . . . −2, −1, 0, 1, 2, . . . N/2. In the embodiment described in Eq. (60), all aperture functions have the same profiles. The Fourier transform, is $$\hat{H}_A(f_x) = \hat{F}\{h_A(x)\} \quad (61)$$

$$= \sum_{n=-N/2}^{n=N/2} \hat{H}(f_x)\exp[-j2\pi(f_x \cdot n \cdot \Lambda)]$$

$$= \hat{H}(f_x) \sum_{n=-N/2}^{n=N/2} \exp[-j2\pi(f_x \cdot n \cdot \Lambda)]$$

$$= \hat{H}(f_x) \frac{\sin(N\pi f_x \Lambda)}{\sin(\pi f_x \Lambda)}$$

$$= \hat{H}(f_x) G(N, \pi f_x \cdot \Lambda)$$

where $$G(N, x) = \frac{\sin(Nx)}{\sin x} \quad (62)$$

where $G(f_x) = \hat{F}\{h(x)\}$, and h(x) is the point response function for a single pinhole aperture, such as Eq. (17), or for a Gaussian aperture, as in Eq. (28). Function (62) is illustrated in FIG. 10(a). As illustrated, this function is periodic with period $\Lambda^{-1}$. The secondary maxima are reduced with increasing N. In FIG. 10(b), the single aperture transfer $\hat{H}(f_x)$, for an embodiment employing a Gaussian aperture is shown. Here, for ease of discussion, the system de-magnification is set equal to unity (M=1).

In FIG. 10(c), the periodic aperture array transfer function, $\hat{H}_A(f_x)$, is shown. As illustrated, this function is well defined only for discrete spatial frequencies: $f_{x_n} = \Lambda^{-1}$. Therefore, the image intensity, $I_i(x)$ does not remain the object function, but is only a synthetic version, filtered through the aperture transfer function, $\hat{H}_A(f_x)$.

In some embodiments, the object intensity function $I_0(x)$, may be reconstructed. For example, by using an inverse Fourier transform procedure based on the following discrete equation:

$$\hat{I}_i(f_{x_n})\square\hat{H}_A^{-1}(f_{x_n})=\hat{I}_0(f_{x_n}); f_{x_n}=\Lambda_n^{-1}, \quad (63)$$

where $$\hat{I}_i(f_{x_n})=\hat{F}\{I_i(x)\}|_{\{f_x=f_{ym}\}} \quad (64)$$

the Fourier transform of image intensity function, $I_i(x)$, at discrete frequencies: $f_x = f_{x_n}$. After applying the Shannon-Whittaker sampling theorem, $I_0(x)$ is obtained to by an inverse Fourier transform operation. In these embodiments, this function must be real valued, so Im$\{I_0(x)\}=0$ for any x-value.

Figure 11:
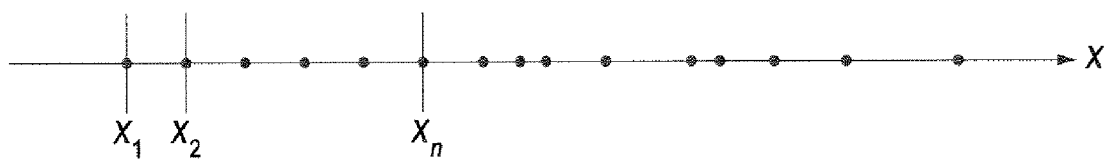
FIG. 11 illustrates a one-dimensional aperiodic aperture array according to an embodiment of the invention.

Other embodiments may employ pluralities of apertures deployed in an aperiodic array. Such an aperiodic aperture array is illustrated in FIG. 11. Here, for the nth-aperture:

$$h_n(x)=h(xx_n), \text{ and} \quad (65)$$

$$h_A(x) = \sum_{n=1}^{N} h_n(x), \quad (66)$$

but Equation (60) is not satisfied, and $$\hat{H}_n(f_x)=\hat{H}(f_x)\exp(-j2\pi f_x \cdot x_n) \quad (67)$$

i.e., $\hat{H}(f_x)$ is still identical for each aperture because of the space invariance condition, and $$\hat{H}_A(f_x) = \sum_{n=1}^{N} H_n(f_x) = \hat{H}(f_x) \sum_{n=1}^{N} \exp(-j2\pi f_x \cdot x_n) = \hat{H}(f_x)G(f_x); \quad (68)$$

$$G(f_x) = \exp(-j2\pi f_x \cdot x_n)$$

and the Fourier transform of the image intensity function, is $$\hat{I}_i(f_x)=\hat{H}_A(f_x)\hat{I}_0(f_x), \quad (69)$$

while the inverse Fourier transform is $$\hat{I}_0(f_x)=\hat{I}_i(f_x)\hat{H}_A^{-1}(f_x)=\hat{I}_i(f_x)\hat{H}^{-1}(f_x)\hat{G}^{-1}(f_x). \quad (70)$$

In order to compute Eq. (70), first, the Fourier transform of $I_i(x)$, is computed in the form:

$$\text{Re}\{I_i(x)\} = \int_{-\infty}^{+\infty} I_i(x)\cos(2\pi f_x \cdot x)dx, \quad (71)$$

$$\text{Im}\{I_i(x)\} = -\int_{-\infty}^{+\infty} I_i(x)\sin(2\pi f_x \cdot x)dx, \quad (72)$$

and, $$\hat{I}_i(f_x)=R_e\{I_i(x)\}+jIm\{I_i(x)\}. \quad (73)$$

In embodiments employing arrays of Gaussian apertures, there are no zeroes of the $\hat{H}^{-1}(f_x)$-function. However, the function, $\hat{G}^{-1}(f_x)$ can have zeroes. In order to avoid these zeroes ("ZEROS") or at least minimize them ("ALMOST-ZEROS"), the $\hat{G}(f_x)$-function in complex-variable space may be specially designed. According to Eq. (68), the function is a superposition of exponential functions, in the form:

$$\hat{G}_n(f_x)=\exp(-j2\pi f_x \cdot x_m). \quad (74)$$

For a given $f_x$, this function is a complex number in the form:

$$\hat{Z}_{mo}=\hat{G}_m(f_{x0}). \quad (75)$$

Figures 12A, 12B:
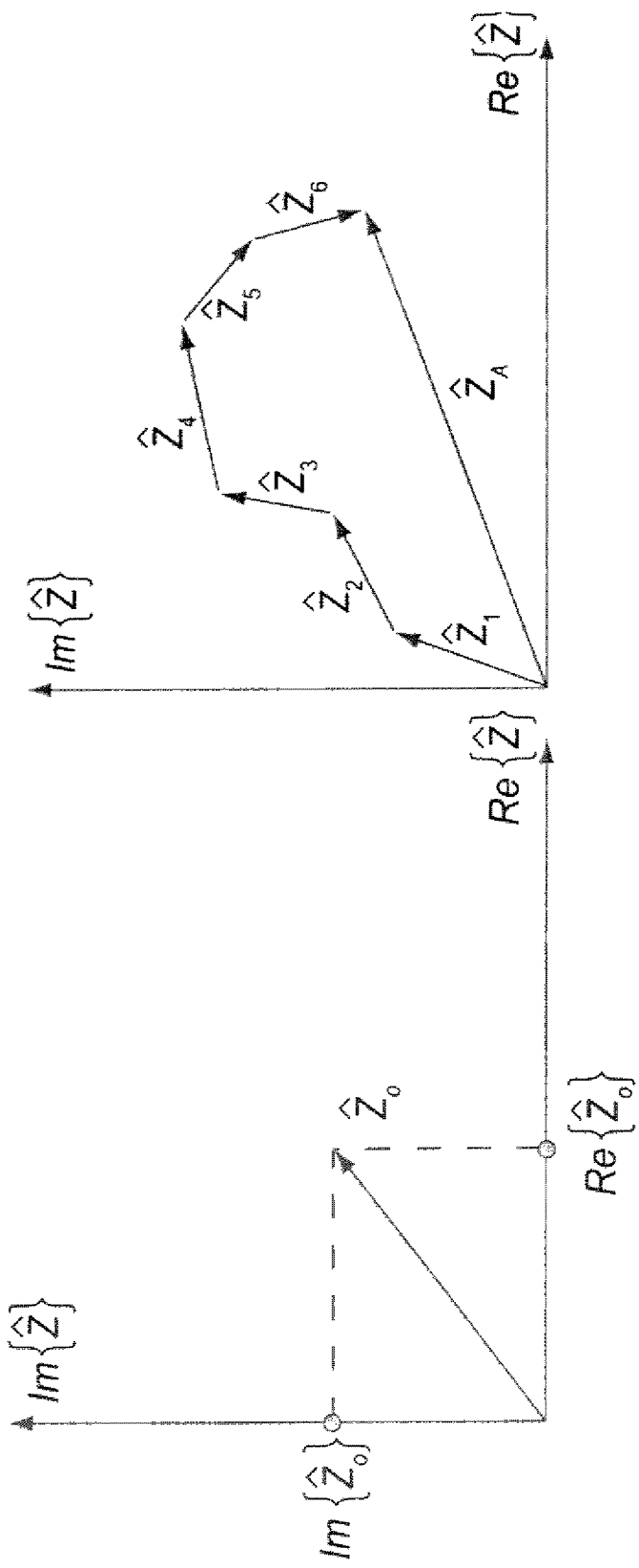
FIG. 12 illustrates an example of phasor addition of exponential functions formed from an aperiodic aperture array according to an embodiment of the invention.

A complex number may be represented in the vector form, or "phasor form", as shown in FIG. 12(a). These numbers may be added in the same way as vectors, as shown in FIG. 12(b). For purposes of illustration, a ZERO is created in the following simple example, with two conjugated phasors, obtained from $\hat{G}_n(f_x)$ functions, in the form:

$$\hat{G}_1(f_x,0)+\hat{G}_2(f_x,x_2)=1+\exp(-j2\pi f_x \cdot x_2)=\exp(-j\pi f_x \cdot x_2) \\ [\exp(j\pi f_x \cdot x_2)+\exp(-j\pi f_x \cdot x_n)]=2\exp(-j\pi f_x \cdot x_2)\cos(\pi f_x \cdot x_2) \quad (76)$$

where $\hat{G}_1(f_x,0)=\exp(-j2\pi f_x \cdot 0)=1)$ and the first $\hat{G}_n$ function has been deter wined for $X_1=0$, and the second one for $X_2$. By excluding the $\exp(-j\pi f_x \cdot x_2)$ factor, addition of two conjugated functions is obtained, as shown in Eq. (76). This situation is shown in FIG. 13, where, in FIG. 13(a), the first form is shown, while in FIG. 13(b), the second form is shown. In both cases, ZEROS are obtained for some $f_x$-values. In this figure: $\phi=(-2\pi f_x \cdot x_2)$. These ZEROS may be eliminated through the addition of a constant factor into one of these functions.

In an example of ZEROS elimination, Eq. (76) may be modified into the form:

$$\hat{G}_1(f_x,0)+\hat{G}'_2(f_x,x_2)=1+A_2\exp(-j2\pi f_x \cdot x_2); A_2<1. \quad (77)$$

where $A_2$ is positive constant, such that: $A_2<1$ (or, more generally, $A_2 \neq 1$).

Figure 14:
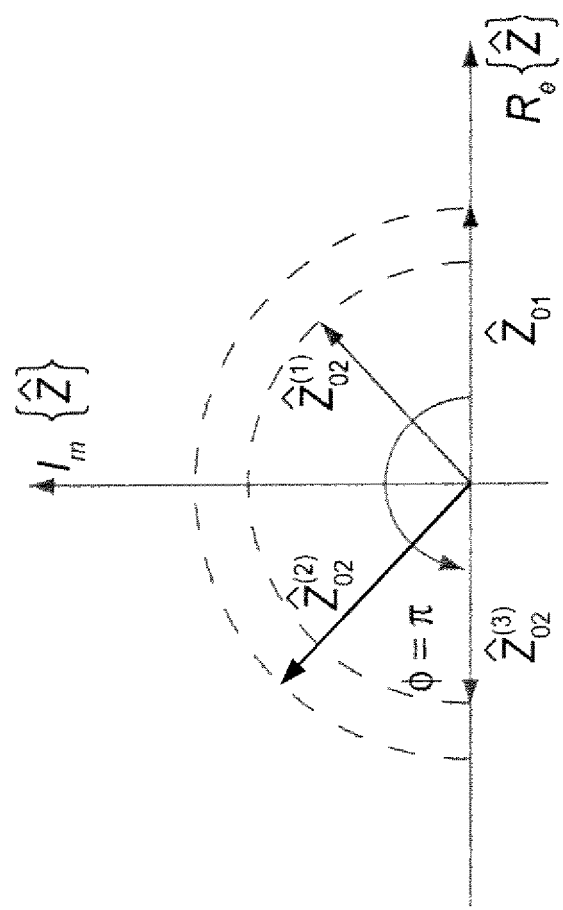
FIG. 14 illustrates another example of phasor addition of exponential functions formed from the aperiodic aperture array according to an embodiment of the invention.

FIG. 14 illustrates the modification of Eq. (76) into Eq. (77), where the $\hat{G}_2$ function is replaced by the $\hat{G}'_2$ function with extra and positive factor $A_2<1$. Then, instead of FIG. 13(a), for $\phi=\pi$, $\hat{G}_1+\hat{G}'_2 \neq 0$, and there is no ZERO.

In some embodiments, the thickness of the aperture array may be increased so that such a constant factor may be added. For example, such increased thickness may comprise 20% of the total thickness of the aperture array. In these embodiments, the exponential $G_n$ function will have a modified form of Eq. (74):

$$\hat{G}_n^{(A)}(f_x) = A_n \exp(-j2\pi f_x \cdot x_n); A_n < 1, \quad (78)$$

and, instead of Eq. (68), the following equation results, where $A_n \leq 1$ for all n:

$$\hat{G}^{(A)}(f_x) = \sum_{n=1}^{N} A_n \exp(-j2\pi f_x \cdot x_n). \quad (79)$$

Figure 15:
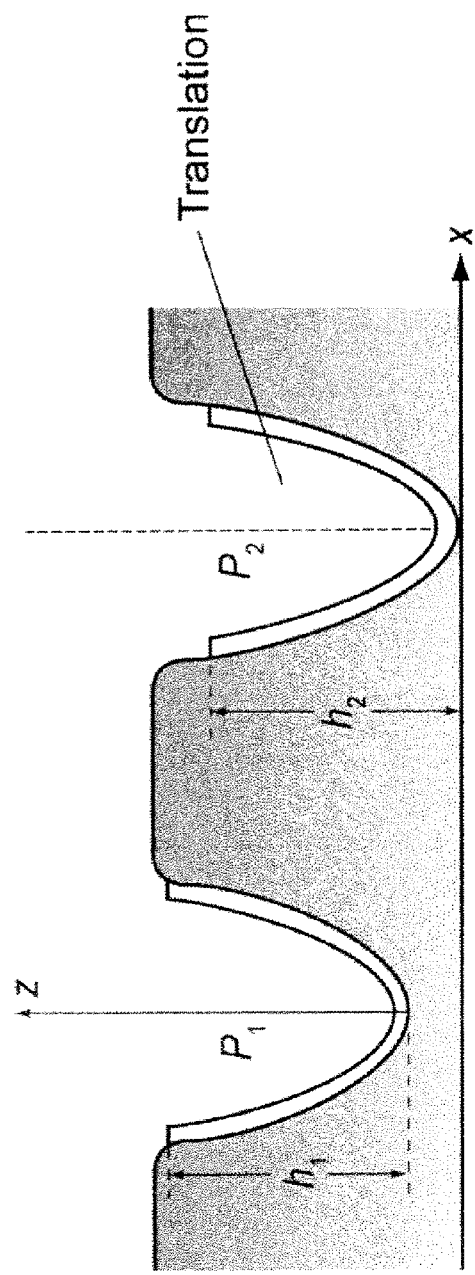
FIG. 15 illustrates a depth variation for an aperture array according to an embodiment of the invention.

FIG. 15 illustrates a two-dimensional thickness profile of a portion of an aperture array according to an embodiment of the invention. As FIG. 15 illustrates, such an array may comprise a plurality of apertures having substantially identical profiles of their $\hat{H}(f_x)$-functions, e.g. $P_1 = P_2$ and $h_1 = h_2$. To introduce $A_n$ factors, as described herein, a subset of the apertures may be vertically translated. Through this vertical translation $A_n$-factors are introduced into Eq. (79) and ALMOST-ZERO and ZERO regions are reduced or eliminated from the $\hat{G}^{(A)}(f_x)$-function. Therefore, the Fourier inverse procedure will become well-defined. In various embodiments, this procedure is generalized to reducing fluctuating terms in the $(f_x, f_y)$-regions of the $\hat{G}^{(A)}$ function, within the area satisfying the following condition:

$$f_x^2 + f_y^2 < f_1^2, \quad (80)$$

where $f_1$-frequency is the cutoff frequency, for example, as described in Eq. (31) for the 2D-case or as described elsewhere. This is the cutoff spatial frequency of the $\hat{H}(f_x)$ Gaussian function, as defined by Eq. (30). This analysis may be generalized into the case of $M \neq 1$, as in Eq. (37).

Figure 16:
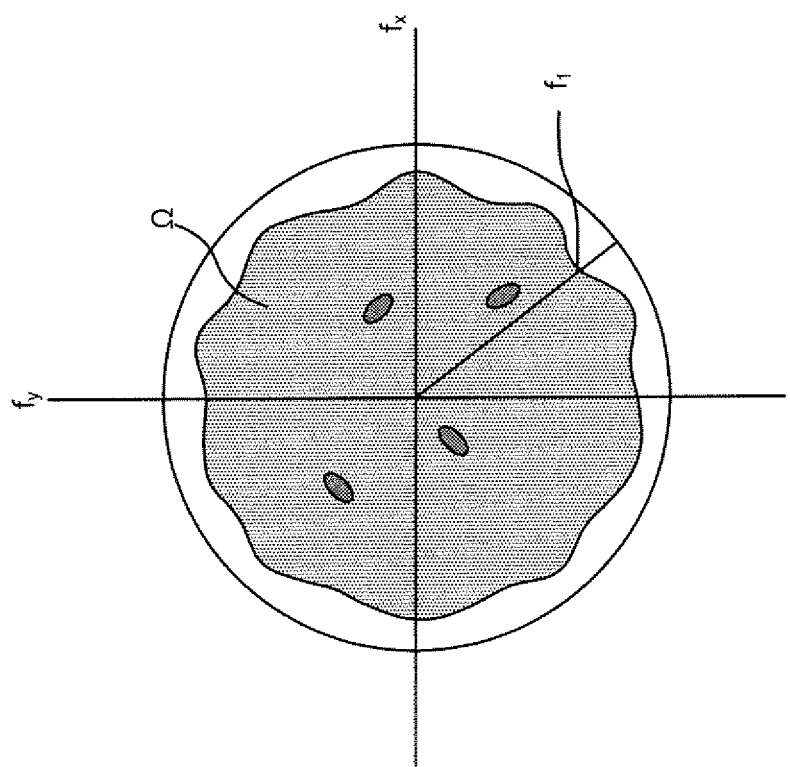
FIG. 16 illustrates a spatial frequency domain, $\Omega$, of a real scaled object intensity Fourier transform, $\hat{I}_0(f_x,f_y)$, within the existence of a single aperture Gaussian transfer function, $\hat{H}(f_x,f_y)$, with cutoff frequency $f_1$.

In general, the ALMOST-ZERO and ZERO regions of the $\hat{G}^{(A)}(f_x)$-function may be reduced or eliminated within the area defined by Eq. (80). FIG. 16 illustrates a spatial frequency domain, $\Omega$, of a real scaled object intensity Fourier transform, $\hat{I}_0(f_x, f_y)$, within the existence of a single aperture Gaussian transfer function, $\hat{H}(f_x, f_y)$, with cutoff frequency $f_1$. A well-defined inverse Fourier transform procedure may be obtained from reduction of the ZERO, or ALMOST-ZERO regions (double-hatched area) of the $\hat{G}^{(A)}(f_x)$-function.

An example method for minimizing the ZEROS and ALMOST ZEROS regions of the $\hat{G}^{(A)}(f_x, f_y)$-function according to a particular embodiment of the invention may be summarized as follows. First, by optimizing the adjustment of the of $x_n$-locations and $A_n$-values the ZEROS and ALMOST ZEROS of $\hat{G}^{(A)}(f_x, f_y)$-function may be minimized or reduced. Second, the ZEROS or ALMOST-ZERO regions may be isolated, as illustrated in FIG. 16. Third, the relation $\hat{F}\{I_i(x,y)\} = \hat{I}_i(f_x, f_y)$ may be calculated. Fourth, $\hat{I}_0(f_{x0}, f_{y0}) = \hat{I}_i(f_{x0}, f_{y0}) \hat{H}^{-1}(f_{x0}, f_{y0}) \cdot \hat{G}^{-1}(f_{x0}, f_{y0})$, may be computed for all $(f_{x0}, f_{y0})$-values within $f_{x0}^2 + f_{y0}^2 < f_1^2$ and outside the ZERO and ALMOST-ZERO regions. Fifth, a mathematical smoothing procedure may be used to analytically extend, or cover, the $\hat{I}_0$-function, including the ZERO and ALMOST-ZERO regions. Sixth, $\hat{F}^{-1}\{\hat{I}_0(f_x, f_y)\} = I_0(f_x, f_y)$ may be calculated. Seventh, the correctness of the iteration comprising steps one through six may be checked using the conditions $\text{Im}\{I_0(x,y)\} \equiv 0$ and $\text{Re}\{I_0(x,y)\} \geq 0$. Eighth, the results may be used to provide a feedback correction to step one such that the seven steps may be iteratively repeated until $$\int \int_{\Omega} |\text{Im}\{I_0(x, y)\}| dx$$

is minimized. If the convergence time is too long, the initial design of the $\hat{G}(f_x, f_y)$-function may be repeated, according to Step 1 and the method may be restarted.

Figure 17A:
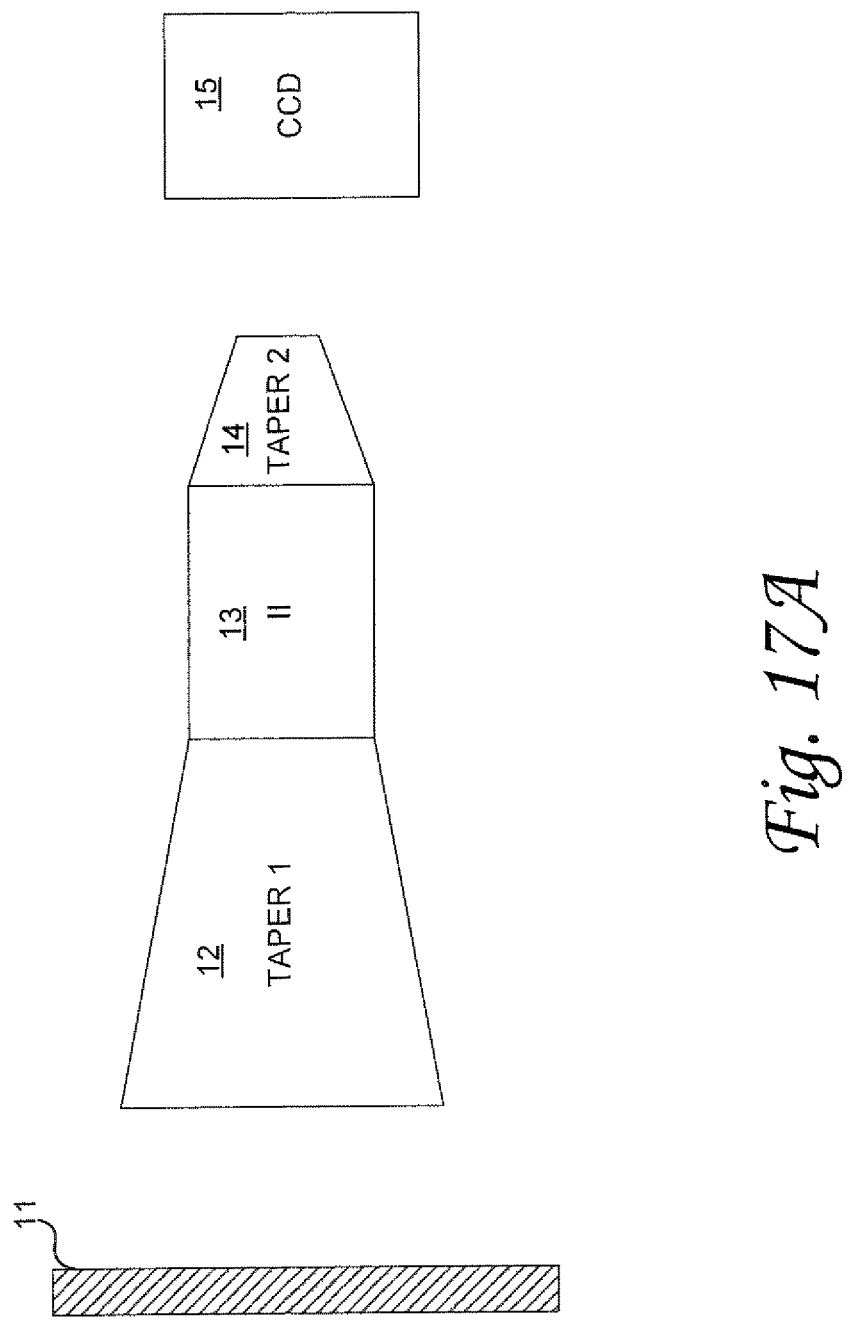
FIG. 17A illustrates an x-ray detector subsystem according to an embodiment of the invention.

FIG. 17A illustrates a device detector subsystem according to an embodiment of the invention. The subsystem comprises a fluorescent medium 11; a taper 1, 12; and image intensifier, 13; a taper 2, 14; and a CCD camera 15. The fluorescent medium comprises a component that produces visible light when impacted with x-rays. In some embodiments, the fluorescent medium may comprise a fluorescent thin film (fabricated by Kodak, for example) 11. In other embodiments, the fluorescent component 11 may comprise a plate or other component comprising a series of through-holes filled with a fluorescent material. The light signatures are transmitted by tapered 12 and 14 and amplified by amplifier 13 and transmitted to a CCD imaging device 15. In some embodiments, image intensifier 13 may comprise a scintillator configured to minimize the point spread between the first taper 12 and the second taper 14. For example, a terbium-activated scintillating fiber optic faceplate may be used for this purpose.

Figure 17B:
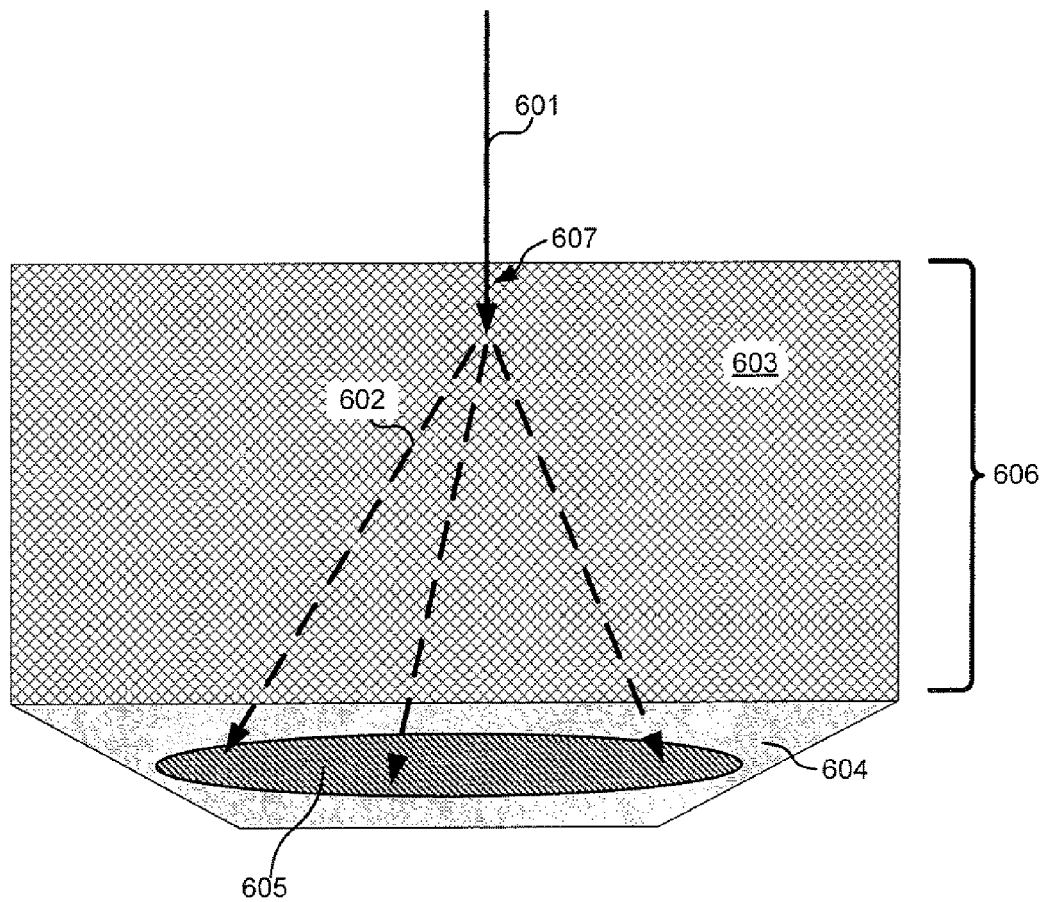
FIG. 17B illustrates a fluorescent film implemented in accordance with an embodiment of the invention.

FIG. 17B illustrates a fluorescent film implemented in accordance with an embodiment of the invention. The fluorescent film illustrated in this embodiment comprises a layer or plate of material 603 that fluoresces when impacted by x-rays. As illustrated, an x-ray 601 impinging the fluorescent material 603 may travel some distance 607 before it causes the fluorescent material to fluoresce to produce optical photons 602. In typical embodiments, the visible photons produced will lie in a generally forward direction, so that visible light 605 is emitted from the film at surface 604. This light may be emitted from an area 605 on the surface 604, as shown in the perspective illustration of FIG. 17B. In typical fluorescent materials, increasing the thickness 606 of the film increases the light area 605, for example because photons produced near the impinging surface have greater distance to spread. As the visible light is captured by a CCD for x-ray imaging, an increasing light area 605 may result in a decreased resolution, or a decreased ability to capture the emitted visible photons. Furthermore, as the energy of x-ray 601 increases, it penetrates before fluorescing, and the depth 607 also increases. Accordingly, a film thickness that is too small may result in x-ray passing through the material without fluorescing. In some embodiments, the thickness of the film or material used for the film may be configured according to typical x-ray energies that may be encountered or for predetermined resolution requirements. For example, in a particular embodiment, the film comprises a polymer film having a 600 μm thickness, which will produce a light with a spot diameter of about ~600 μm in typical environments.

Figure 17C:
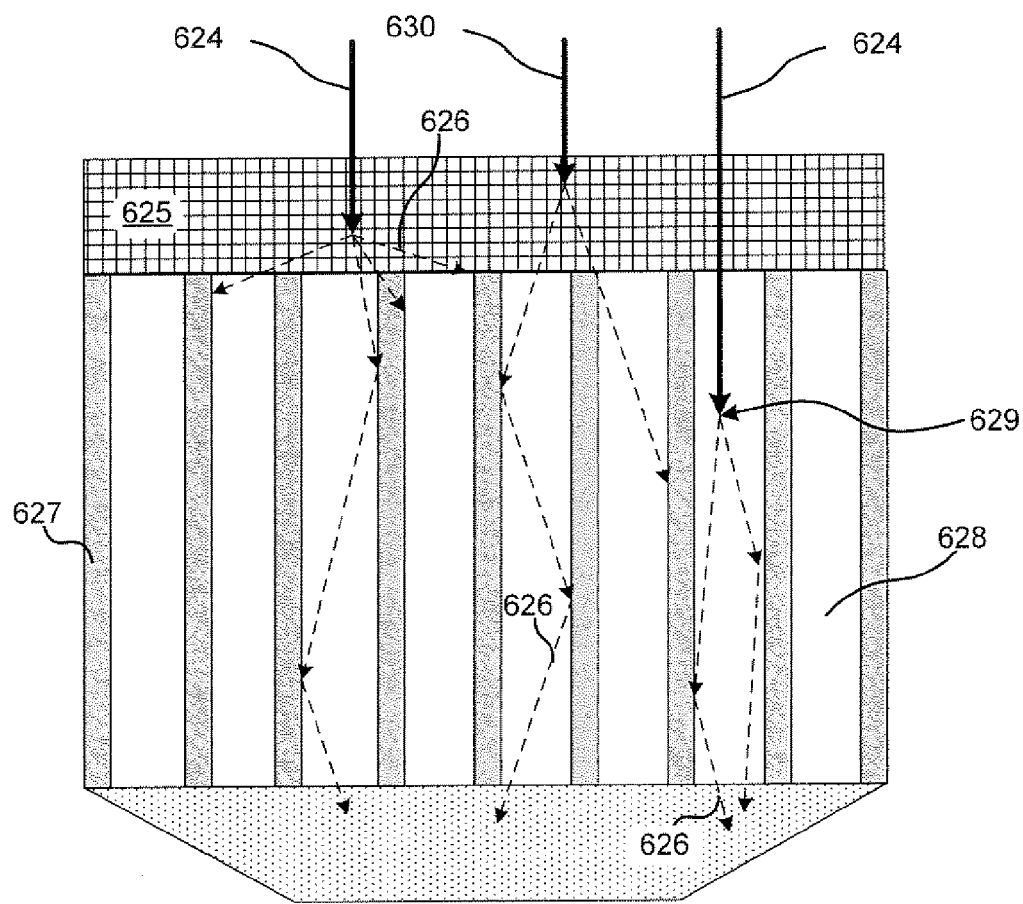
FIG. 17C illustrates a fiber-optic scintillator implemented in accordance with an embodiment of the invention.

FIG. 17C illustrates a fiber-optic scintillator implemented in accordance with an embodiment of the invention. In some embodiment, rather than, or in addition to, a fluorescent film as described with respect to FIG. 17B, a fiber-optic based scintillator may be used to produce visible photons. In the illustrated embodiment, a fluorescent material 625 may comprise a fluorescent material such as phosphor. This fluorescent material may be more fluorescent than a polymer based material, but may have a greater spread for produced visible photons 626. Accordingly, a fiber optic layer comprising fibers 628 and absorption fibers 627 may be provided to reduce the light spread. In further embodiments, the fibers 628 may be doped with a secondary fluorescent material, to capture x-rays 624 that otherwise pass through material 625 without fluorescing, as illustrated by event 629. For example, the fibers 628 may be doped with a predetermined amount of terbium (Tb). In a particular embodiment, the material layer 625 comprises a phosphor layer having a thickness between about 50 and 100 µm and a particle size of about 1 to 10 µm. In this particular embodiment, the fiber optic layer is between about 1 to 25 mm thick, with fiber diameters of about 10 µm. As illustrated by the photons created from x-ray 630, in some cases, a single x-ray can produce photons that travel through multiple fibers. Accordingly, although a fiber-optic scintillator may produce increased resolution over a similar fluorescent film, there may still be spread in light produced by the scintillator that is greater than a diameter of a fiber.

In some embodiments, when the imaging system of FIG. 17A is used to capture high energy particles (hard x-rays), to enhance the capture probability of the particles, the thin film scintillator plate 11 can be replaced by a thick structural plate consisting of a series of through holes filled with florescent material that together produce a high resolution visible light signature when impacted by particle beams or x-rays. The plate 11 can be made of any structural material that is either fully reflective of the visible light signature created by the florescent material or has an index of refraction sufficiently lower than the florescent material that total internal reflection of the light occurs in the florescent material and the visible light exits only at the exit holes on the rear face of the thick structural plate 11.

Figure 17D:
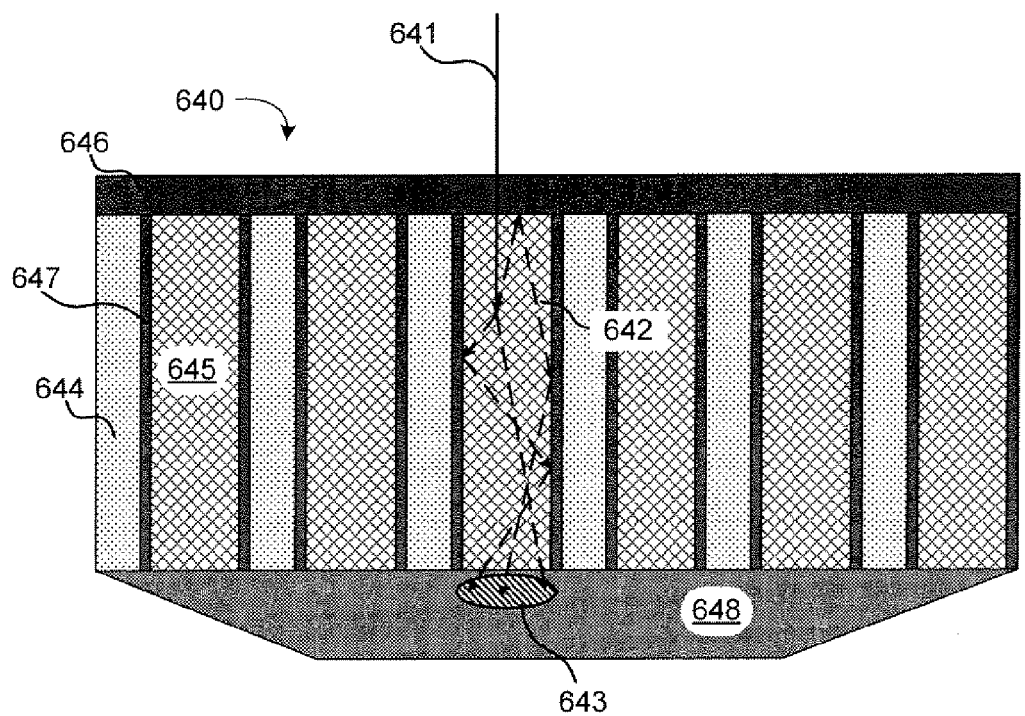
FIG. 17D illustrates a microchannel plate scintillator implemented in accordance with an embodiment of the invention.
Figure 17E:
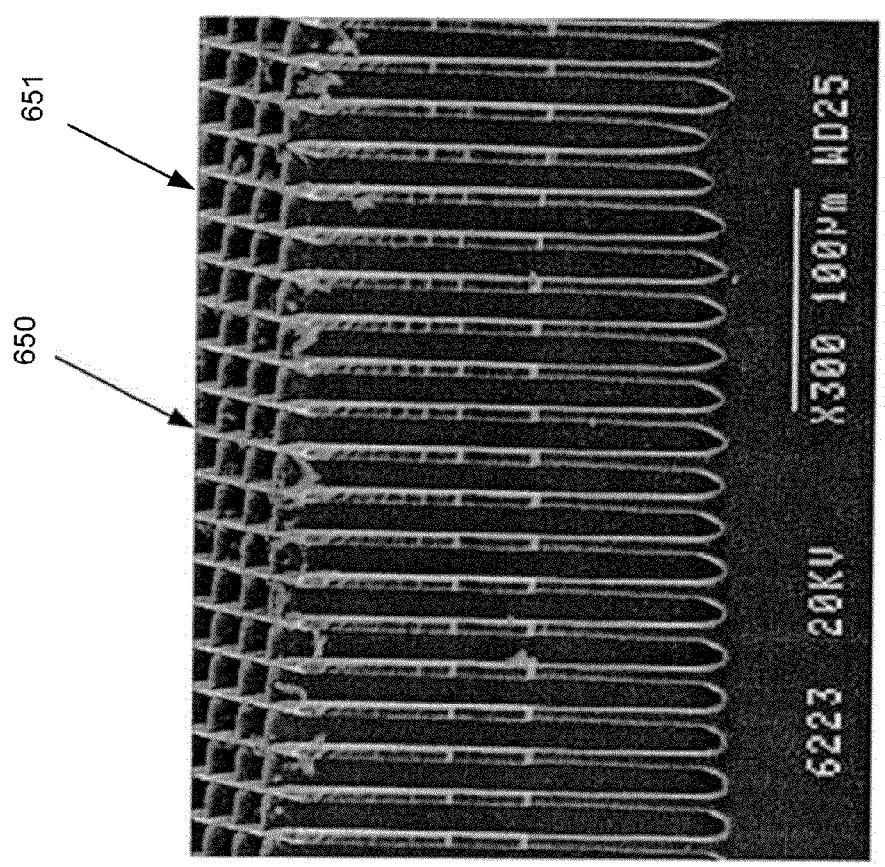
FIGS. 17E-H are a collection of scanning electron micrographs (SEMs) illustrating a particular microchannel scintillator implemented in accordance with an embodiment of the invention.
Figure 17F:
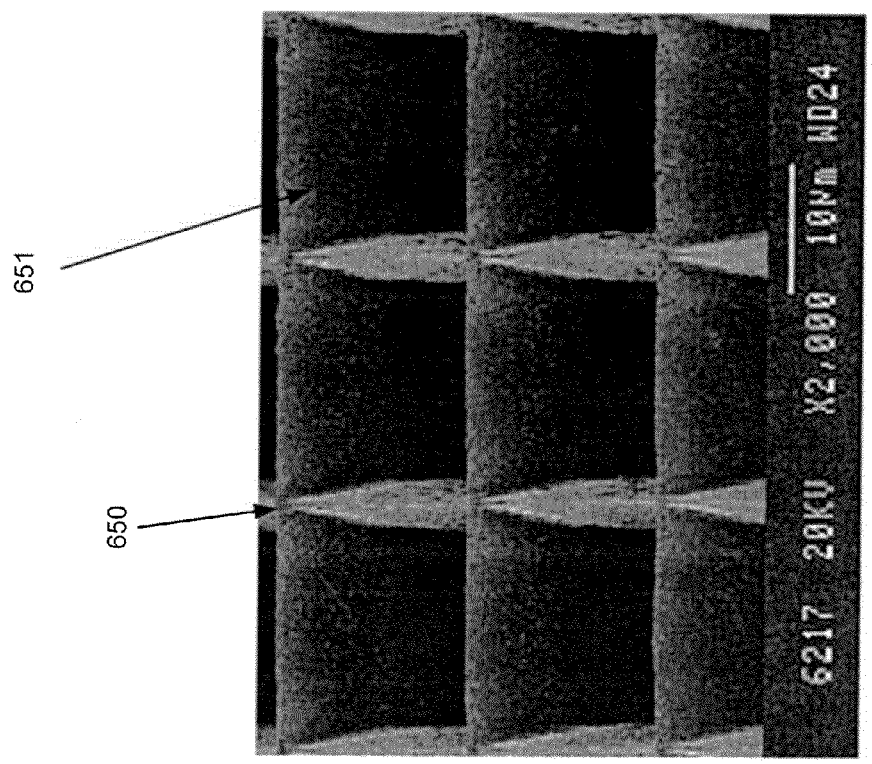
Figure 17G:
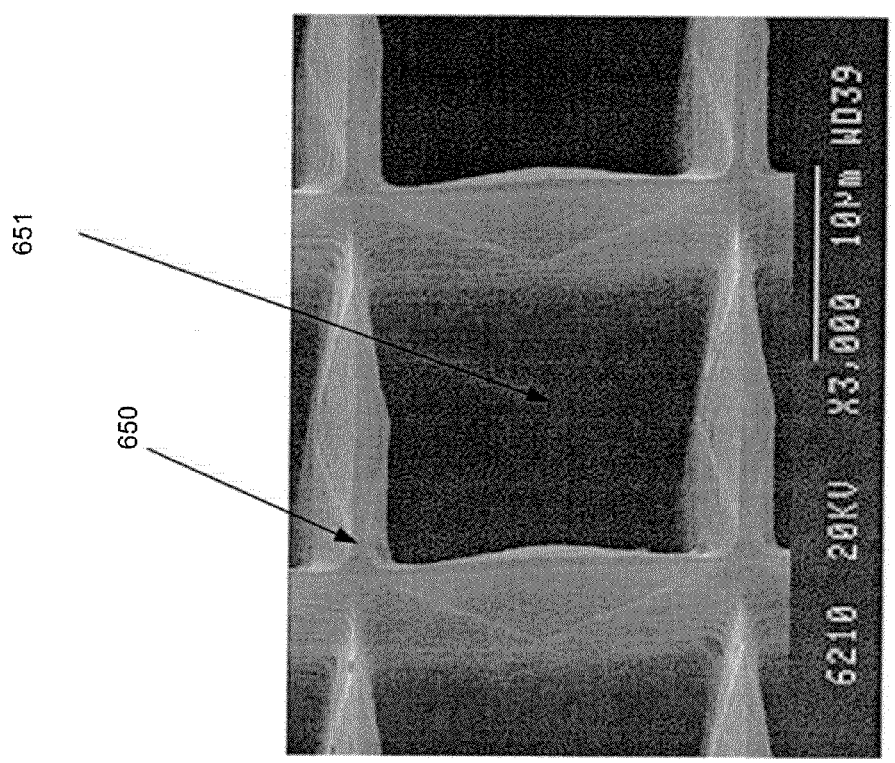
Figure 17H:
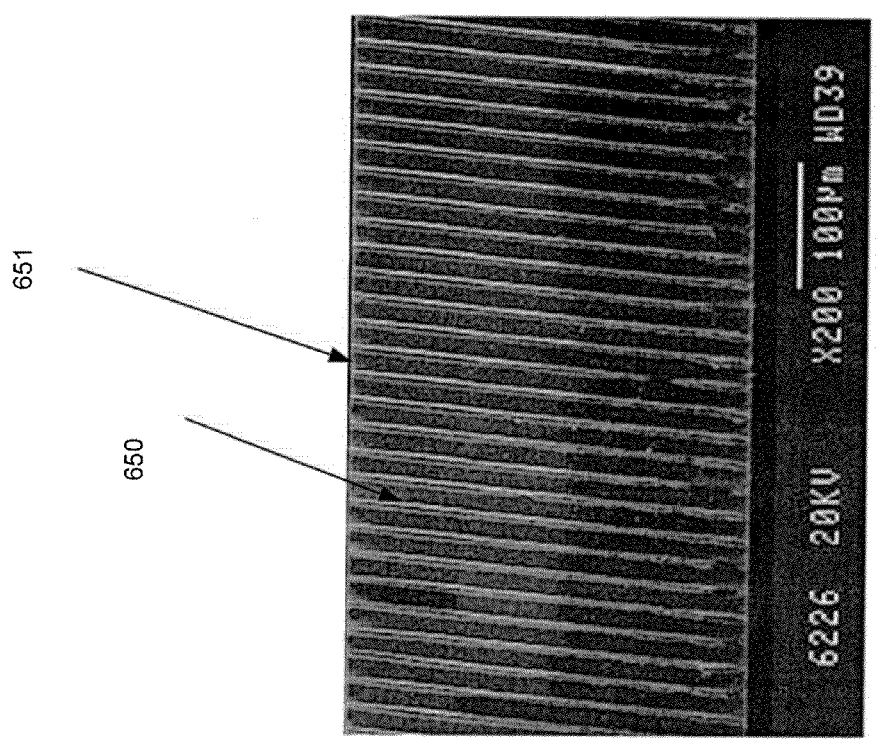

FIG. 17D illustrates a microchannel plate scintillator implemented in accordance with an embodiment of the invention. For example, this microchannel plate scintillator may be used as such a thick structural plate. In the illustrated embodiment, the scintillator 640 comprises a substrate material 644 that is etched with a plurality of through holes 645. For example, an electrochemical anisotropic etching process may be performed on a silicon substrate to generate through holes 645. In the illustrated embodiment, the holes 645 are then coated with a material, for example with a reflective metal such as aluminum using vapor deposition. The reflective holes may then be filled with a scintillating material, such as Tb-doped oxide or Tl-doped cesium iodide for example. In further embodiments, the material used may be configured according to x-ray energies that the embodiments will be used to image. In some embodiments, a reflective material 646 may also be provided on the impinging surface to retain visible photons, as described below. When an x-ray 641 impinges on the scintillator, it enters a through hole 645 and therefore interacts with the scintillating material to form visible photons 642. The reflective walls 647 and, if present, the reflective material 646 cause the visible photons to exit the scintillator at area 643 on the emitting surface 648, as illustrated in perspective in FIG. 17D.

In one example of this, a thick silicon microchannel plate can be used as the structure of 11 with for example cesium iodide completely filling the through holes in the silicon plate. In addition, if the silicon microchannel plate is etched from both sides using an electrochemical anisotropic etching process shown in FIG. 17J, the thickness of the plate 11 (FIG. 17A) can be made to be sufficient to capture and image x-ray photons at energies in excess of 100 keV. In this embodiment of the imaging system 17, high energy particle beams of any type can be imaged at high resolution by selection of the proper fluorescent material to fill the through holes in the thick structural plate 11 in FIG. 17A. In a particular embodiment, a scintillator with a depth of about 300-600 µm, with holes 645 having diameters of about 10 µm, and substrate walls 644 about 2 µm thick, produces a light area 643 having a diameter of about 10 µm. FIGS. 17E-17H are a collection of scanning electron micrographs (SEMs) illustrating one such microchannel scintillator. In these SEMs, the substrate walls are illustrated with reference number 650, while the through holes are illustrated with reference number 651.

In further embodiments, the imaging detector used in the embodiment may comprise a plurality of such subsystems. In these embodiments, the subsystems may be disposed in a variety of configurations. For example, in an embodiment where the detector and source are disposed as described with respect to FIGS. 27A and B, one or more of such subsystems may be disposed at the end of a corresponding number of x-ray opaque tubes. As described herein, this configuration may reduce the number of incident noise x-rays created by scattering off of clutter disposed between the source and the object to be imaged.

Figure 17I:
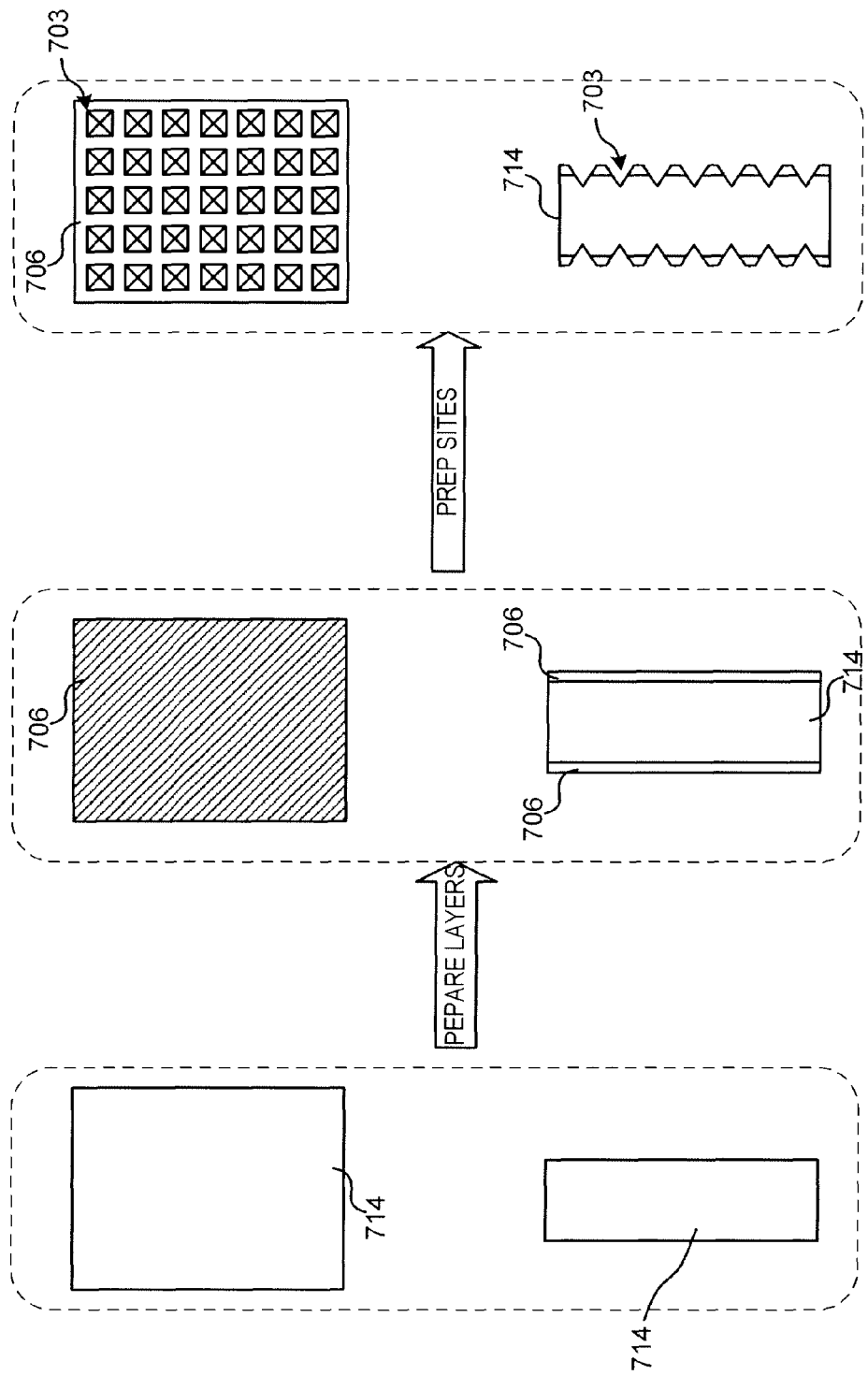
FIG. 17I illustrates a preprocessing sequence for silicon substrate for use in a double-side etching reactor according to an embodiment of the invention.
Figure 17J:
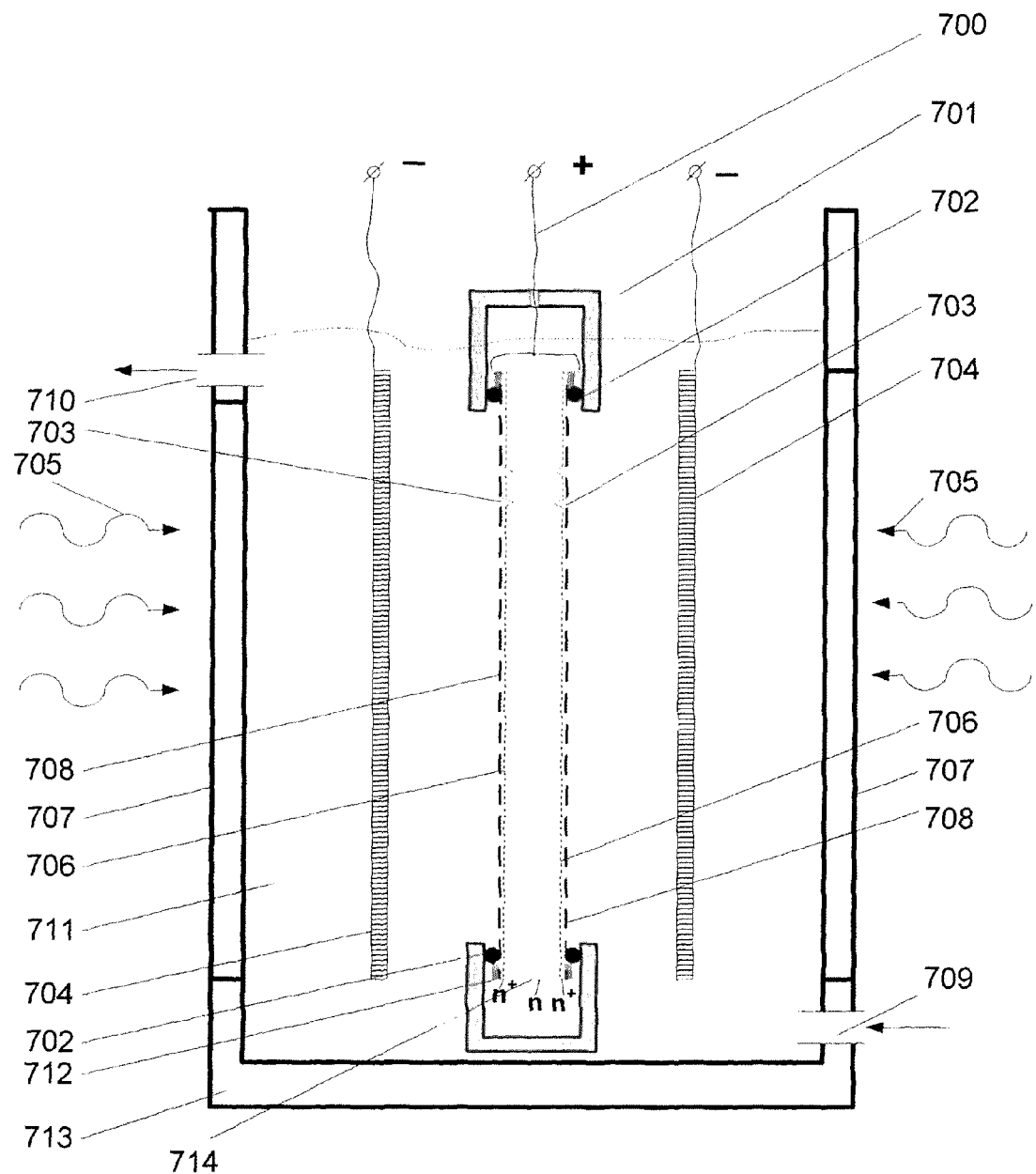
FIG. 17J illustrates an etch reactor according to an embodiment of the invention.
Figure 17K:
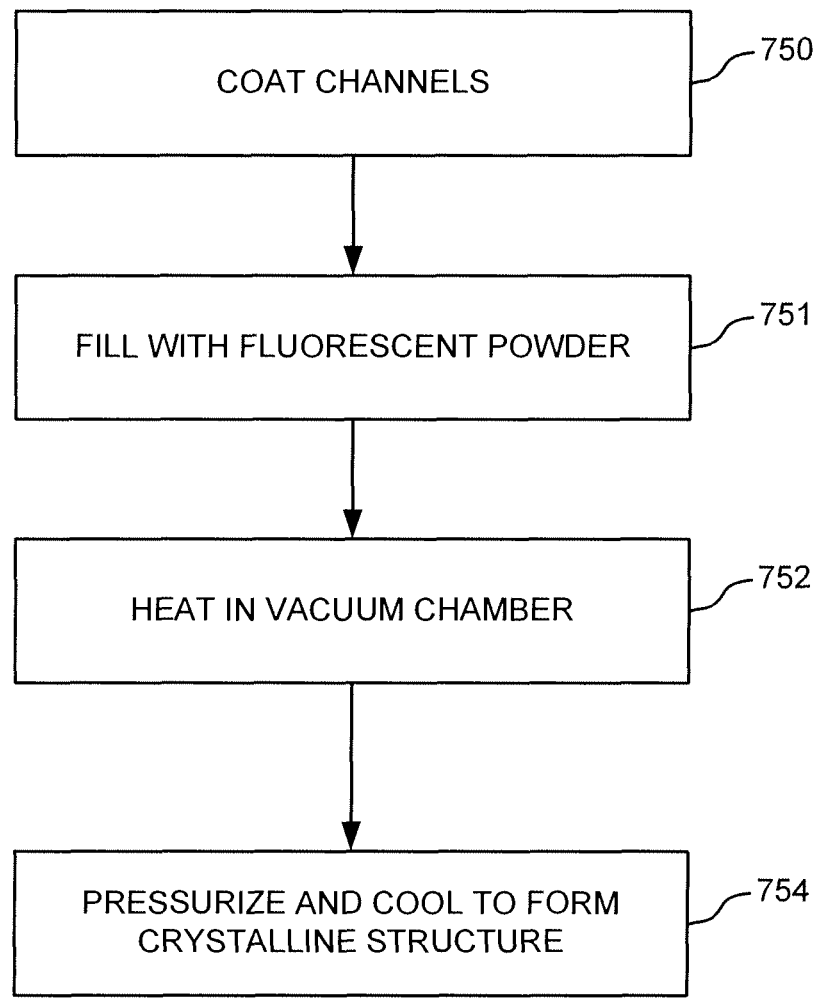
FIG. 17K illustrates a method for filling a microchannel array with a scintillating material according to an embodiment of the invention.

As described herein, in some embodiments, x-ray imaging may performed using a microchannel scintillator created from a silicon wafer. FIGS. 17I-17K illustrate methods and apparatuses for creating such scintillators. The methods described with respect to FIGS. 17I-17K allow for the creation of microchannel wafers through a double-sided etch process. These methods may be used in any situation where microchanneled wafers may be employed. For example, in addition to their use in scintillators, they may be used as microchannel plates for use in photomultiplier tubes, in chemical reactors, such as platinum coated catalysts, or in any other process were long channels of this type are beneficial. Some conventional methods for creating holes or channels in semiconductor may be limited to certain thicknesses, for example 200-300 microns. Although this may be sufficient for some embodiments, in other embodiments, scintillators may preferably have depths greater than 300 microns, such as 300-1000 microns. The use of the double-sided etching process described herein may enable these longer channels to be created.

In the etching process described with respect to FIGS. 17I-17K, an anisotropic electrochemical etching process is used. In the main wet etching process, an n-type silicon wafer positively biased to provide for an anodic dissolution of silicon at the microchannel locations. A basic electrochemical wet etching process may be as follows: (1) holes are generated in the silicon substrate to remove Si-atoms by anodic dissolution and formation of $SiF_4$; (2) $Si(OH)_2^{2+}$ forms on the surface of the wafer; (3) the $Si(OH)_2^{2+}$ reacts with an agent in the etching solution; and (4) the reaction products are removed into the solution and gaseous atmosphere.

FIG. 17I illustrates a method for preprocessing silicon wafers to etching procedure according to an embodiment of the invention. In the first step, an n-type silicon wafer 714 is obtained. Next, the wafer 714 is prepared for the first etching process. In these embodiments, the wafer 714 may be doped on both sides with phosphorous (P) to provide two $n^+$ layers 706 on the wafer 714. In some embodiments, these $n^+$ layers may improve the contact resistivity during the etching process, so the doping may occur only where the positive bias contact will be made. In other embodiments, the $n^+$ layer may further facilitate other aspects of the etching process an may be present on the entireties of the wafer surfaces. In other embodiments, the prepared layers 706 may comprise other doped material layers. For example, as described below, in some embodiments, a negative electrode may be in direct contact with the wafer during the etching process. In these embodiments, layers 706 may comprise layers of an electrically insulating material, such as $Si_3N_4$. In the next step, etching sites 703 are prepared, for example, using photolithography and wet etching in KOH. In some embodiments, the etching sites 703 are determined according to the eventual use of the etched wafer. For example, to create a microchannel array of the type illustrated in FIGS. 17E-17H, the etching sites 703 may comprise inverted pyramidal pits spaced in a rectilinear grid according to the desired locations and distributions of the microchannels. In other embodiments, the etching sites 703 might be spaced in other patterns according to use, or in other shapes, such as extended voids for example. As described in more detail with respect to FIG. 17J, the etch sites 703 provide locations for the anisotropic etching process to begin, so that the etching process comprises microchannels that propagate from both sides of the wafer. After preprocessing preparation, the wafer may be introduced into the etch reactor for formation of the microchannels.

FIG. 17J illustrates a double-sided etching reactor and process according to an embodiment of the invention. The illustrated etch reactor comprises a vessel 713, having two transparent windows 707, an inlet port 709 and an outlet port 710. The apparatus further comprises a wafer holder 701 configured to retain the preprocessed wafer. The reactor further comprises electrodes 704 and 700. A pair of O-rings 702 may be disposed to hold the wafer 714 in the holders 701 and to electrically isolate the wafer 714 from the holders 701. The holders 701 are placed in vessel 713 so that etchant solution 711 has access to both sides of wafer 714 and so that each side of wafer 714 faces two opposite windows 707.

During the etching process, etchant solution 711 is introduced to fill vessel 713. Electrodes 704 are negatively biased and electrode 700 is positively biased to positively charge the n-type wafer 714. Both sides of the wafer are simultaneously illuminated with light 705 which is shone onto the surfaces of the wafer 714, and more particularly, onto the etching sites 703 through windows 707. Etching occurs as holes are generated in the vicinity of etching sites 703 when light impinges the surface of the wafer 714. These holes are drawn to the regions near the apexes of the etching sites 703 because of the electric field created by electrodes 700 and 704. The etching process proceeds in the location of these holes, thereby creating an anisotropic etch process where holes grow towards each other until a microchannel is formed. In some embodiments, the light 704 may comprise any form of light having sufficient energy to generate the minor charge carriers—holes in the n-type wafer 714, such as conventional incandescent light or light emitting diodes.

In some embodiments, the etching process may produce reaction products that would interfere with further etching if not removed. For example, in an etching process using HF/DDW or HF/Ethanol etchant solutions, some chemical reaction products may be gaseous, such as $HF_4$, $H_2$, resulting in bubble formation at the etched surface. Accordingly, inlet ports 709 and outlet ports 710 may be used to provide a flow of etching solution through the vessel, thereby removing the chemical reaction products from the etch sites. Furthermore, the etching process may use relatively large amounts of etchant liquid. For example, etching microchannels through a 500 μm wafer may require several hours and may result in a complete depletion of etchant solution at a rate of about once per hour. Accordingly, a reservoir of the etchant solution may be provided to allow for circulation of the liquid and replenishment with the fresh fluid.

In some embodiments, the negative electrodes 704 may be composed of a material that does not react with the etchant. For example, in a process using HF, the electrodes 704 might be comprised of platinum (Pt). In other embodiments, conventional electrodes such as copper (Cu) electrodes may be employed. In further embodiments, rather than being disposed in the solution, the negative electrodes may be disposed on both sides of the wafer 714 as electrodes 708. In these embodiments, contacts 712 may be provided to bias the electrodes 708. In some cases, the negative electrodes 708 may be shaped to cover the portions of wafer 714 that are not to be etched. This use of electrodes 708 may further protect the non-etched Si portions from unintentional etching. In these embodiments, the electrodes 708 may be isolated from direct contact with wafer 714, for example through the use of $Si_3N_4$ coatings 706 on the wafer 714. In these embodiments, electrodes 708 may also comprise electrodes such as Pt electrodes or Cu electrodes.

The etched wafers created through this process may be used for a variety of purposes. In some embodiments, they are used to create a microchannel scintillator of the type illustrated in FIGS. 17D-17H. FIG. 17K illustrates a method for creating such a scintillator according to an embodiment of the invention. In this embodiment, a microchannel array is obtained, for example through an etching process described with respect to FIG. 17I. In step 750 the walls of the channels are coated with a reflective material, for example, with Al film by a vapor deposition process as described with respect to FIG. 17D. After the channel walls are coated, the microchannels are filled with a powdered fluorescent or scintillator material. A crystalline scintillating structure is then formed in the microchannels by heating the filled microchannel array to melt the scintillator material in step 752 and then allowing it to cool to form the crystalline structure in step 754.

In some embodiments, this process may take place in a vacuum (such as at a residual pressure of $10^{-6}$ torr). In these embodiments, the filled microchannel array may be placed in a boat made of material with a high melting point and low coefficient of thermal expansion such as molybdenum (Mo), tantalum (Ta) or high-temperature ceramic. To prevent the evaporation of the scintillator material when heated in vacuum, a lid of a similar material may be placed on top of the filled microchannel array, such that the gaseous scintillator material created by evaporation remains circulating in the closed space created the boat body, channels, and lid. In other embodiments, the filled microchannel array can be heated in a neutral gas atmosphere at about atmospheric pressure and cooled afterward. For example, an argon (Ar) atmosphere at slightly higher than atmospheric pressure (to prevent flow by the external atmosphere into the gas chamber). In these embodiments, the pressure of the neutral gas atmosphere may prevent excessive evaporation of the scintillator material. Accordingly, the lid may be omitted from the set-up and the filled microchannel array can be heated and cooled in the boat.

Figure 18:
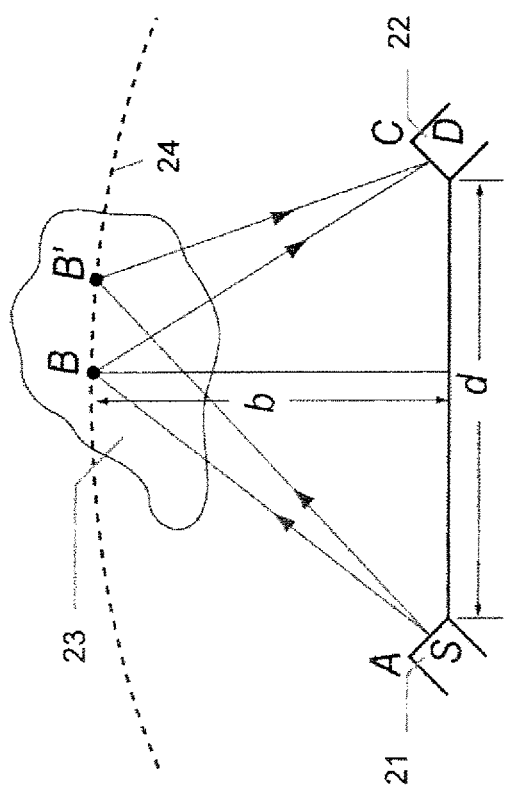
FIG. 18 illustrates a source and detector geometry for x-ray imaging according to an embodiment of the invention.

FIG. 18 illustrates an image recording geometry according to an embodiment of the invention. The image recording geometry in the illustrated example includes an x-ray source 21, detector 22 (as shown in FIG. 17A), and Compton backscattering target area 23. Central line 24 illustrates portions of the target area 23 with a constant path length from source to detector. At this constant path length, central line 24 is a segment of an ellipse. In FIGS. 17 and 18, the parameter d is the distance between the source and the detector, while the parameter b is the perpendicular distance between the center of line connecting the source and detector and central line 24.

Figure 19:
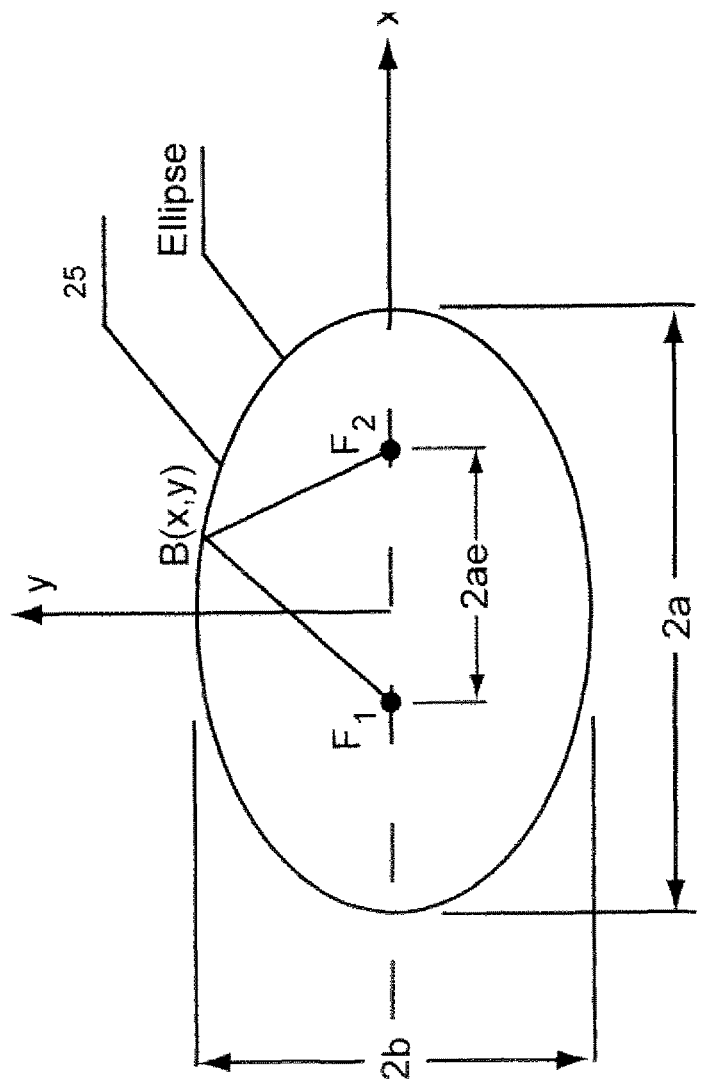
FIG. 19 further illustrates the source and detector geometry of FIG. 18 according to an embodiment of the invention.
Figure 20:
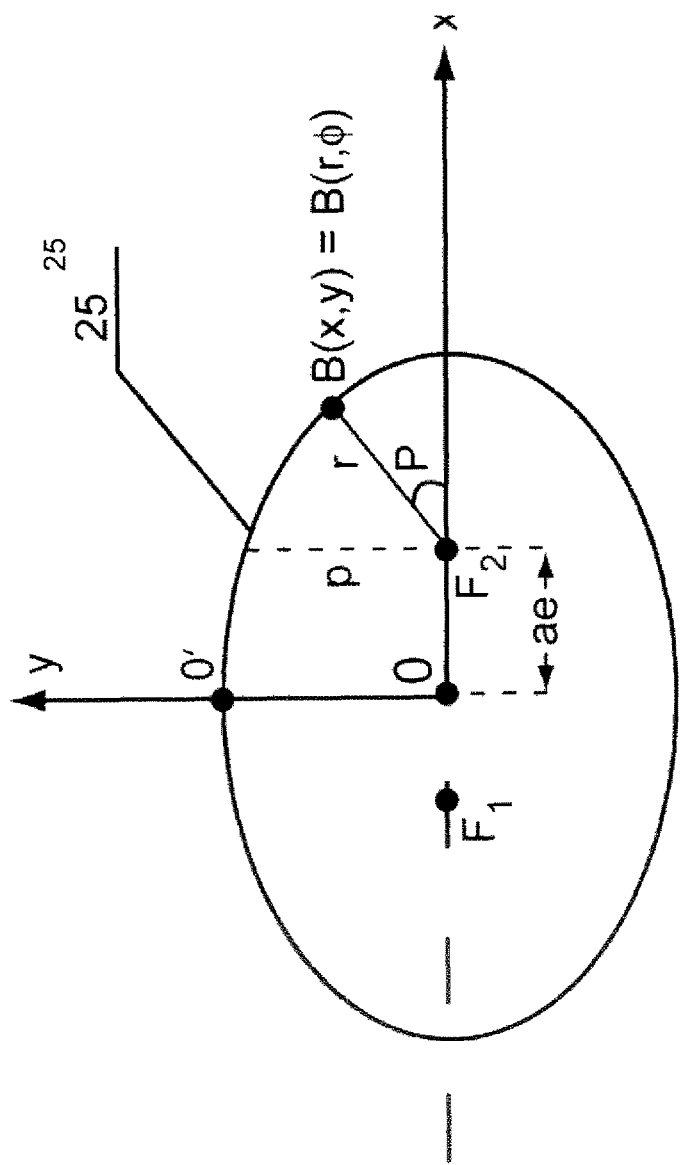
FIG. 20 further illustrates the source and detector geometry of FIG. 18 according to an embodiment of the invention.

Both points B and B' lay on central line 24; so, according to the well-known ellipse principle:

$$AB+BC=AB'+B'C, \tag{81}$$

assuming that the points A and C coincide with ellipse focii. This situation is illustrated in FIG. 19 with ellipse 25. The point B(x,y) satisfies the ellipse equation in Cartezian coordinates (x,y):

$$\frac{x^2}{a^2} + \frac{y^2}{b^2} = 1, \tag{82}$$

where a and b are the lengths of the large and small semi-axes, as shown in FIG. 19, while the point $B(r,\phi)$ also satisfies the ellipse equation in polar coordinates $(r,\phi)$:

$$r = \frac{p}{1 + e\cos\phi}, \tag{83}$$

where p is the ellipse parameter and e is the ellipticity (e<1). As illustrated in FIG. 20, the parameter p is determined by $\phi=\pi/2$ where r=p (from Eq. (83)). Also, for $\phi=0$ and $\phi=\pi$ $$r = \frac{p}{1-e}, \tag{84}$$

$$r = \frac{p}{1-e},$$

obtaining, by manipulating Eqs. (82)-(84), $$a = \frac{p}{1-e^2}, \tag{85}$$

$$b = \frac{p}{\sqrt{1-e^2}},$$

$$\frac{b^2}{a} = p,$$

$$F_1 F_2 = 2ae.$$

Accordingly, the equation of the ellipse defined by points B and B' in FIG. 18 may be obtained. From Eq. (85), $$d = 2ea, \tag{86}$$

and, using Eqs. (85) and (86), $$a = b\sqrt{1 + \frac{d^2}{4b^2}}. \tag{87}$$

(Therefore, the parameter b in FIG. 18 is the small semi-axis.) For example, for d=10 cm, and b=80 cm, $d^2/4b^2=4\cdot 10^{-3}\ll 1$, and $a\cong b$, and $e\cong d/2b$. These relations are tabulated in Table 5.

TABLE 5

Ellipse Parameters as a Function of b/d-Ratio

| b/d | 1 | 2 | 3 | 4 | 5 | 6 | 7 | 8 | 9 | 10 |
|---|---|---|---|---|---|---|---|---|---|---|
| e | 0.7 | 0.45 | 0.32 | 0.24 | 0.20 | 0.16 | 0.14 | 0.12 | 0.11 | 0.10 |
| a/b | 1.4 | 1.12 | 1.055 | 1.030 | 1.023 | 1.016 | 1.010 | 1.009 | 1.006 | 1.006 |

Figure 21:
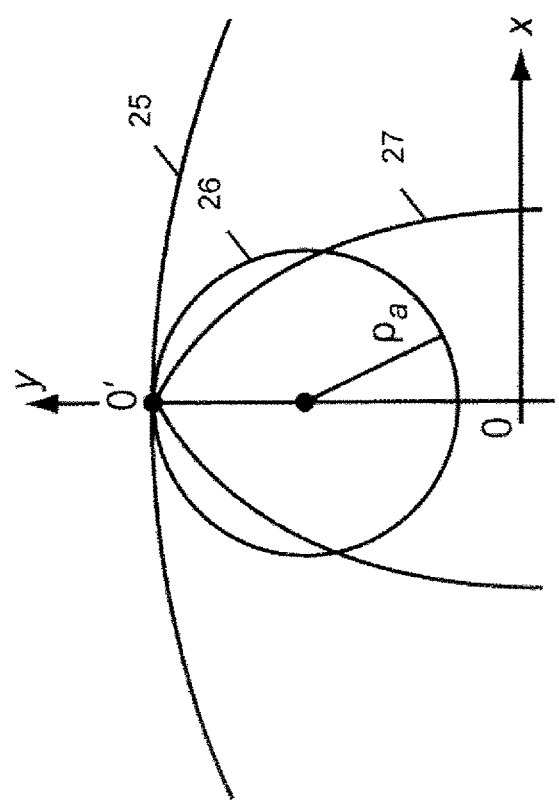
FIG. 21 further illustrates the source and detector geometry of FIG. 18 according to an embodiment of the invention.

In some embodiments, the three-dimensional resolution of the system may be increased by having an increased radius of curvature of the ellipse segment 24 connecting BB'. For purposes of illustration, FIG. 21 provides an illustration of a radius of curvature $\rho_a$ as determined at the central top point 0'. Ellipse curve 25, can be approximated in the vicinity of point 0' by a parabola with equation: $y=y_o-gx^2/2$, where $y_o=00'$, and g is the parabola coefficient. The equation of the circle 26 with radius of curvature, $\rho_a$, that is tangential to the curve 25, in the parabolic approximation has the form: $y=y_o-x^2/2\rho_a$; thus $\rho_a=g^{-1}$. The equation of ellipse (65) in the parabolic 27 approximation, in the vicinity or point 0, has the form:

$$\frac{y}{b} = \sqrt{1 - \frac{x^2}{a^2}} \cong 1 - \frac{x^2}{2a^2}, \tag{88}$$

$$y = b - \frac{bx^2}{2a^2}.$$

Therefore, the radius of curvature, $\rho_a$, of the ellipse, 25, at point 0', is $$\rho_a = \frac{a^2}{b} > a; \tag{89}$$

$$a > b,$$

using Eq. (87), we obtain $$\rho_a = a\sqrt{1 + \frac{d^2}{4b^2}}. \tag{90}$$

Accordingly, in these embodiments, the radius of curvature may be increased by increasing the distance d between the source and the detector.

Figure 22:
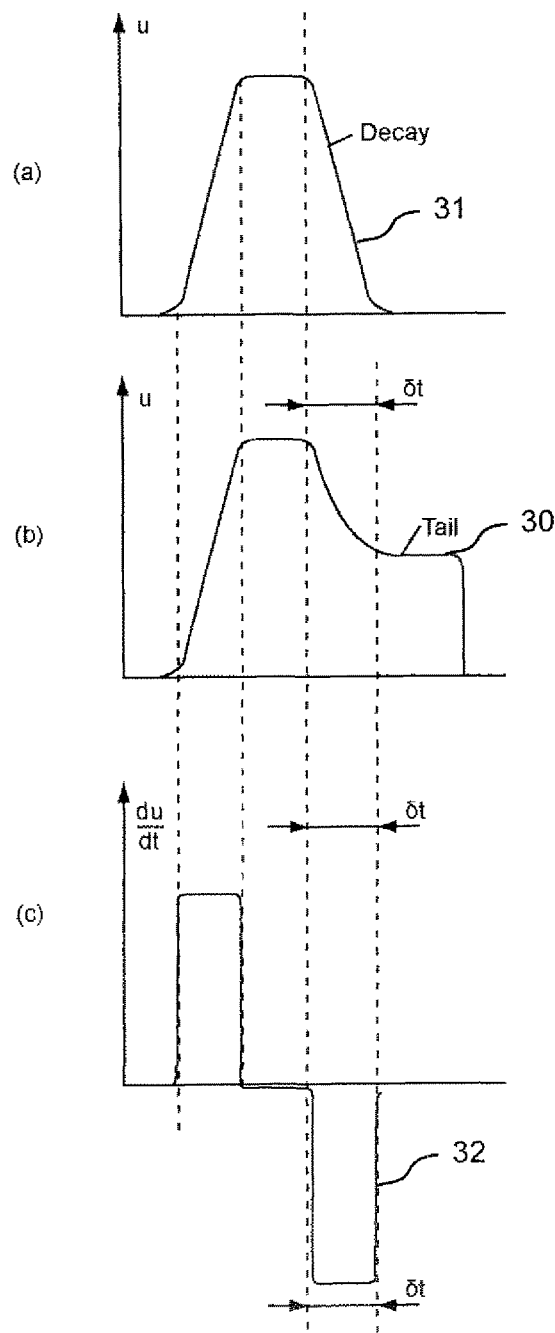
FIG. 22 illustrates an x-ray pulse before and after impinging on an object to be imaged according to an embodiment of the invention.

In further embodiments, the accuracy of the imaging system may be further improved by configuring the x-ray pulses used for imaging. For example, some embodiments employ x-ray pulses that have well defined pulse decays in the time domain. FIG. 22(a) illustrates an example of such an x-ray pulse with a well-defined decay. After the pulse is emitted and backscattered off the object being imaged, the decay is degraded because of time-delayed x scattering effects. FIG. 22(b) illustrates such a backscattered x-ray pulse. Time domain signal processing techniques may allow the primary well-defined decay profile to be returned. FIG. 22(c) illustrates such a backscattered pulse after signal processing.

Accordingly, by scanning the wavefronts in any given instance using a proper time gating constant, and by applying the equidistant curve as in FIG. 18, three-dimensional imaging may be accomplished. As illustrated in FIG. 22(c), the simple pulse's temporal differentiation can cut off the tail of the backscattered x-ray pulse such that the temporal resolving element, $\delta t$, is better defined.

Figure 23:
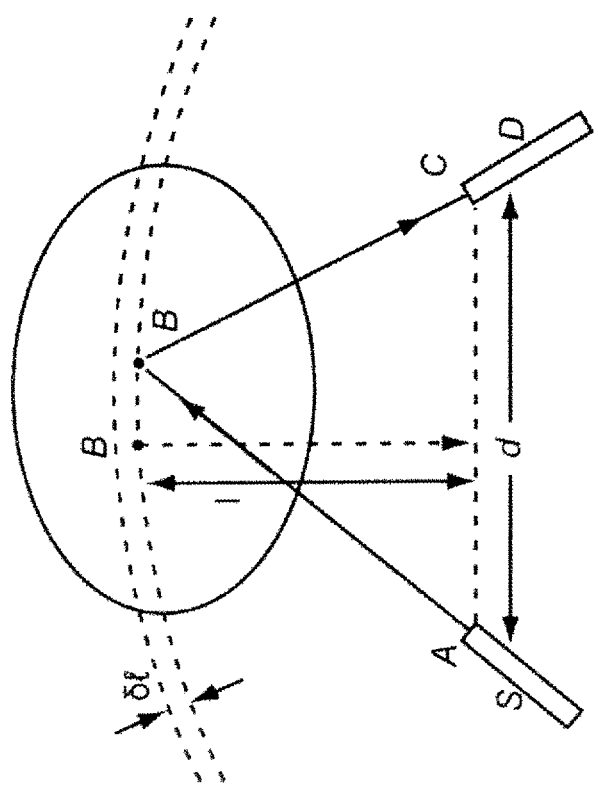
FIG. 23 further illustrates an imaging method using the source and detector geometry of FIG. 18.

FIG. 23 illustrates a method of three-dimensional scanning using the system of the embodiment illustrated in FIG. 18. According to the ellipse property:

$$L = AB' + B'C = AB + BD = \text{constant}, \tag{91}$$

and, $$L = 2\sqrt{b^2 + \frac{d^2}{4}} = 2b\sqrt{1 + \frac{d^2}{4b^2}} = 2a, \tag{92}$$

according to Eq. (87). Also, including double-pass through Compton backscattering:

$$2\delta l = c\delta t; \delta l = 0.5 c\delta t. \tag{93}$$

This specific elliptical layer may be imaged by time resolving the x-ray pulses' decays with time resolving element, at, at a time delay, $t_o=L/c$. For example, the illustrated layer may be imaged when an embodiment time gates at a time t, and generates an x-ray pulse at a time: $t-t_o$. The remainder of the object to be imaged may be imaged an analogous layer by layer fashion.

Figure 24:
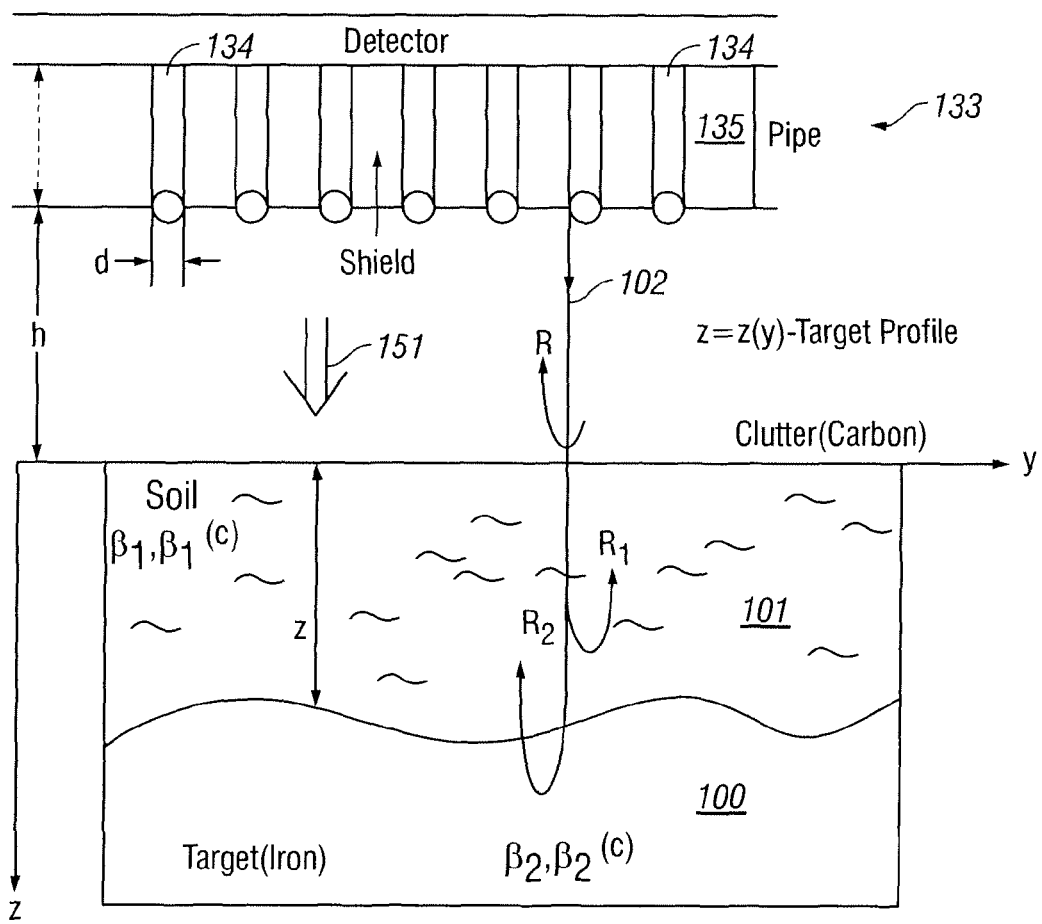
FIG. 24 illustrates a volumetric profile determination according to an embodiment of the invention.

In some embodiments, three dimensional profiles of objects to be imaged may be obtained through the use of three-dimensional x-ray profilometry. These embodiments may be deployed in environments where there is an intervening medium between the imager and the object being imaged. For example, FIG. 24 illustrates such an environment where an object 100 (the target made from iron, for example) is buried in a soft solid clutter 101 such as soil or sand. In this embodiment, the x-ray detector can be at distance, h, from the surface, of a ground. The method allows reconstruction of the surface profile of an object, described by a target profile function: $z=z(y)$, or $z=z(x,y)$ in the 3D case.

In the illustrated example, a collimated x-ray beam (an arrow) 102 illuminates and penetrates the ground 101. The collimated x-ray beam is attenuated during propagation through the ground before reaching an object 100. The x-ray beam then penetrates the object until it is fully attenuated. During propagation through clutter, (such as soil, sands, dense vapor, dense gas, all kinds of fluids, water, mud, etc.) the x-ray beam is partially scattered by the Compton effect, and part of this Compton-scattered beam is back-scattered (with scattering angle: $\theta=180°$), as shown by arrow u-turns: R, $R_1$, $R_2$—Compton back-reflection coefficients: $R_1$—reflection in the soil; $R_2$—reflection inside the target; and R—total back-reflection. There are two x-ray propagation constants of interest: the β—beam (total) attenuation coefficient, as in Tables 1, 2, 3; and the $\beta^{(c)}$-Compton scattering coefficient. The Compton back-reflection coefficient, $R^{(c)}$, in a homogeneous layer of thickness, d, has the form (see, Eq. (43)):

$$R^{(c)} = CONST \cdot \beta^{(c)} \int_0^d e^{-2\beta x'} dx' = CONST \cdot \frac{\beta^{(c)}}{2\beta}(1 - e^{-\beta d}) \quad (94)$$

where, for ease of discussion, CONST refers to the assumption that $\beta^{(c)}$ and β have constant values where CONST is the proportionality constant and the fact that Compton scattering changes photon energy, from $E_{ph}$ to $E_{ph}'$ is ignored (including this change, instead of 2β, in Eq. (94), there would be a factor of $\beta+\beta'$). The factor of 2 in the exponent results from attenuation during forward propagation and attenuation during return propagation after backscattering; here, $$E_{ph}' = E_{ph}/(1+2E_{ph}/m_e c^2).$$

The total Compton backscattering ("reflection") coefficient, R, is a sum of $R_1$ and $R_2$, where; according to Eq. (94):

$$R_1 = CONST \cdot \frac{\beta_1^{(c)}}{2\beta_1}(1 - e^{-2\beta_1 z}) \quad (95)$$

$$R_2 = CONST \cdot \beta_2^{(c)} e^{-2\beta_1 z} \int_0^\infty e^{-2\beta_2 x'} dx' \quad (96)$$

$$= CONST \cdot \frac{\beta_2^{(c)}}{2\beta_2} e^{-2\beta_1 z}$$

Eq. (96) illustrates the situation where the x-rays are fully attenuated within the target material. In situations where some x-rays pass through the target material, there is a finite integration within the three-layer problem: clutter+material+ clutter; accordingly, $$R(z) = R_1 + R_2 \quad (97)$$

$$= \frac{\beta_1^{(c)}}{2\beta_1}(1 - e^{-2\beta_1 z}) + \frac{\beta_2^{(c)}}{2\beta_2} e^{-2\beta_1 z}$$

with two boundary conditions:

$$R(\infty) = \frac{\beta_1^{(c)}}{2\beta_1} = R_A \quad (98)$$

$$R(0) = \frac{\beta_2^{(c)}}{2\beta_2} = R_B \quad (99)$$

where $R_A$ is Compton reflection coefficient from the soil (without a target), and $R_B$ is Compton reflection coefficient from the target (without a soil). Thus, Eq. (97) becomes $$R(z) = R_A(1-e^{-2\beta_1 z}) + R_B e^{-2\beta_1 z} = R_A - e^{-2\beta_1 z}(R_A - R_B). \quad (100)$$

Figure 25:
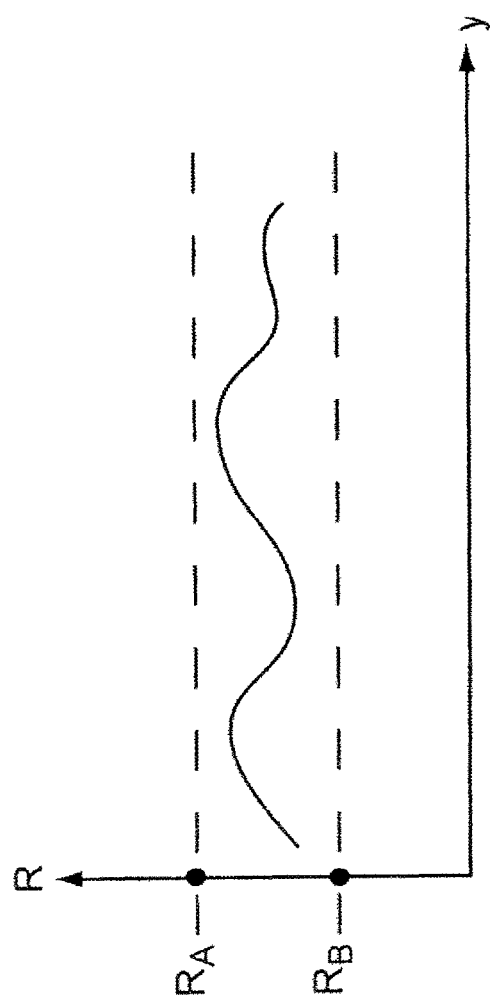
FIG. 25 illustrates a fluctuating Compton reflection coefficient according to an embodiment of the invention.

Typically, the soil is composed of silicon, oxygen, carbon, and other elements; while the target is usually metallic. In these cases, usually $R_A > R_B$, and R(z) fluctuates between $R_B$-values and $R_A$-values, as illustrated in FIG. 25.

In these embodiments, because the dependency of R is an analytically known function of z (see; Eq. (100)) and the dependence of R on y may be obtained through measurement (see; FIG. 24), the profile z(y)-profile can be found. This is graphically shown in FIG. 26. Due to the known R(z)-curve (Eq. (100)), and the measured curve: R(y), the target profile can be obtained: z(y), and, in general:

$$z = z(x,y) - 3D \text{ profile.} \quad (101)$$

In various embodiments, profilometry calculations may be assisted by using various databases of prior constants may be provided. For example a database of soil attenuation constants $\beta_1^{(c)}$, $\beta_1$, for homogeneous soils may be provided. A database of target material constants $\beta_2^{(c)}$, $\beta_2$, may be provided (if a target decoy is used, with the same profile but different material; then the $R_B$-value will be different). And a database of various target 3D-profiles may be provided (for example, this might be used in rapid identification of various known object types).

In some embodiments, imaging may be assisted by normalization of the basic Eq. (100). In these embodiments, a normalized efficiency, $\eta^{(c)}$, may be introduced in the form:

$$\eta^{(c)} = \frac{\frac{R(z)}{R_B} - 1}{\frac{R_A}{R_B} - 1}. \quad (102)$$

Then, because $R_B \leq R \leq R_A$, from Eq. (102), for $R=R_B$, $\eta^{(c)}=0$, and for $R=R_A$, $\eta^{(c)}=1$; so, $$0 \leq \eta^{(c)} \leq 1. \quad (103)$$

Substituting Eq. (100) into Eq. (102), $$\frac{R}{R_B} - 1 = \left(\frac{R_A}{R_B} - 1\right) - e^{-2\beta_1 z}\left(\frac{R_A}{R_B} - 1\right) \quad (104)$$

and, dividing Eq. (104) by:

$$\left(\frac{R_A}{R_B} - 1\right),$$

the following normalized profilometry formula is obtained:

$$\eta^{(c)} = 1 - e^{-2\beta_1 z}. \quad (105)$$

In some embodiments, the maximum penetration depth can be calculated from the following criterion:

$$e^{-2\beta_1 z} = 0.001 \Rightarrow 2\beta_1 z_{max} = 6.9. \quad (106)$$

For example, for $E_{ph}=10$ keV, and for silicon (the major soil component), from the NIST Tables: $\beta_1=0.9$ cm$^{-1}$; thus, from Eq. (106), $Z_{max}=3.8$ cm. Assuming $Z_{max}=6$ inch=15.24 cm, we obtain, from Eq. (106), $\beta_1=0.22$ cm$^{-1}$, which corresponds to $E_{ph}=300$ keV. Also, for $Z_{max}=50$ cm, $\beta_1=0.069$ cm$^{-1}$, corresponding to $E_{ph}=900$ keV. In general, the photon energy of interest, $E_{ph}$, is within a broad range, for example, from 10 keV to 10 MeV. With higher $E_{ph}$-value, larger penetration depth is achieved. In further embodiments, accuracy may be decreased in exchange for increased penetration depth by replacing the 6.9-value, as in Eq. (106), with a smaller value.

Figure 27B:
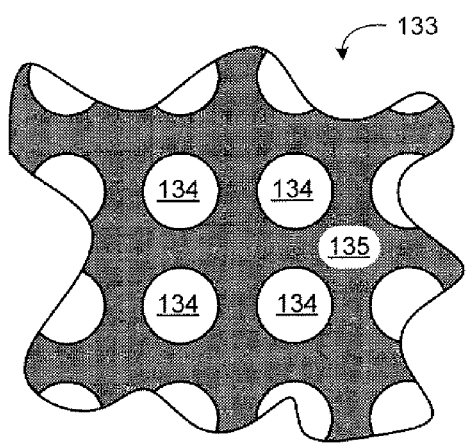
FIG. 27 is an of a pipe array comprising a shielding material and a plurality of tunnels or pipes according to an embodiment of the invention.
Figure 27A:
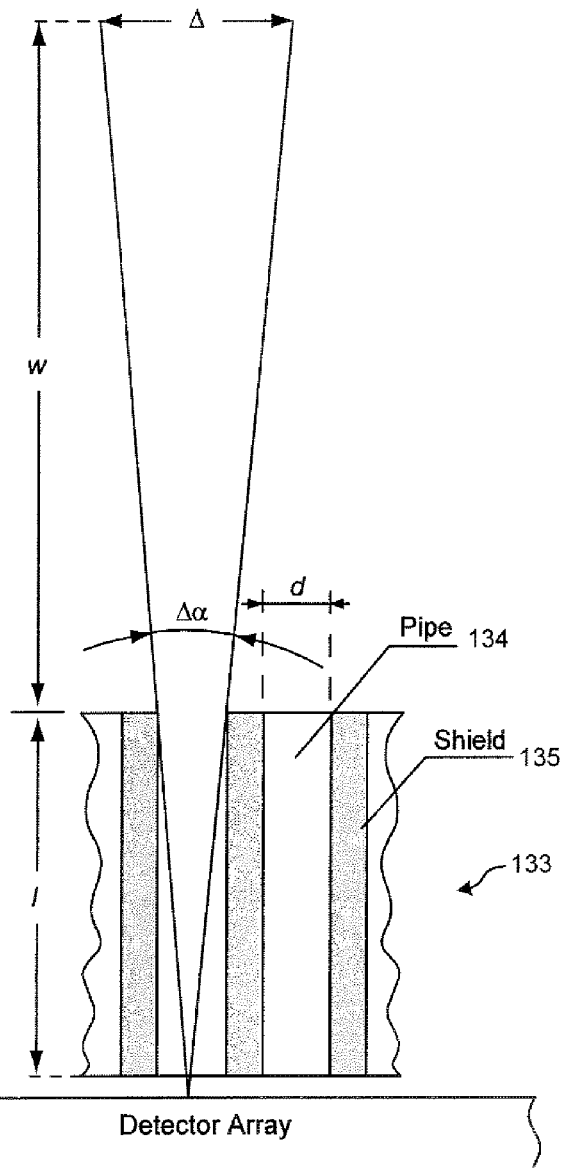

FIG. 27B is a top-down illustration of a pipe array 133 comprising a shielding material 135 and a plurality of tunnels or pipes 134. Backscattered x-rays incident on the surface of the pipe array are blocked by shielding material 135 and transmitted through pipes 134 as illustrated in cross-sectional diagram FIG. 27A. As illustrated in FIG. 27A, the pipe view angle, $\Delta\alpha$, is $$\Delta\alpha = \frac{d}{l} = \frac{\Delta}{l+w} \quad (107)$$

where $\Delta$ is the target resolving element, and w is its distance from the front of detector. In one embodiment, a pipe array might comprise a plurality of pipes 25 cm in length, and 0.4 mm in width. In this embodiment $\Delta\alpha=0.0016=0.09°$ and $\Delta=2$ mm at w=1 m. Such an array of pipes may be manufactured using methods as described in U.S. Pat. No. 7,231,017B2, which is hereby incorporated by reference in its entirety.

Figure 28:
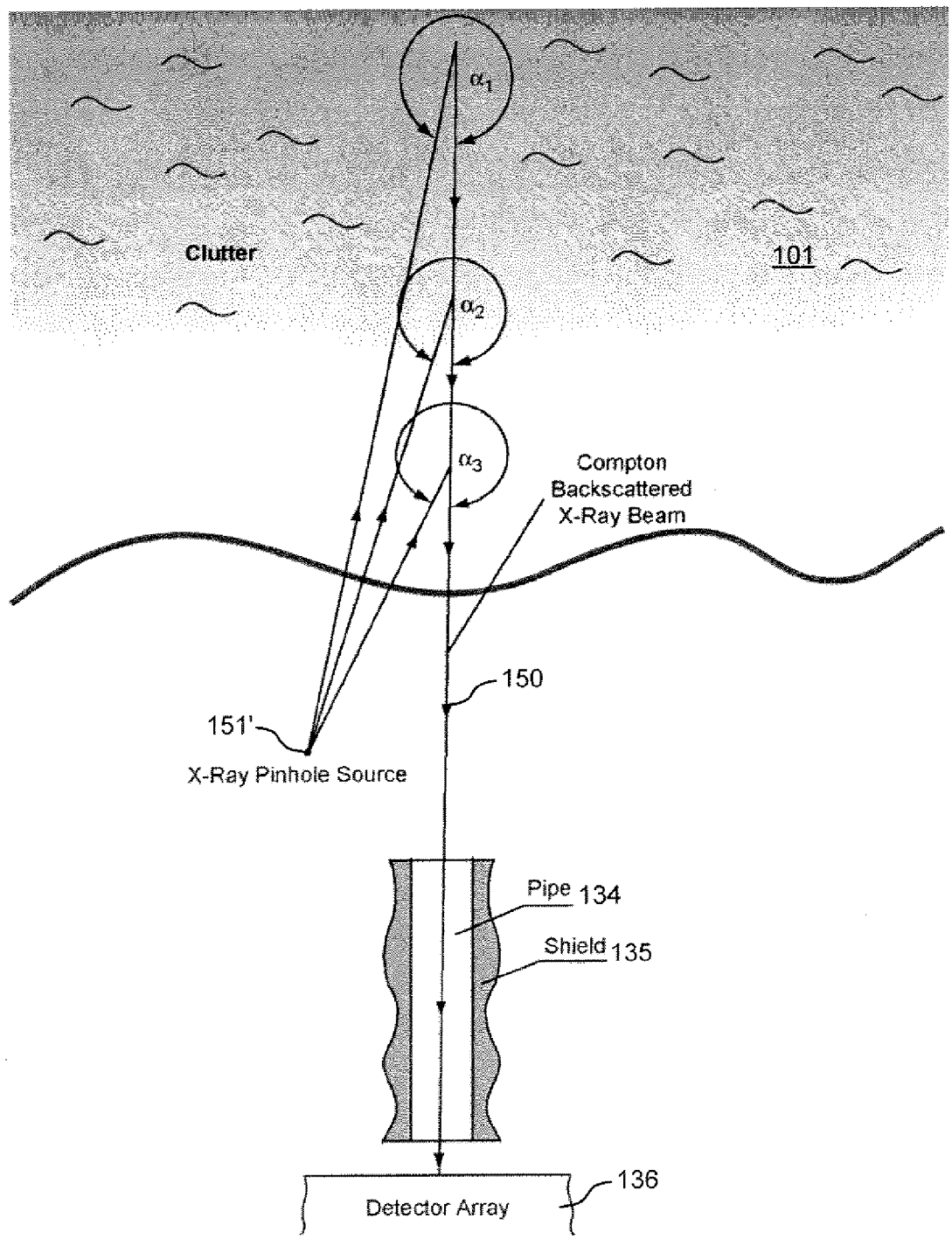
FIG. 28 illustrates imaging using the pipe array of the embodiments of the invention described with respect to FIG. 27.

In the embodiment illustrated in FIG. 24, the x-ray source was depicted as a collimated beam x-ray source 151. In further embodiments, different x-ray sources may be used. For example, FIG. 28 illustrates a geometry employing a pinhole or spherical x-ray source 151', where instead of a planar wavefront, the x-ray beam would have a spherical wavefront. As illustrated, in these embodiments the Compton backscattering angles; $\alpha_1, \alpha_2, \alpha_3, \ldots$ are only close to 180° and the profilometry formula may be corrected accordingly.

In the embodiment illustrated in FIGS. 24 and 27, the x-ray detector is illustrated with a collimated or planar readout geometry. In further embodiments, other x-ray detector readout geometries may be employed. For example, detectors may also employ apertures such as those described with respect to FIGS. 3 and 7, or aperture arrays such as a periodic or an aperiodic aperture array, for example as described with respect to FIGS. 10-15. In these embodiments, slanted Compton backscattering paths are obtained instead of the normal paths illustrated in FIG. 24. Therefore, Eqs. (94)-(101) may be modified accordingly.

In various embodiments, accurate profile detection and target location may utilize Compton backscattering coefficient, $\beta^{(c)}$, data. Such data may be found from the NIST tables. Typically these data are calculated according to the following formula:

$$\mu^{(c)} = \frac{Z\sigma_{KN} \cdot N_A}{M} \quad (108)$$

where $\mu^{(c)}$, is the Compton mass scattering coefficient in cm$^2$/g (then, $\beta^{(c)}=\rho\mu^{(c)}$, where $\rho$ is material density in g/c Z—atomic number, M—atomic mass, $N_A$—Avogadro's number, and $\sigma_{KN}$—Klein-Nishina Compton cross-section. This formula, however, is only approximate because $\sigma_{KN}$ should be corrected by an S-factor, as in Eq. (46). However, for such large scattering angles, the correction factor, $S_N$, is in good approximation, equal to 1 (see; Table 4). Using the herein described notation, $$dR = \frac{d\sigma^{(c)}}{d\Omega}\Delta\Omega n_e dx \quad (109)$$

which coincides with Eq. (39) for x=0. Then, Eq. (109) can be transformed into the following formula (see Eq. (40)):

$$dR = \frac{d\sigma_{KN}}{d\Omega}\Delta\Omega n_e S_N(X,Z)dx \quad (110)$$

by using Eq. (44), Eq. (110) becomes $$dR = \rho\left(\frac{Z}{M}\right)\Delta\Omega\frac{d\sigma_{KN}}{d\Omega}S_N(X,Z)dx \quad (111)$$

Eq. (111) shows that the material-dependant part of $\beta^{(c)}$-coefficient has the form:

$$\beta^{(c)} = CONST.\left(\frac{Z}{M}\right)\rho. \quad (112)$$

This is because $$\frac{d\sigma_{KN}}{d\Omega}$$

is material independent (included in CONST.), while $S_N=1$ for $\theta \cong 180°$ (see; Table 4). Therefore, the material terms: $\beta^{(c)}/2\beta$, as in Eq. (94), reduce to the following material-dependant-factor:

$$\frac{\beta^{(c)}}{2\beta} = \frac{CONST.\left(\frac{Z}{M}\right)\rho}{2\rho \cdot \mu} = CONST. \mu^{-1}\left(\frac{Z}{2M}\right) \quad (113)$$

Where $$\left(\frac{Z}{M}\right)$$

varies slowly with material (except for hydrogen), as shown in Table 4. The material-dependant factor: $\chi=\mu^{-1}(Z/2M)$ is tabulated in Table 6 and, there is not much difference between $\mu^{-1}(Z/2M)$ and $\mu^{-1}(Z/2M)_o$, where $(Z/M)_o=0.45$; and, $$\chi = \mu^{-1}\left(\frac{Z}{2M}\right); \chi_o = \mu^{-1}\left(\frac{Z}{2M}\right)_o. \tag{114}$$

In Table 6, the parameters useful for Compton profilometry are summarized for selected elements, and for $E_{ph}=100$ keV, including: $S_N=0.95$, for $X=X_{MIN}$, where $$X = \sin(\theta/2)/\lambda = 8.06 \text{ Å}^{-1} \sin(\theta/2) \tag{115}$$

Where θ is the Compton scattering angle, which, for backscattering is equal to 180°. The angle, $\theta_{MIN}$, is the value of θ, for which $X=8.06$ Å$^{-1}$ $\sin(\theta_{MIN}/2)=0.95$. The factors useful for material selectivity, $\chi$ and $\chi_o$, are defined by Eq. (114). The value of $$\left(\frac{dR}{d\Omega}\right)_\pi$$

is obtained from Eq. (57), in the form of the differential reflectivity, $$\left(\frac{dR}{d\Omega}\right)_\pi = \left(\frac{1}{2\mu}\right)\left(\frac{Z}{M}\right)(N_A)\left(\frac{d\sigma_{KN}}{d\Omega}\right) \tag{116}$$

where $(dR/d\Omega)_\pi$ is the $(dR/d\Omega)$-value for $\theta=\pi=180°$, the Klein-Nishina differential cross-section, $(d\sigma_{KN}/d\Omega)$, is equal to $0.042 \cdot 10^{-24}$ cm$^2$ for $E_{ph}=100$ keV, as in Eq. (56); thus, the (material-independent factor: $(N_A)(d\sigma_{KN}/d\Omega)$ is equal to 0.025 cm$^2$; and $$\left(\frac{dR}{d\Omega}\right)_\pi = (0.025 \text{ cm}^2)(\chi) \tag{117}$$

where $\chi$ is defined by Eq. (114).

TABLE 6

Compton Profilometry Critical Parameters for Selected Elements, for $E_{ph}=100$ keV

| Element | Symbol | Z | Z/M[g$^{-1}$] | μ[cm$^2$/g] | $X_{MIN}$[Å$^{-1}$] | $\theta_{MIN}$[°] | $\chi$[cm$^{-2}$] | $\chi_O$[cm$^{-2}$] | $\frac{dR}{d\Omega}$[Ster$^{-1}$] |
|---|---|---|---|---|---|---|---|---|---|
| Aluminum | Al | 13 | 0.482 | 0.17 | 2.00 | 29° | 1.418 | 1.324 | 0.035 |
| Bismuth | Bi | 83 | 0.397 | 5.74 | 8.00 | 166° | 0.035 | 0.035 | 0.00087 |
| Cadmium | Cd | 48 | 0.427 | 1.52 | 6.00 | 96° | 0.140 | 0.148 | 0.0035 |
| Carbon | C | 6 | 0.499 | 0.151 | 1.25 | 18° | 1.652 | 1.490 | 0.041 |
| Chromium | Cr | 24 | 0.461 | 0.317 | 3.50 | 51.5° | 0.727 | 0.710 | 0.018 |
| Copper | Cu | 29 | 0.456 | 0.458 | 4.00 | 60° | 0.498 | 0.491 | 0.012 |
| Gold | Au | 79 | 0.401 | 5.16 | 8.00 | 166° | 0.039 | 0.044 | 0.00097 |
| Iron | Fe | 26 | 0.465 | 0.372 | 4.00 | 60° | 0.625 | 0.605 | 0.016 |
| Lead | Pb | 82 | 0.396 | 5.55 | 8.00 | 166° | 0.036 | 0.041 | 0.0009 |
| Nickel | Ni | 28 | 0.477 | 0.444 | 4.00 | 60° | 0.537 | 0.507 | 0.013 |
| Platinum | Pl | 78 | 0.399 | 4.99 | 8.00 | 166° | 0.040 | 0.045 | 0.001 |
| Potassium | K | 19 | 0.486 | 0.234 | 3.00 | 44° | 1.038 | 0.962 | 0.026 |
| Silicon | Si | 14 | 0.498 | 0.183 | 2.50 | 36° | 1.361 | 1.230 | 0.034 |
| Titanium | Ti | 22 | 0.46 | 0.272 | 3.50 | 51.5° | 0.846 | 0.827 | 0.021 |
| Tungsten | W | 74 | 0.402 | 4.44 | 8.00 | 166° | 0.045 | 0.051 | 0.0011 |
| Zinc | Zn | 30 | 0.459 | 0.497 | 4.00 | 60° | 0.468 | 0.453 | 0.011 |

For purposes of illustration, a specific example of Compton backscattering (called, for simplicity, "Compton reflection") from silicon (representing a clutter) and lead (representing a target) is described. According to Table 6, the $\chi$-coefficients, defined by Eq, (114) for large-Z elements are lead (0.036), tungsten (0.045) and bismuth (0.035), while the $\chi$-coefficient for silicon is 1.361. In this example, respective $\chi$-ratios for the targets are high compared to that of silicon: 38, 30, and 39, respectively. Also, from the NIST Tables, the $\beta_1$-attenuation coefficient of silicon, for 100 keV, is 0.19 cm$^{-1}$ (see; Table 4). The formula (100), divided by $R_B$ has the form:

$$\frac{R(z)}{R_B} = \frac{R_A}{R_B} - e^{-2\beta_1 z}\left(\frac{R'_A}{R_B} - 1\right). \tag{118}$$

For silicon clutter ($R_A$) and a lead target ($R_B$), $$\frac{R_A}{R_B} = 37.81 \tag{119}$$

and Eq. (118) becomes $$\frac{R(z)}{R_B} = 37.81 - 36.81 e^{-2\beta_1 z}. \tag{120}$$

Figure 29:
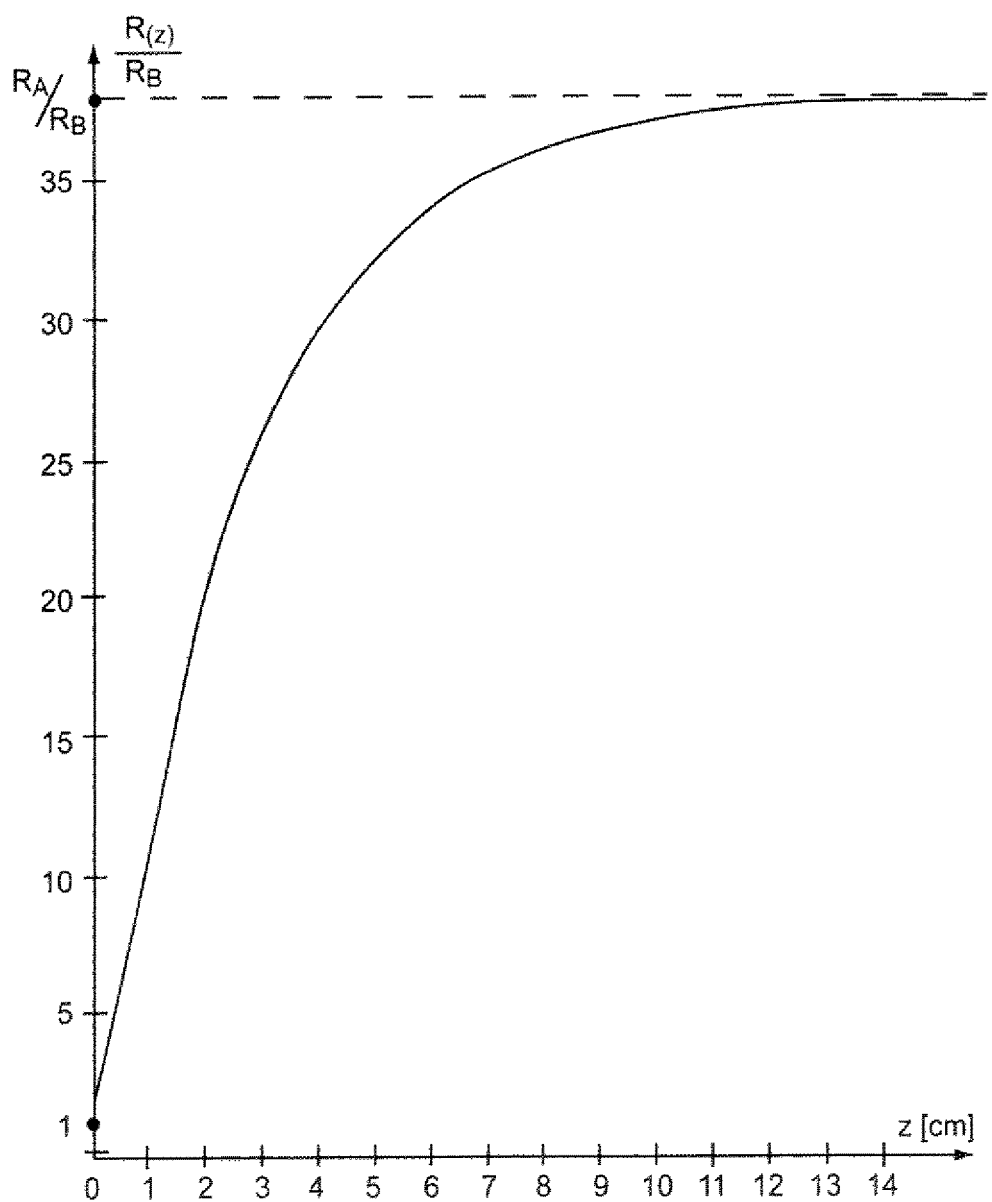
FIG. 29 is a graph illustrating x-ray attenuation contrast between silicon and lead according to an embodiment of the invention.

This equation has some importance, because it can be verified experimentally, assuming that x-ray beam is completely attenuated at lead for 100 keV (since, according to Table 4, $\beta=62.7$ cm$^{-1}$, this condition is easy satisfied for lead thickness of 1 mm, because: exp(−6.27)=0.0019). Eq. (120) is illustrated in FIG. 29. As discussed herein, this is one of the equations in which $2\beta_1$ can be replaced by $\beta_1+\beta'_1$ reflecting the difference in attenuation constants for x-rays—and other penetrating radiation—before and after reflection. From Eq. (120) we have two boundary conditions:

$$\lim_{z=0}\left(\frac{R(z)}{R_B}\right) = 1; \quad \lim_{z\to\infty}\left(\frac{R(z)}{R_B}\right) = 37.81. \tag{121}$$

Thus, according to FIG. 29, the $R/R_B$-value change is measurable in the range: z=(0, 10 cm). For z>10 cm these value changes measurement against noise is difficult.

In some embodiments, x-ray imaging as described herein may be applied to tomographic imaging. For example, such tomographic imaging might be used for imaging in situations where an intervening medium is heterogeneous, such as a abnormally rocky soil. Tomography allows imaging of flat planes or slices that are self-consistent in the sense that the tomographic problems related to them can be solved independently for each slice. Every slice (a plane) is sampled through parallel paths (straight lines), defined by vector $\vec{p}=p\vec{n}$, where $|\vec{n}|=1$; i.e. $\vec{n}$ is a unit vector, defined by a polar angle, $\phi$. Therefore, the unit vector $\vec{n}$ defines the family of parallel paths, with each path defined by a scalar, p. An object of Compton tomography is to find values of the Compton function, $f^{(c)}(\vec{r})$, where $\vec{r}=(x,y,z)$ is a location of an medium point. The medium of interest is surrounded by a $\omega$-boundary. After the $f^{(c)}(\vec{r})$-function is defined, the standard tomographic formalism may be applied.

Using Eq. (43), before integration, the material-dependant terms may be presented in the form:

$$R_T = \int CONST \cdot \beta^{(c)}(s)\left[\exp -2\int_{S_o}^s \beta(s')ds'\right]ds \tag{122}$$

where $\beta^{(c)}$ is the Compton scattering coefficient, $\beta$ is the attenuation coefficient, and integration is taken through one of a path defined by vector $\vec{p}=p\vec{n}$. An analog of the object function defined for classical tomography is the following function (a "Compton function"), $f^{(c)}$, in the form:

$$f^{(c)}(\vec{r}) = \beta^{(c)}(\vec{r})\left[\exp -2\int_{S_o(\vec{p})}^s \beta(s')ds'\right]. \tag{123}$$

Using this analog function the standard tomographic formalism may be applied, which is briefly repeated here for the sake of explanation. The Radon function, $F(\vec{n},p)$ may be defined in the form:

$$F(\vec{n},p)=\int f^{(c)}(\vec{r})\delta(p-\vec{n}\cdot\vec{r})d^2r \tag{124}$$

where $\delta(\ldots)$ is the Dirac delta function, and $d^2r=dxdy$ is an area integration element over a given slice. The argument of Dirac delta is defined by the specific ray path through the following equation:

$$\vec{n}\cdot\vec{r}=p \tag{125}$$

where p is a fixed value for a given path. By changing p-value, the path is changed to another belonging to the same family, where the family is defined by the unit vector, $\vec{n}$.

In these embodiments a three-dimensional distribution of an object may be determined using Compton tomography. The three-dimensional distribution may be represented in the form, $$f^{(c)}=f^{(c)}(x,y,z). \tag{126}$$

The 1D Fourier transform of Radon function, the "Radon transform," $\hat{F}(\vec{n},u)$, may be used to determine this distribution. The Radon transform has the form:

$$\hat{F}(\vec{n},u) = \int_{-\infty}^{+\infty} F(\vec{n},p)e^{iup}dp. \tag{127}$$

Figure 30:
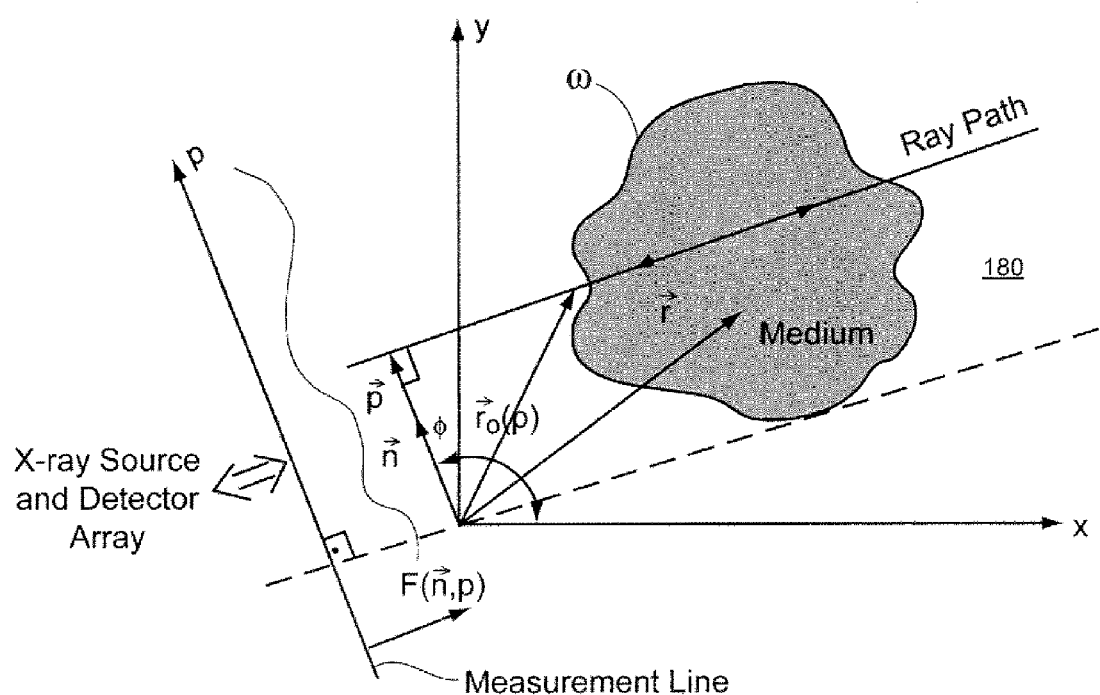
FIG. 30 presents an example illustration of the geometry for Compton tomography used to find the Compton function $f^{(c)}(\vec{r})$ at any point $\vec{r}=(x,y,z)$ within the boundary $\omega$ according to an embodiment of the invention.

The Radon function is measured through a given ray path, defined by Eq. (125), as shown in FIG. 30. All parallel paths, defined by unit vector, $\vec{n}=\vec{n}(\phi)$, can be measured in parallel, along measurement line as in FIG. 30. FIG. 30 presents an example illustration of the geometry for Compton tomography used to find the Compton function $f^{(c)}(\vec{r})$ at any point $\vec{r}=(x,y,z)$ within the boundary $\omega$. Then, the Radon transform (127) is completed. Then, the one-dimensional Fourier integral may be applied:

$$\delta(p-\vec{n}\cdot\vec{r}) = \frac{1}{2\pi}\int_{-\infty}^{\infty} e^{-iu(p-\vec{n}\vec{r})}du \tag{128}$$

and, by using Fourier analysis, the following final Radon formula may be obtained:

$$f^{(c)}(\vec{r}) = \frac{1}{(2\pi)^2}\int_o^\pi d\phi \int_{-\infty}^{\infty} F(\vec{n},u)e^{-iu\vec{n}\cdot\vec{r}}|u|du \tag{129}$$

where the first integration is taken along u for a fixed value of $\vec{n}$, and the second integration is along $\phi$-values, within 180°. This Computerized Tomography (CT) is the basis of the so-called back-propagation algorithm for parallel projections. (Here, the "back-propagation" term should not be confused with Compton back-propagation). Accordingly, in these embodiments by determining the practical Compton function, for example as illustrated in FIG. 30, the distribution may be determined from Eq. (129).

Fourier analysis of the function, $f^{(c)}(\vec{r})$, in the general form (123) is computationally taxing by using Eq. (129). In some embodiments, to simplify this calculation, a shadowed medium 180, illustrated in FIG. 30 may be defined as having a constant mean attenuated coefficient, $<\beta(\vec{r})>=\bar{\beta}$, either in the entire region 180, or as having a constant mean attenuated coefficient in subregion portions of region 180. In some deployments, a boundary $\omega$, or sub-boundaries is known, a priori, for example obtained by laser profilometry or another method. In other deployments, the boundary may be automatically known, such as a container buried in a medium, where the container has a known profile. Accordingly, in these embodiments the Fourier analysis may be simplified by assuming that a), $\bar{\beta}$ is a constant; b) fluctuations of $\beta^{(c)}(\vec{r})$ are defined in a small scale, such that the integral limits, as in Eq. (123), are sufficiently large to provide an integral, as in Eq. (130); c) the boundary, $\omega$, is known; and d) the $\bar{\beta}$-value is also known. The integral component of Eq. (123) has the form:

$$\int_{s_o}^{s} \beta(s')ds' = (\overline{\beta})(s - s_o); \quad s_o = s_o(\vec{p}) \qquad (130)$$

Because the boundary, ω, is known, the value: $s_o = s_o(\vec{p})$ is also known. Therefore, Eq. (123) can be presented in the form:

$$f^{(c)}(\vec{r}) = \beta^{(c)}(\vec{r})[\exp{-2(\overline{\beta})|\vec{r} - \vec{r}_o(p,\vec{n})|}] \qquad (131)$$

where | . . . | is the module symbol. Since, according to condition (d) above, $(\overline{\beta})$-value is known, and, according to condition (c) above, $\vec{r}_o$—is also known; thus, from knowledge of $f^{(c)}(\vec{r})$, the $\beta^{(c)}(\vec{r})$-value may be determined. Moreover, $f^{(c)}(\vec{r})$ can be found from Eq. (129), so the Compton tomography problem may be solved. It should also be noted that, because Compton scattering occurs only within a Region of Interest (ROI), or the medium illustrated in FIG. 30, the $\beta^{(c)}(\vec{r})$-function has non-zero value only within the ROI; thus, $$f^{(c)}(\vec{r}) = 0, \text{ outside the ROI.} \qquad (132)$$

Accordingly, the problem of small-scale fluctuations is well-defined.

X-ray imaging apertures having various imaging pr files may be employed in embodiments of the invention. For example, numerical methods may be applied to minimize the variation of the detector response as a function of the incident angle. This minimization may assist in achieving point spread function (PSF) spatial invariance.

Figure 31:
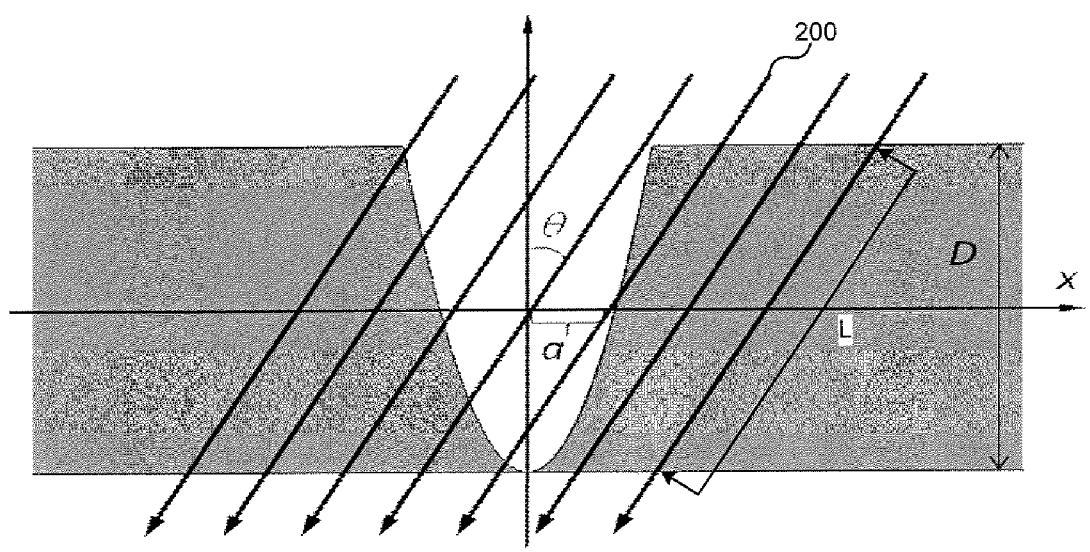
FIG. 31 illustrates different variables used in calculations according to an embodiment of the invention.

FIG. 31 illustrates different variables used in such calculations according to an embodiment of the invention. Calculational complexity may be reduced by assuming the incident x-ray beam to be composed of parallel rays, this assumption is a good approximation for point sources of x-rays if the aperture is small in size compared to the distance to the source. The beam is directed at an angle θ to the aperture axis. For each ray, the total distance L of intersection with the solid material of the aperture is calculated (this distance may be composed of multiple sections of aperture material if incident rays intersect the aperture multiple times, such as of ray 200.). The transmission for a particular ray is defined as a function of its intercept with the x-axis and the incidence angle θ:

$$T(a,\theta) = \exp[-\mu L(a,\theta)], \qquad (133)$$

where µ is the x-ray attenuation coefficient (denoted in previous equations, e.g., Eq. (118), as β).

Figure 32A:
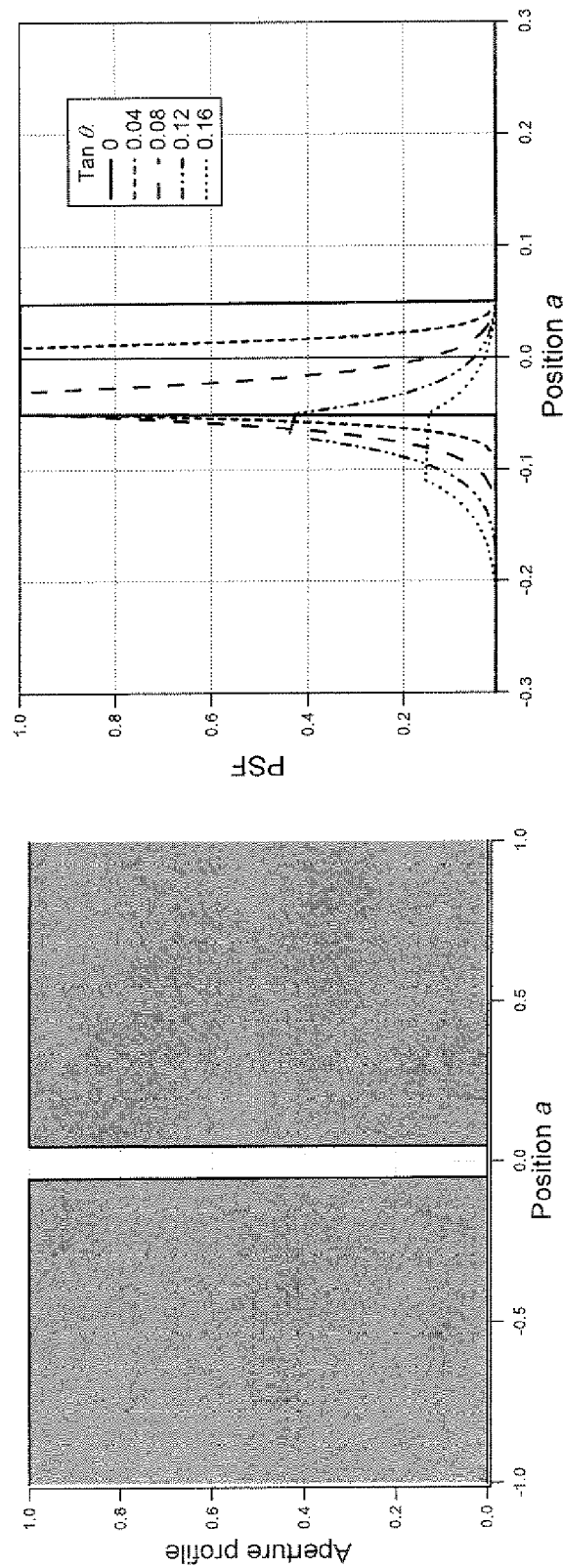
FIG. 32 illustrates various of simulations of various types of aperture profiles according to embodiments of the invention.
Figure 32B:
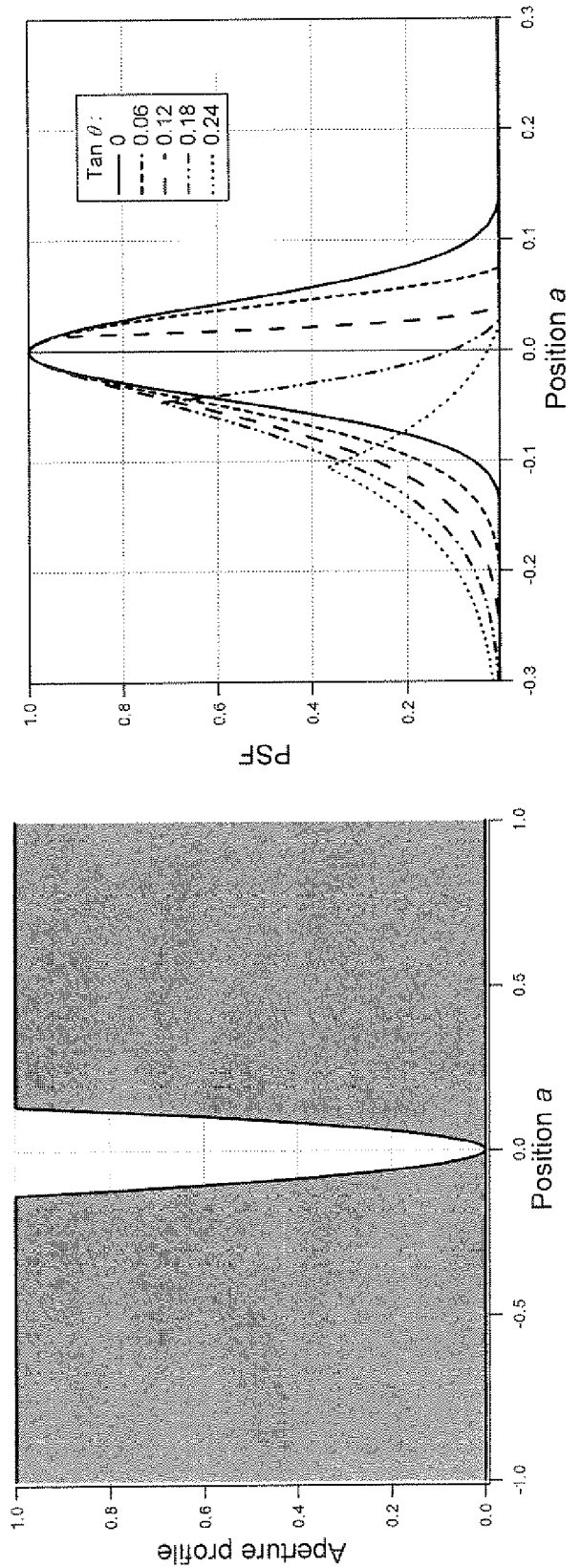
Figure 32C:
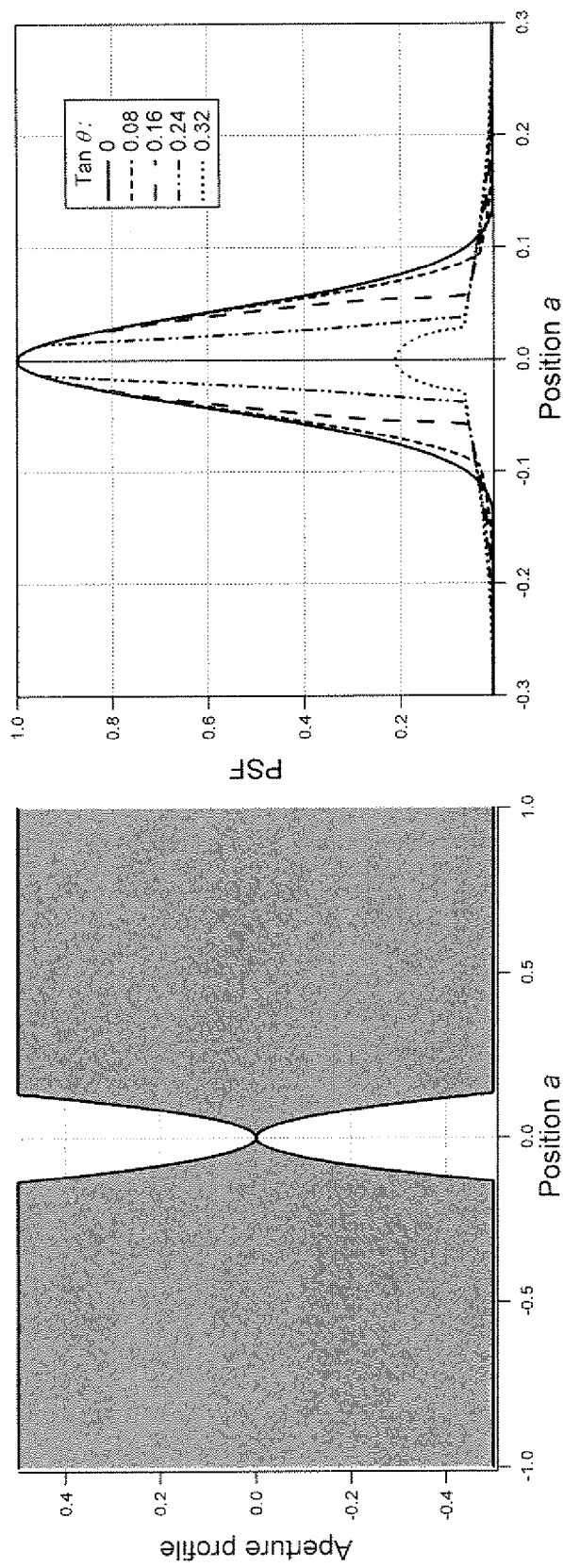
Figure 32D:
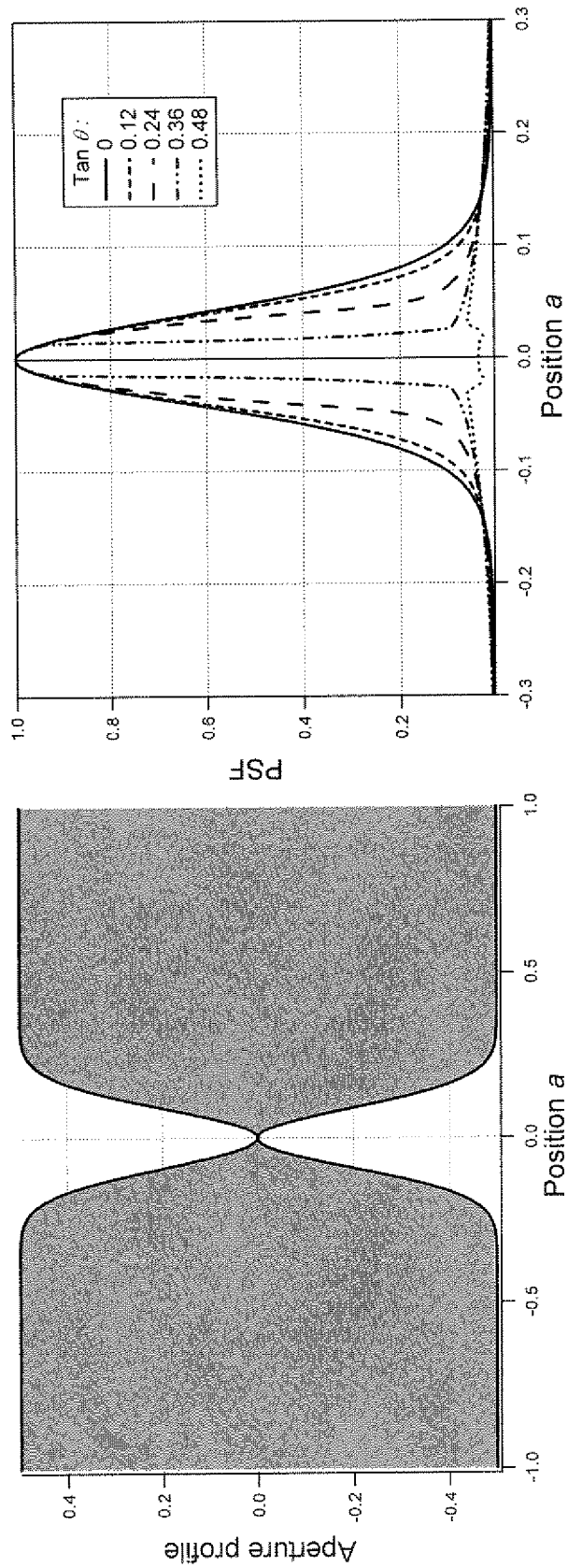
Figure 32E:
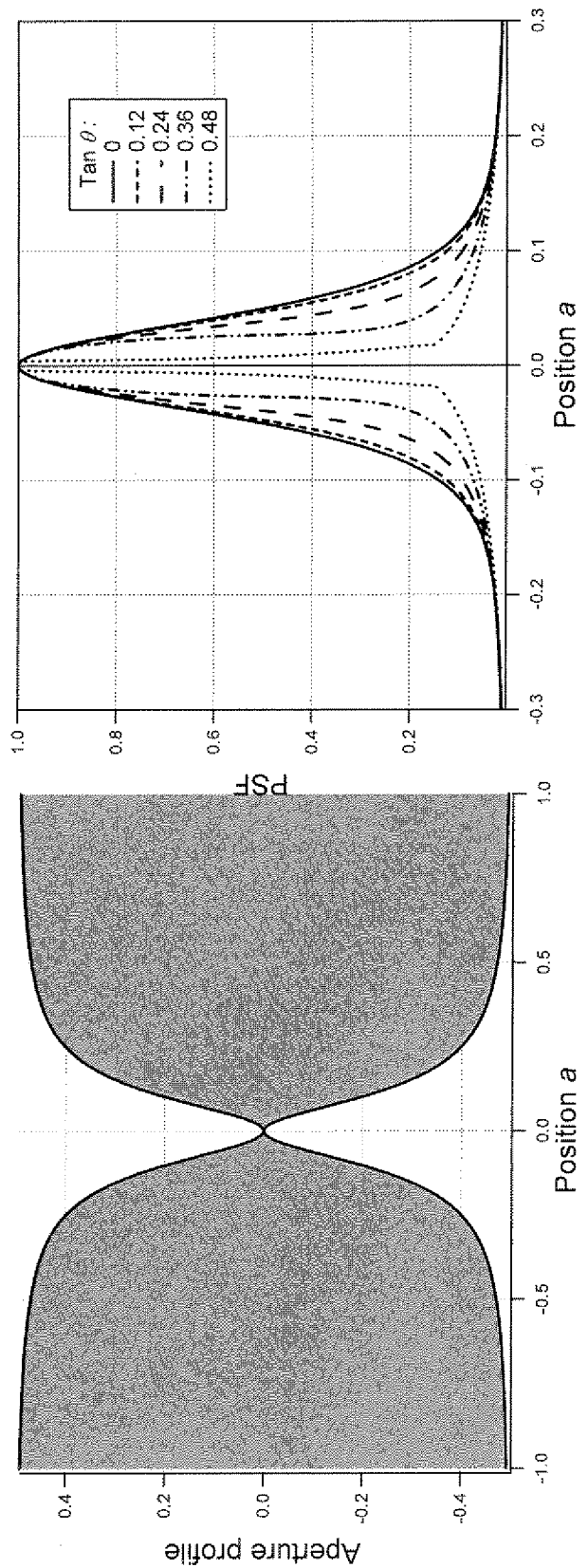
Figure 33:
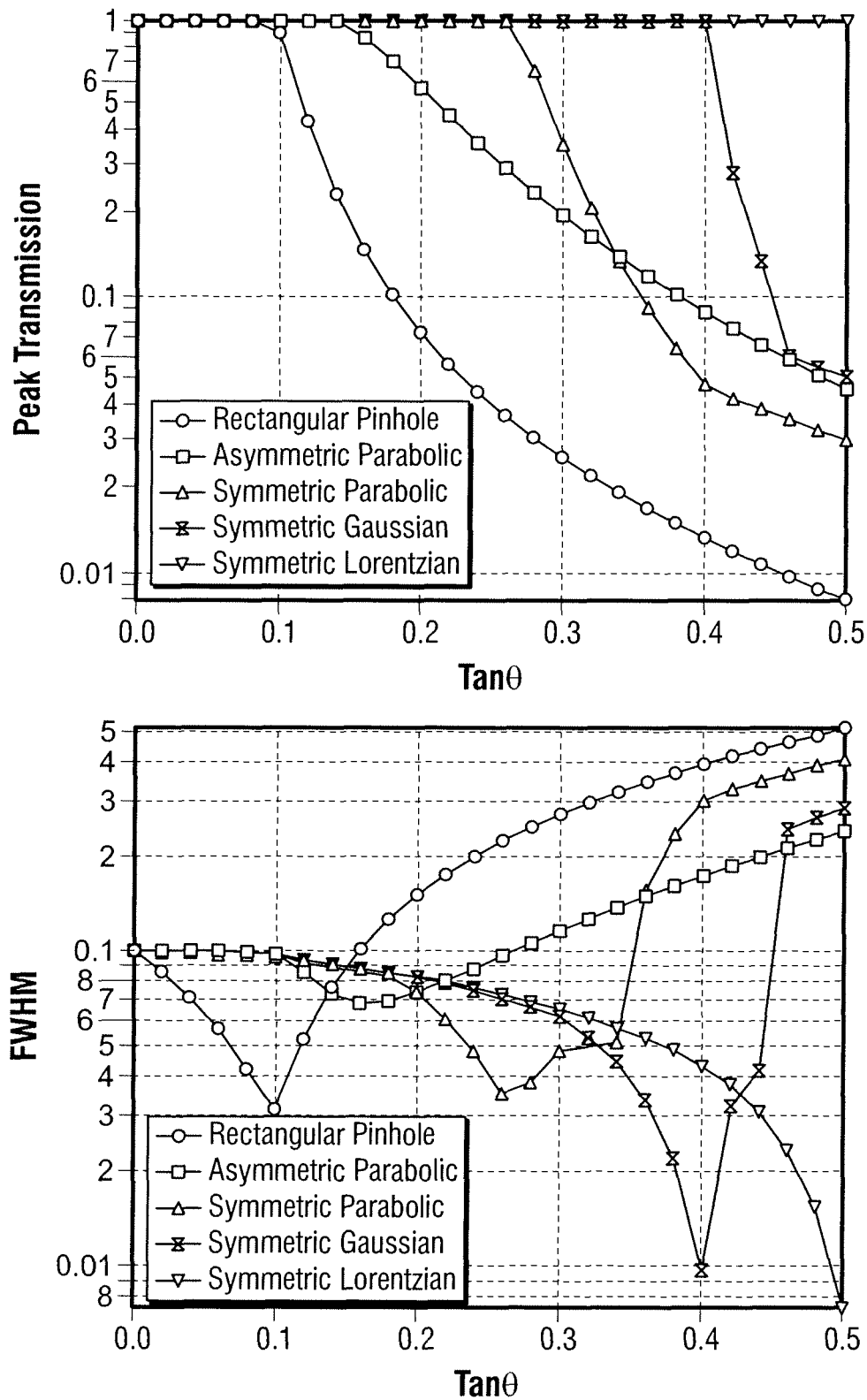
FIG. 33 illustrates graphs of various characteristics of some of the embodiments illustrated in FIG. 32.

FIGS. 32A-E and 33 illustrate some results of simulations of various volume apertures, as can be used in embodiments of the invention. In the illustrated simulations, the attenuation coefficient was chosen such that the x-ray absorbance of the aperture wall equals 5 (µD=5). FIG. 32A illustrates a simulation of a rectangular pinhole with aspect ratio 10:1. The apertures illustrated in FIGS. 32B-E were anodized in Gaussian-like fashion to produce smooth PSF edges; the widths of their profiles were selected to produce PSF with full width at half maximum (FWHM) equal to that of the rectangular pinhole at normal incidence. The leading quadratic term of their profiles was kept constant to ensure the same Gaussian-like response at the center of the PSF. FIGS. 32A-E shows the simulated PSFs for various profiles, as a function of the incidence angle θ. FIG. 33 shows the calculated peak transmissions and FWHM of these PSFs.

In these simulations, the PSF profiles were analyzed just behind the aperture. As the Figures illustrate, the space-invariance condition is more completely satisfied for the symmetric apertures illustrated in FIGS. 32C-E than for the asymmetric ones illustrated in FIGS. 32A-B.

FIG. 33 summarizes space-invariance condition results for these five volume aperture shape simulations in terms of peak transmission. As FIG. 33 illustrates, the rectangular aperture illustrated in FIG. 32A has a rapidly decreasing peak transmission value for incidence angles where tan θ>0.1, while the symmetric Lorentzian aperture illustrated in FIG. 32E has a constant peak transmission value for the range tan θ≤0.5. Furthermore, the symmetric Lorentzian aperture has relatively constant FWHM values within the same range.

Table 7 presents a summary of the results of the simulation in tei ins of the maximum fields of view for the investigated the apertures. In the table, the maximum usable tangent value was defined according to the values having a FWHM of 70% of the FWHM at normal incidence.

TABLE 7

| Aperture Type | Maximum usable tanθ | Relative FOV |
| --- | --- | --- |
| Rectangular pinhole | 0.04 | 1 |
| Asymmetric parabolic | 0.16 | 4 |
| Symmetric parabolic | 0.2 | 5 |
| Symmetric Gaussian | 0.26 | 6.5 |
| Symmetric Lorentzian | 0.28 | 7 |

Figure 32F:
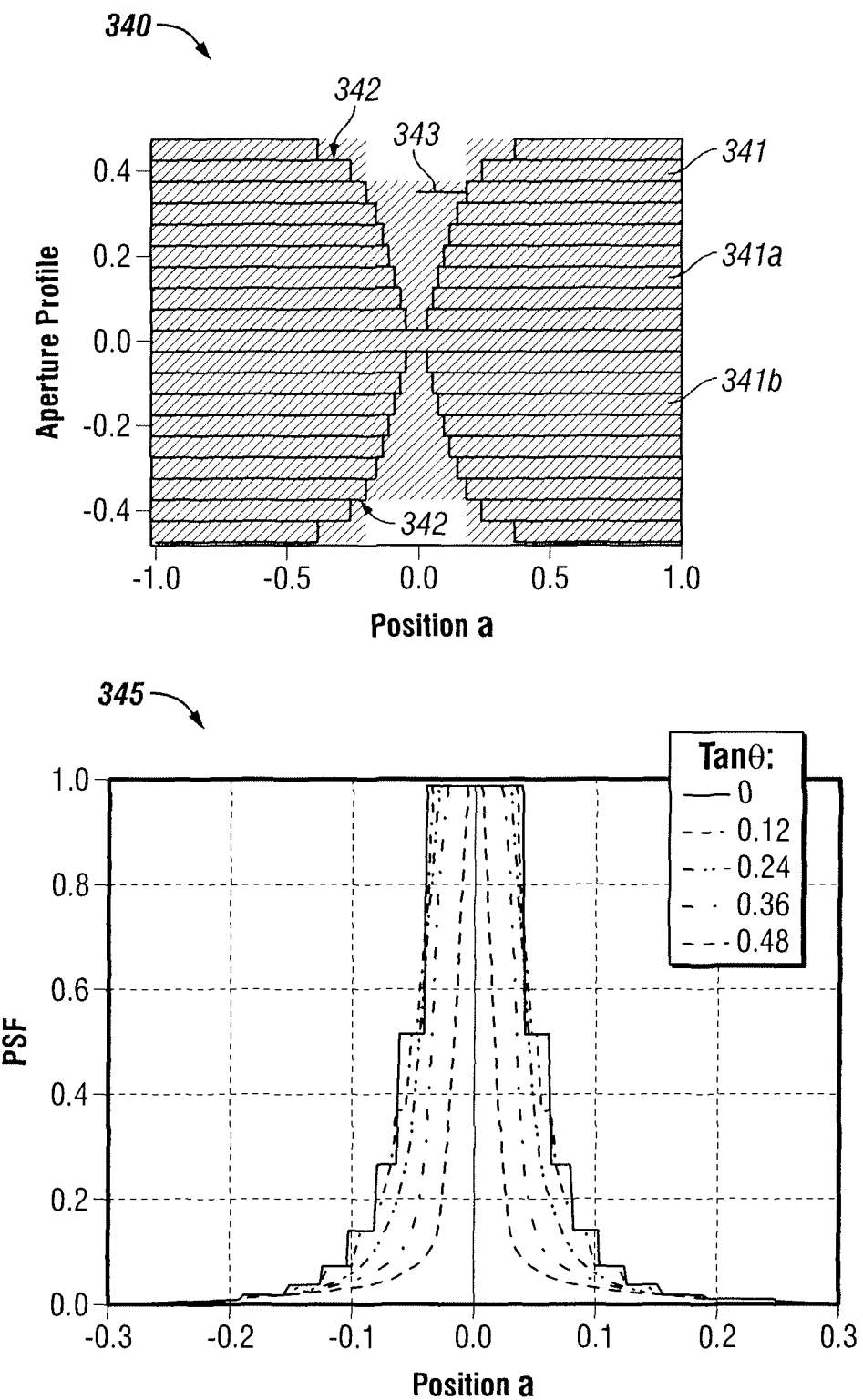

FIG. 32F illustrates a volume aperture manufactured using a layering process, according to an embodiment of the invention. In the illustrated embodiment, volume aperture 340 is built by layering material layers 341, wherein at least some of the layers have a hole with radii 343 configured such that the cross-sectional profile 342 of the aperture 340 approximate a smooth profile, such as those described with respect to FIGS. 32A-E. For example, the volume aperture 340 has a profile 342 that approximates the Lorenzian profile of the aperture described with respect to FIG. 32E. Graph 345 illustrates the point spread function of this aperture. In further embodiments, different layers may be composed of different materials. For example, layer 341a might be composed of a first alloy while layer 341b might be composed of a second alloy. The composition of the layers 341 and the volume profile 342 formed in these layered apertures 340 may be determined according to any desired feature. For example, they may be determined according to a pre-determined desired height, a predetermined x-ray energy range, or a predetermined incident angle.

In further embodiments, non-symmetric volume apertures may be employed. For example, an aperture may have a cross-sectional profile in the x direction that is different than that in the y direction. Such an aperture might comprise, for example, an elliptical volume aperture with decreasing area as a function of height. Such apertures may developed for a variety of applications, for example, if the target to be imaged is known to have spatial resolution that differs in different dimensions, or if it would be useful to have a wider field of view in one dimension as compared to the other.

Further embodiments utilize non-collimated imaging geometries. For example, one embodiment might employ a pinhole type x-ray source that produces a spherical beam geometry, while the same or another embodiment can employ a volume aperture detector geometry rather than a geometry using long pipes as illustrated in FIG. 25.

Figure 34:
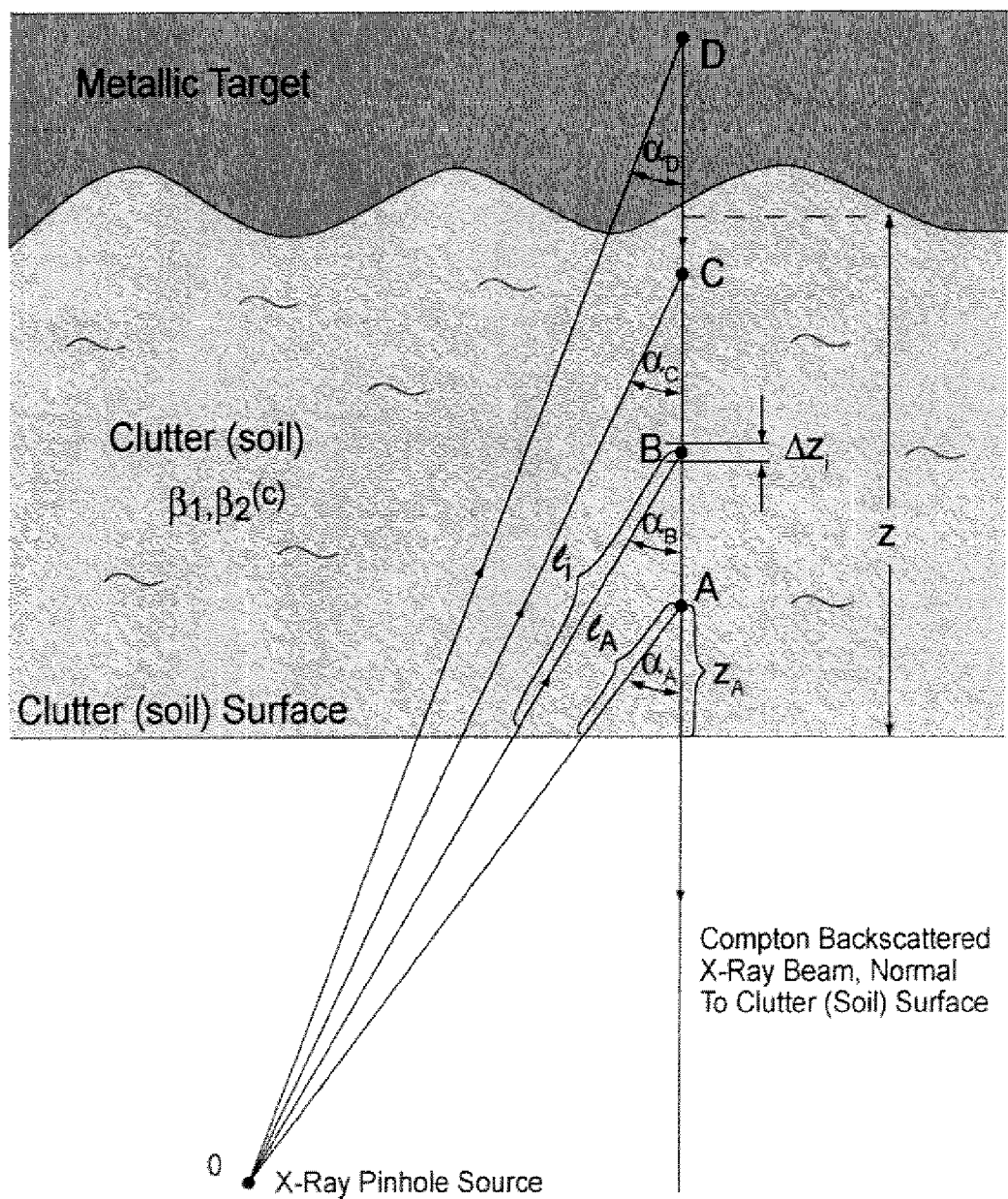
FIG. 34 illustrates Compton backscattering in an embodiment of the invention.

FIG. 34 illustrates a non-collimated x-ray source geometry, where the x-ray source is a pinhole and the emitted x-rays therefore have a spherical geometry. In such a case, the rays of the spherical beam have different Compton scattering angles, $\theta$, with different Compton backscattering directions. In particular, those angles can be significantly lower than $\pi$, or 180°; thus the Klein-Nishina normalized correction factor $S_N(X,Z)$ can be smaller than $(S_N)_{MIN}$=0.95; (see Table 6, for comparison). This occurs because, for $\theta<180°$, the X-value can be such that $S_N<0.95$. As illustrated in Table 6, this varies with the Z-number of the material. For example, for silicon with Z=14, for $\theta<\theta_{MIN}$=36°, $S_N<0.95$. However, for Iron with Z=26, $\theta_{MIN}$=60°, and for Platinum with Z=78, $\theta_{MIN}$=166°; i.e., close to 180°. Generally, for elements with low Z-number this correction effect is less significant than for elements with high Z-number (Gold, Lead, Platinum, Tungsten, etc.). FIG. 34 extends the example illustrated in FIG. 28. In this figure, a spherical x-ray beam with a pinhole source at 0 is transmitted into a clutter (an upside-down view), and Compton backscattered at points A, B, C, and D, into a Compton backscattered x-ray path, normal to clutter (soil) surface. The $\alpha$-angles are complementary to Compton backscattering angles, $\theta$, with respect to 360°;

$$\alpha=360°-\theta. \quad (134)$$

Discussion in terms of the angle $\alpha$ does not require modification of the previous equations, because all relevant equations are in terms of cosine. The points A, B, C are within a clutter, while point D is within the target. As illustrated, $\alpha_D<\alpha_C$ and a smaller $\alpha$ angle value helps to satisfy the Compton backscattering formulas, such as Eq. (40), for example, with $S_N$=1. In general, Eq. (94) may be replaced by the more general equation of the form:

$$R^{(c)} = \sum_{i=1}^{M} \Delta R_i^{(c)}, \text{ where } \ell_i = z_i/\cos\alpha_i, \quad (135)$$

and $$\Delta R_i^{(c)} = \text{CONST } \beta_1^{(c)} e^{-\beta_1 l_i} e^{-\beta'_1 z_i} S_N(X_i, Z) \Delta z_i, \quad (136)$$

where, $\Delta x_i$ is a backscattered path element, where some backscattering in the clutter (thus, $\beta=\beta_1$) is assumed, and where $l_i$ is forward path (see; FIG. 32). Here, the $X_i$-value is obtained for $\theta_i$-value (compare Eq. (115)). Using Eq. (136) the derivation through Eqs. (95), (96), (97), using the variable M-summation number, may be repeated. As a result, the numerical value of R(z), as in Eq. (97) may be obtained:

$$R=R(z). \quad (137)$$

Figure 26:
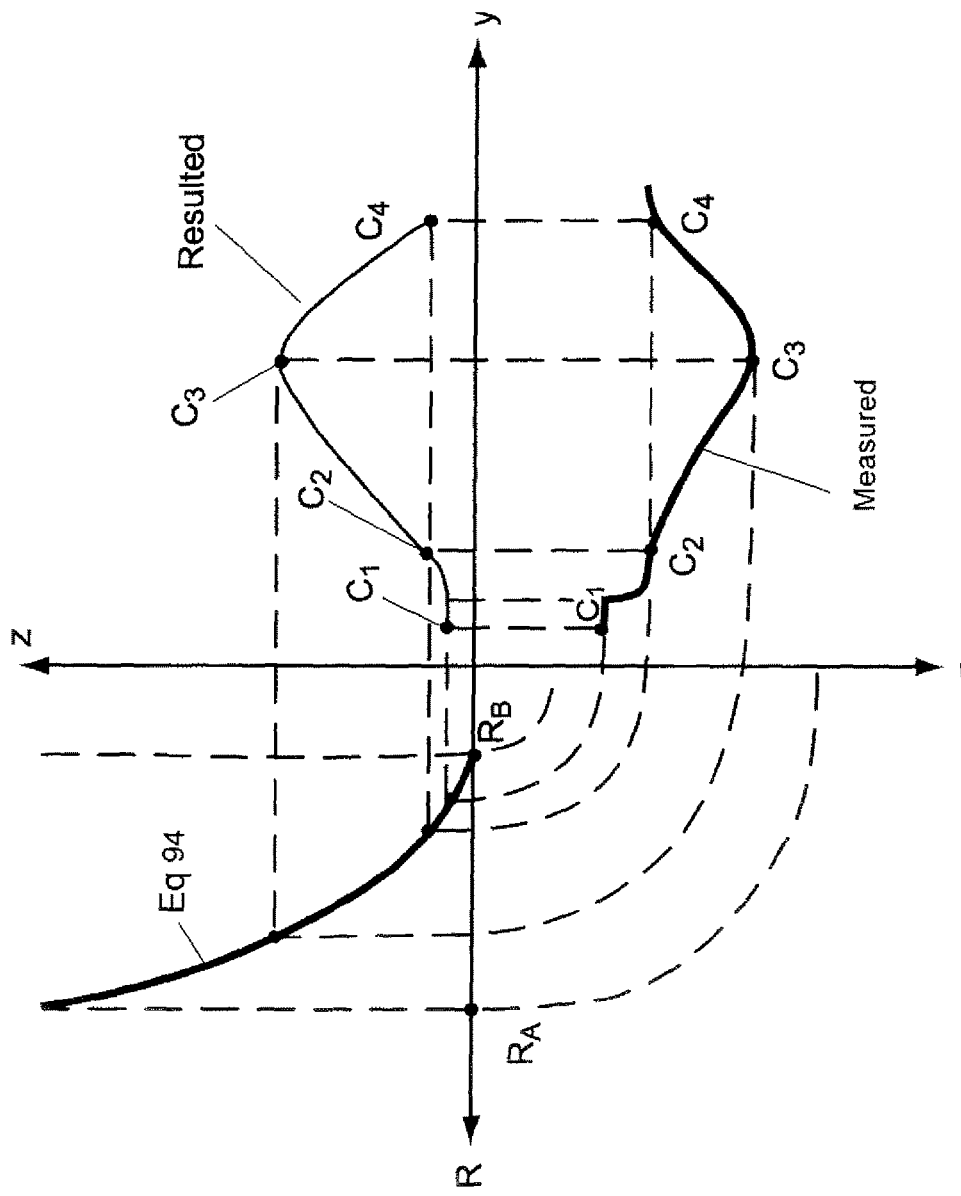
FIG. 26 illustrates an imaged depth profile according to an embodiment of the invention.

Accordingly, this new generalized relation can be placed graphically (or, numerically), instead of analytical R(z), as in FIG. 26, and, as a result, a three dimensional z(x,y)-profile, as in Eq. (101), may be obtained. This calculation is further generalized through the introduction of two material constants: $\beta_1$ and $\beta'_1$, instead of only one, as in Eq. (94). This occurs because of the introduction of the Compton scattering photon energy changes, from $E_{ph}$ to $E_{ph}'$, as discussed herein with regard to Eq. (94).

Figure 35:
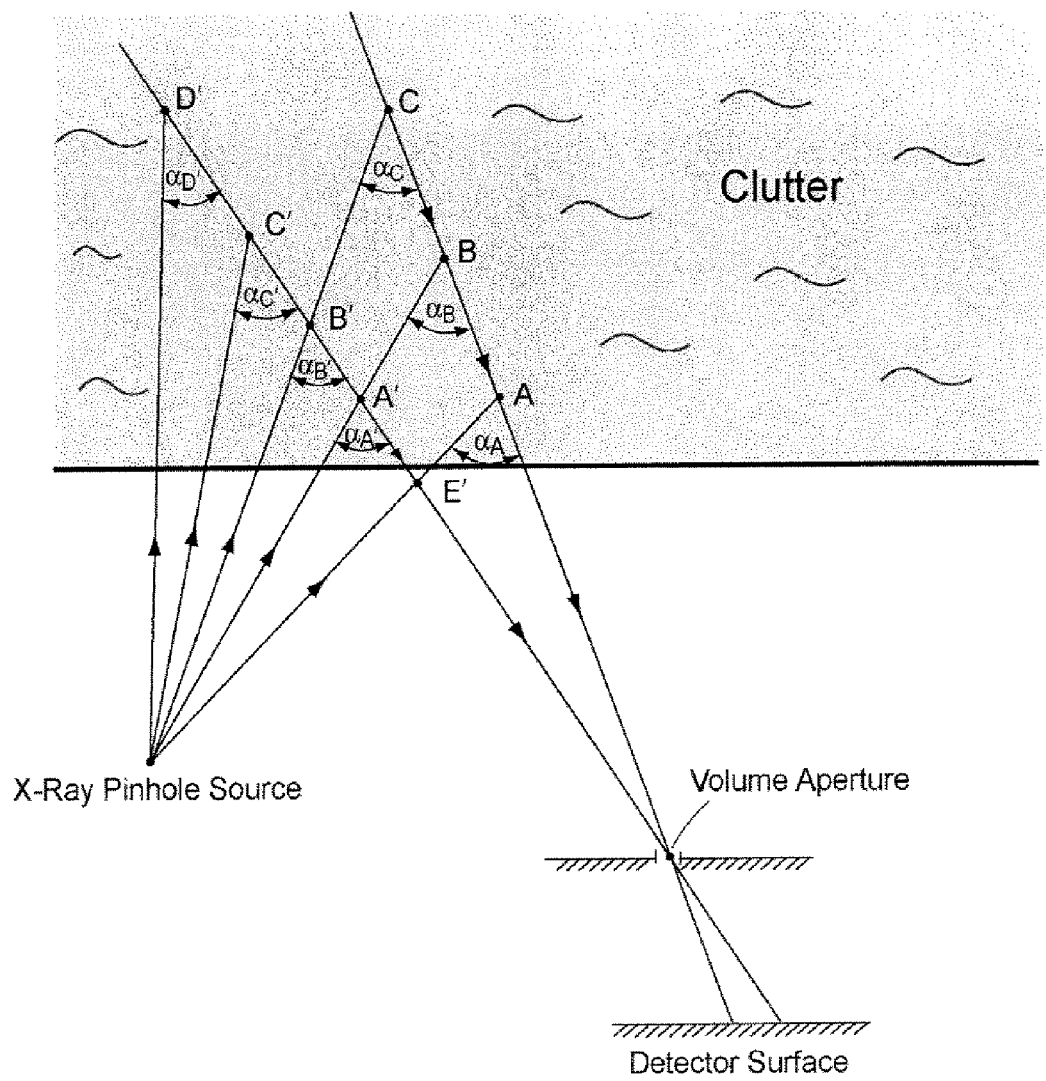
FIG. 35 illustrates a further example of Compton backscattering in an embodiment of the invention.

FIG. 35 illustrates a detector geometry utilizing a pinhole x-ray source and a volume aperture, as described herein. Accordingly, both the source and the detected x-rays have spherical wavefronts. In this illustration the 3D structure of the volume aperture is not shown, however such an aperture may comprise any aperture described herein or developed according to the methods described herein. FIG. 35 illustrates two Compton backscattered paths: ABC and A'B'C'D'E', with complementary Compton backscattering angles: $\alpha_A$, $\alpha_B$, $\alpha_C$, and $\alpha_{A'}$, $\alpha_{B'}$, $\alpha_{C'}$, and $\alpha_{D'}$, respectively. The angle $\alpha_{E'}$ is not illustrated because at point E' there is no significant Compton scattering (i.e., there is no clutter). By combining various volume aperture positions, multiple Compton backscattering beam directions may be obtained.

Figure 36:
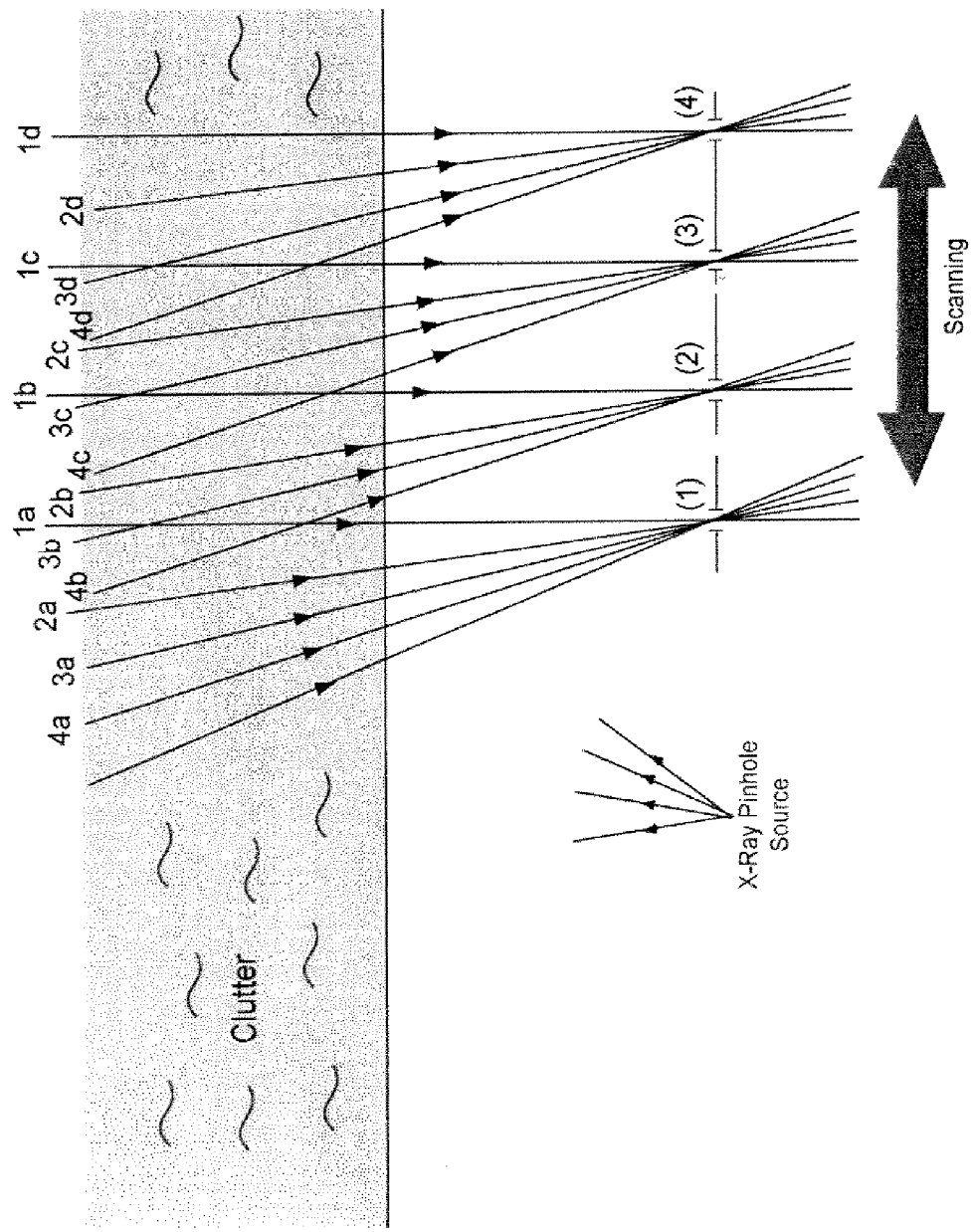
FIG. 36 illustrates an example of a Compton backscattering scanning system according to an embodiment of the invention.

FIG. 36 illustrates the scanning process according to an embodiment of the invention, where a volume aperture is used to sequentially scan a target, first at position (1), then at position (2), then position (3), and finally at position (4). By repeated application of Eq. (136) an algorithmic program may be used to obtain relation (137). Because many of the Compton backscattering paths will be redundant, a profile result, as in Eq. (101), may be obtained with higher precision than with a single exposure as in FIG. 24. For example, in the geometry illustrated in FIG. 36 many paths are parallel, including: 1a, 1b, 1c, 1d; 2a, 2b, 2c, 2d; etc. In various embodiments, this parallelity may be obtained by scanning, or by applying a multi-aperture detector structure, such as a periodic or an aperiodic aperture array, or a combination of scanning and multi-aperture structure. As illustrated in FIG. 36, the paths: 1a, 2a, 3a, 4a, realize the normal backscatter geometry as illustrated in FIG. 24. Additionally, the many paths have a slanted geometry, such as 1b, 2b, 3b, 4b, etc.

Figure 37:
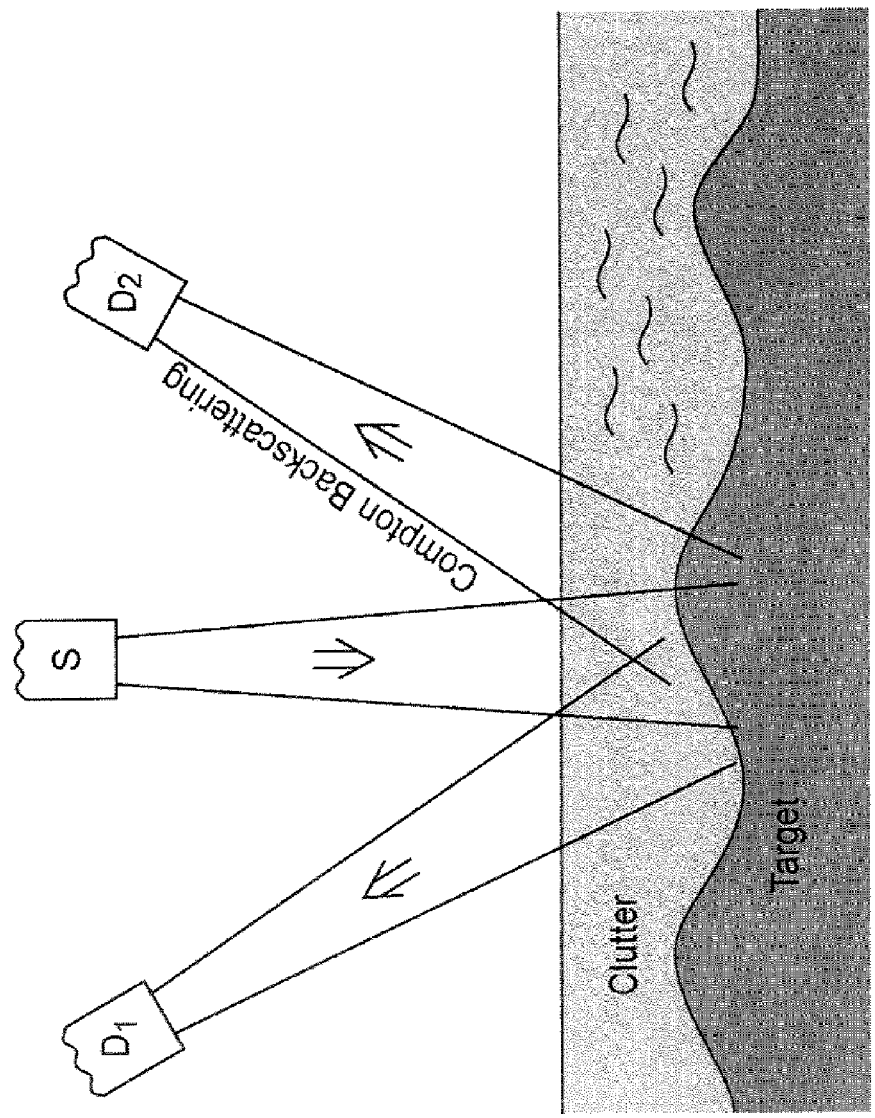
FIG. 37 illustrates a multi-detector system for imaging using Compton backscattering according to an embodiment of the invention.

FIG. 37 illustrates a source and detector geometry utilizing a quasi-collimated x-ray source, according to an embodiment of the invention. Various types of x-ray sources may be used in embodiments of the invention. For example, the geometries illustrated in FIGS. 34, 35, 36, might be implemented with x-ray sources based on the Bremsstrahlung effect, where spherical beam divergence can be close to Lambertian. x-ray cyclotron sources might also be used in various embodiments, in a cyclotron source the x-rays are close to a collimated beam geometry. The non-Lambertian nature of the x-ray beam allows a system to employ multiple x-ray detectors, for example, detectors, $D_1$ and $D_2$, disposed at different positions from a target. Accordingly, data processing techniques, such as those described herein, may be applied to the data received by the multiple detectors, thus allowing greater imaging accuracy and resolution.

In some embodiments, the influence of the clutter composition on the Compton backscattering formula, for example in Eq. (136), may be simplified by considering only the major oxides of which the soil is composed. For example, if a clutter were composed of soil generated from igneous rock, generally the major oxide composition of such soil is $S_iO_2$ (59.97%), $Al_2O_3$ (15.22%), $Fe_2O_3$ (3.1%), MgO (3.45%), FeO (3.71%), CaO (5.1%), $Na_2O$ (3.71%), $K_2O$ (3.11%), $P_2O_5$ (0.3%), MnO (0.11%), $TiO_3$ (1.03%), and $H_2O$ (1.3%). In these embodiments, speculation may be simplified by assuming that the soil consist only of these oxides. Then for each oxide, a (Z/M) value may be found, for example, from the NIST Tables, a corresponding $\beta$ value may be found. Then applying the assumed percentage compositions, weighted averages <Z/M> and <$\beta$> may be derived for the soil and applied in such formulae as Eq. (46). In further embodiments, a chemical analysis of the soil at a specific site to be imaged may be performed, to determine the actual soil composition. In all of these embodiments, a calibrated and scalable measurement of R(z)-value as in Eq. (137) may be used to obtain the 3D target profile as in Eq. (101). In some embodiments, rather than determining the molecular composition of soils or other clutter present in the environment to be imaged, a pure elemental analysis of the clutter may be conducted. For example, soil samples from various environments may be analyzed to determine the proportions for each element within the soil at that location, and these proportions may be used for calibration rather than proportions of actual molecules taking up the clutter.

In some embodiments, determination of the type of imaging, and imaging energies may vary depending on the system deployment. For example, in embodiments employing Compton profilometry, as described herein, the performance of this imaging method may be determined according to three parameters. The first parameter is the attenuation constant of the clutter, $\beta_1$. The second parameter is a detection sensitivity grammar, defined herein as $\epsilon$. The third parameter is a Compton Clutter Contrast (C3) coefficient, $r_A$ defined as:

$$r_A = \frac{R_A}{R_B}. \qquad (138)$$

where $R_A$ and $R_B$ are defined by Eqs. (98) and (99). With increasing photon energy, $E_{ph}$, the value of $\beta_1$ typically decreases, so the clutter penetration depth, determined by methods such as Eq. (106), increases. However, if the C3-coefficient, $r_A$, also decreases with increasing $E_{ph}$, then imaging performance may suffer.

In various embodiments, the imaging performance response to changes in these parameters may be determined. The embodiment of such a determination follows. Eq. (100) is rewritten here in the form:

$$R(z) = R_A - (R_A - R_B)e^{-2\beta_1 z}. \qquad (139)$$

Dividing this equation by $R_B$, and using the definition:

$$r = \frac{R}{R_B} \qquad (140)$$

The following is obtained:

$$r = r_A - (r_A - 1)e^{-2\beta_1 z}; 1 \leq r \leq r_A \qquad (141)$$

where Eq. (138) has been used. Eq. (141) can be rewritten in the form:

$$z = \frac{1}{2\beta_1} \ln\left(\frac{r_A - 1}{r_A - r}\right) \qquad (142)$$

where ln is the natural logarithmic.

The detection sensitivity coefficient, $\epsilon$, may be defined as the $r_o$ value that may be differentiated from the $r_A$ value by the imaging system, if, $$r_o = r_A - \epsilon. \qquad (143)$$

Substituting this value to Eq. (142), the following equation for the characteristic penetration depth value $z_o$ may be obtained $$z_0 = \frac{1}{2\beta_1} \ln\left(\frac{r_A - 1}{r_A - r}\right)\left(\frac{r_A - 1}{\epsilon}\right) \qquad (144)$$

which defines the maximum usable penetration depth according to an embodiment of the invention.

As illustrated by Eq. (144), the $z_o$ value increases with decreasing $\epsilon$. However, the decreasing $\beta_1$ value with increasing $E_{ph}$ can be compensated with proportional $r_A$ value reduction. This effect may be demonstrated by Eq. (116), which defines the differential reflectivity. This quantity has a material dependent $\chi$ factor, defined by Eq. (114) and a material independent factor, which was calculated as $0.025$ cm$^2$ for $E_{ph}=100$ keV, as in Eq. (117). Therefore, the ratio of $R_A/R_B$, as in Eq. (138) (or, rather, ratio of differential reflectivities for $\theta=180°=\pi$ (see; Eq. (117), for example)) is equal to ratio of the $\chi$ factors for different materials at the same photon energy. For example, the $\chi$ factors for silicon for $R_A$, and lead for $R_B$ have been summarized for various $E_{ph}$, in Tables 7 and 8. In Table 7, the $\chi$-factor is presented as a function of $E_{ph}$ for silicon, including $\mu$-mass attenuation coefficient, and $\beta$-linear attenuation coefficient, which is the $\beta_1$ parameter. In Table 8, this data has been presented for lead.

TABLE 7

$\chi$-Factor as a Function of $E_{ph}$ for Silicon: (Z/M) = 0.498 g$^{-1}$, $\rho$ = 2.3 g cm$^{-2}$

| $E_{ph}$ | 100 keV | 200 keV | 300 keV | 500 keV | 800 keV | 1 MeV | 2 MeV | 5 MeV |
|---|---|---|---|---|---|---|---|---|
| $\mu$[cm$^2$/g] | 0.183 | 0.127 | 0.108 | 0.087 | 0.071 | 0.064 | 0.045 | 0.03 |
| $\chi$[cm$^{-2}$] | 1.361 | 1.961 | 2.31 | 2.86 | 3.51 | 3.89 | 5.53 | 8.3 |
| $\beta$[cm$^{-1}$] | 0.421 | 0.29 | 0.25 | 0.2 | 0.163 | 0.147 | 0.103 | 0.069 |

TABLE 8

Table 7. $\chi$-Factor as a Function of $E_{ph}$ for Lead: (Z/M) = 0.396 g$^{-1}$

| $E_{ph}$ | 100 keV | 200 keV | 300 keV | 500 keV | 800 keV | 1 MeV | 2 MeV | 5 MeV |
|---|---|---|---|---|---|---|---|---|
| $\mu$[cm$^2$/g] | 5.55 | 0.918 | 0.403 | 0.161 | 0.089 | 0.071 | 0.046 | 0.043 |
| $\chi$[cm$^{-2}$] | 0.036 | 0.198 | 0.49 | 1.23 | 2.225 | 2.79 | 4.3 | 4.6 |

According to Eq. (114), $$r_A = \frac{(\chi)\ \text{Silicon}}{(\chi)\ \text{Lead}}. \qquad (145)$$

In Table 9 this value has been tabulated as well as $z_o$-value, for $\epsilon=0.1$ (in Eq. (144), $\beta_1$-value is for silicon).

TABLE 9

$r_A$-Value and $z_o$-Value as a Function of $E_{ph}$-Photon Energy, for Silicon and Lead, as in Eq. (131), and Eq. (130) for $\epsilon = 0.1$

| $E_{ph}$ | 100 keV | 200 keV | 300 keV | 500 keV | 800 keV | 1 MeV | 2 MeV | 5 MeV |
|---|---|---|---|---|---|---|---|---|
| $r_A$ | 37.81 | 9.9 | 4.71 | 2.32 | 1.578 | 1.395 | 1.286 | 1.804 |
| $z_o$[cm] | 7.02 | 7.74 | 7.22 | 6.54 | 5.38 | 4.67 | 5.1 | 16.28 |

As illustrated in Table 9, the $z_o$ value increases up to 300 keV, then decreases up to 2 MeV, and then again strongly increases up to 5 MeV. This result depends on definition (144) but it generalizes to further embodiments. Accordingly, in some embodiments the optimum photon energy range for maximizing the characteristic penetration depth value, may be determined by analyzing material constants such as $\beta_1$ for clutter, and $\chi$ values for clutter and target materials.

In various embodiments and deployments, the Compton Clutter Contrast (C3) may be positive or negative. In situations where $R_A > R_B$, the C3 is less than one; in situations where $R_A < R_B$, the C3 is greater than one. In many of the embodiments described herein, the C3 has been less than one, (for $R_A$-soil and $R_B$-metal). However, in the case of the $R_A$ of air, $R_A < R_B$ and the C3 is greater than one. For example, the situation can occur in inspection of optical fiber cables, with plastic/glass fibers and air between them. This more infrequent case is described by the relation:

$$R_A < R_B \quad (146)$$

Where the typical highest C3 that will be encountered is for $R_A \cong 0$ (air).

Figure 38:
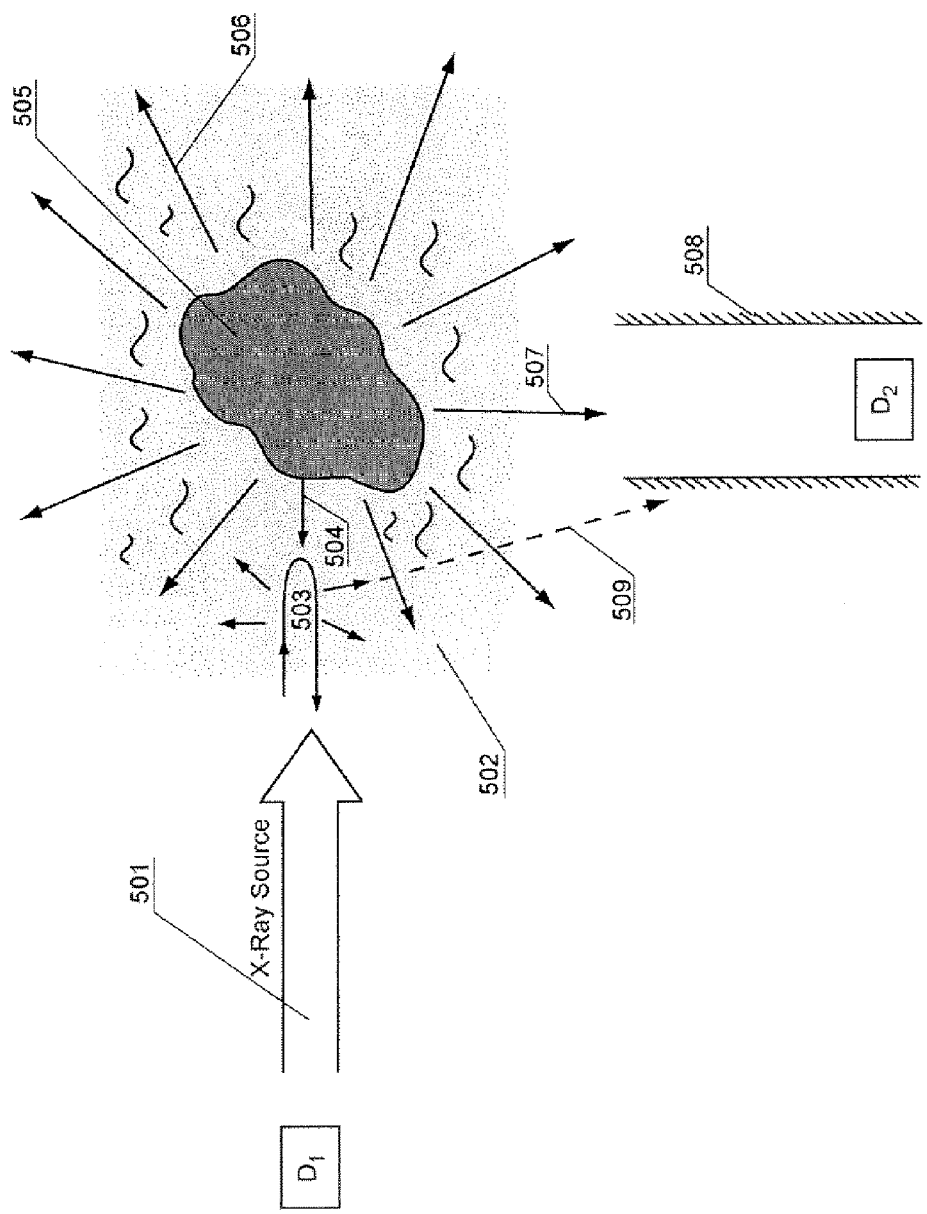
FIG. 38 illustrates a method of imaging using Compton side scattering according to an embodiment of the invention.

In some environments, a noise beam that is created by Compton backscattering off of clutter particles directly in the path of the x-ray beam may degrade system performance by increasing the amount of system noise. For example, in a situation as shown in FIG. 24, the Compton backscattering from the clutter may create a noise beam that is more intense than the signal beam (i.e., its intensity is higher than that of the signal beam) from a target. This situation can produce an effect that reduces the signal to noise ratio and make target reconstruction more difficult. In some embodiments, Compton side-scattering may be used to separate the backscatter noise beam from the signal beam. In contrast, the Compton side-scattering, or perpendicular scattering, called here Compton Transversal Scattering (CTS) allows for the separation of the Compton noise beam from Compton signal beam; thus, making target reconstruction much easier, as shown in FIG. 38. In this embodiment, the narrow x-ray incident beam 501 passes the clutter 502 which creates the Compton scattering from the clutter in all directions 503, including a beam of Compton backscattered x-rays into detector D1. In some environments, this noise beam 503 may have a stronger intensity than signal beam 504 Compton-backscattered from the target 505. Of course, the incident beam is Compton-scattered in all directions, 506, including direction of beam 507 into detector D2. In some embodiments, the detector D2 is placed inside an opaque pipe or tube 508. In these embodiments, the detector pipe 508 provides detection directionality, so the noise beam 509 will be trapped by the walls 508. Therefore, the signal-to-noise ratio of the signal beam 507 is much higher than if backscattered beam 504 were used as a signal beam. In some embodiments, the detector may comprise a detector subsystem, for example as described with respect to FIG. 17. In other embodiments, the detector system may include an imaging readout, which can be an Gaussian aperture, such as described with respect to FIG. 7, an arbitrary aperture, such as described with respect to FIG. 2, or any other aperture described herein. In these embodiments, the collimating walls 508 can be removed, since a pinhole, or Gaussian aperture, together with detector area, will have a similar effect in eliminating noise rays 509 due to the limited size of the detector area.

Figure 39:
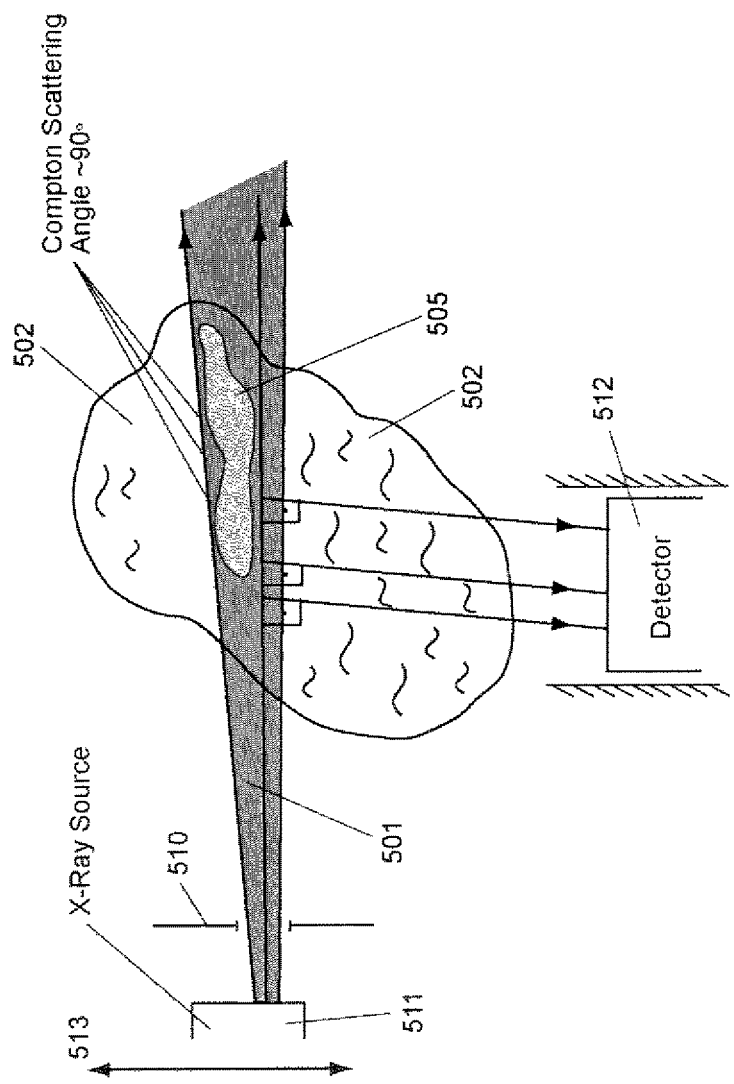
FIG. 39 illustrates a method of tomography using Compton side scattering according to an embodiment of the invention.

FIG. 39 illustrates the geometry of an embodiment that may be used in scanning x-ray tomography. In this embodiment, the x-ray source includes an opening 510 that produces the narrow beam 501 from the x-ray source 511. In this embodiment, beam 501 can more precisely hit the target 505 through clutter 502. A detector 512 may be placed to detect x-ray beams scattered at a Compton scattering angle of about 90°. If the x-ray source elements 510 and 511 move vertically, a narrow scanning beam 513 that moves vertically with the source allows the system to scan the clutter volume 502. In this embodiment, 3D-visualization may take place without the use of imaging algorithms. This is because the beam 501 hits only narrow volume within the clutter and if an object exists within this volume, the object's intersection with the volume will be visualized. If an object does not exist within the volume, then the detector will read only the background clutter image. In the illustrated embodiment, the detector 572 may also include the aperture detection systems as discussed with respect to FIGS. 2 and 7, and Eq. (68).

Figure 40:
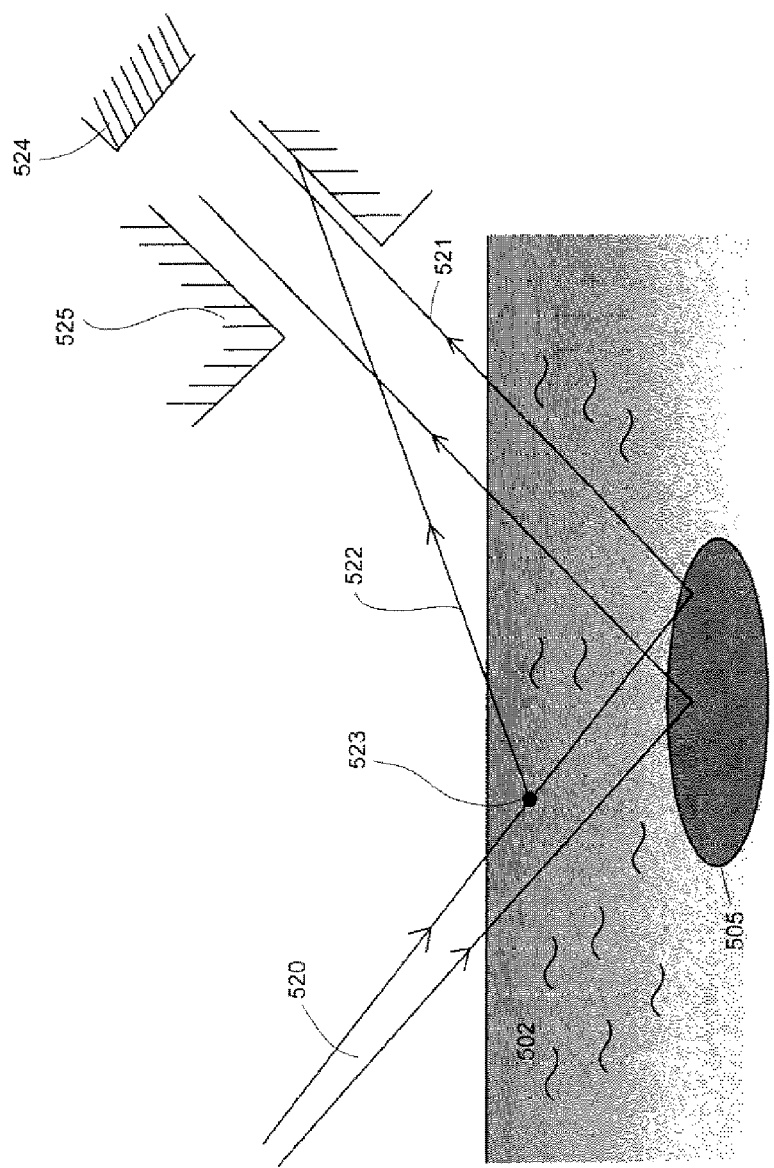
FIG. 40 illustrates a method of using Compton side scattering for imaging according to an embodiment of the invention.

FIG. 40 illustrates the geometry of an embodiment where an object is imaged from one side only. In this embodiment, slanted incident angle 520 and slanted Compton scattering angle 521 are provided. Here, a collimating medium, pinhole, Gaussian aperture or array, or pipe array 525 prevents noise beams 522 from impinging on director 524. Accordingly, in this embodiment the signal-to-noise ratio may also be improved. Furthermore, the detector may be configured to receive x-rays only transmitted with scattering angle 521. Accordingly, for a fixed x-ray source, the detector will only image a fixed portion of the object to be imaged. In some applications, this allows sequential imaging of a plurality of cross sections by adjusting the x-ray source or the detector to image different cross sections. For example, if a detector and source geometry is configured such that only 90° scattered x-rays are received, then an object may be imaged by translating the detector and source together first in planar area to image a cross section at a first depth, then translating the detector and source together towards the target followed by planar scanning to image a second cross section, and so on. FIG. 41 illustrates other such geometries according to various embodiments of the invention including (a) an off-plane geometry (when two access directions are needed); (b) the symmetrical slanted geometry of FIG. 40; and (c) a non-symmetrically slanted geometry.

Figure 42:
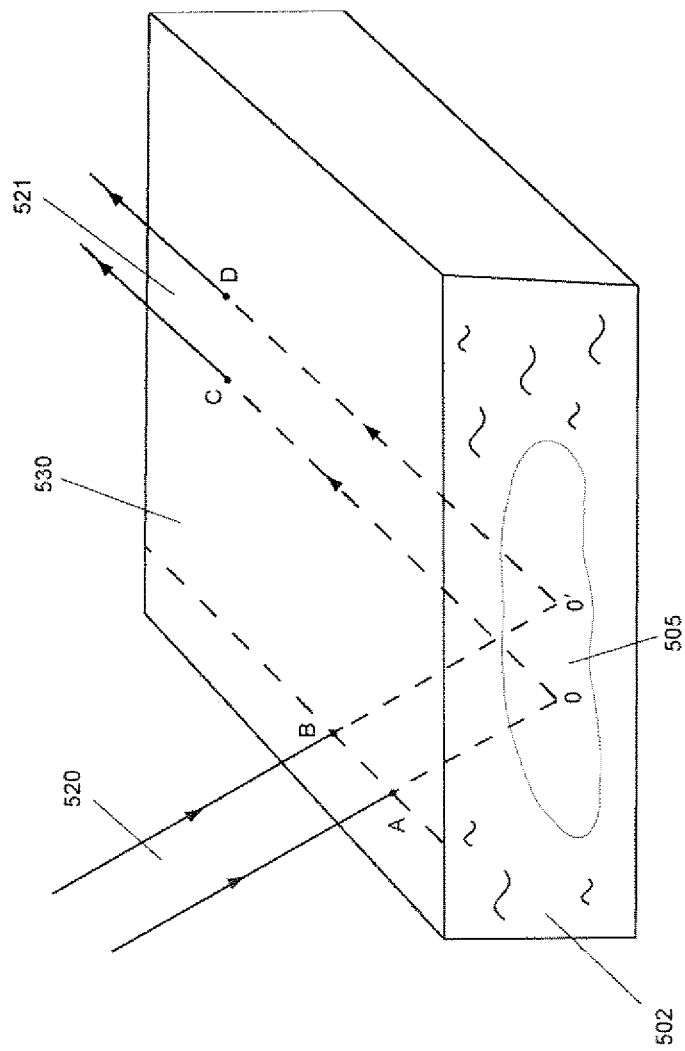
FIG. 42 illustrates a method of imaging using Compton side scattering according to an embodiment of the invention.

FIG. 42 illustrates a geometry for Compton tomography using Compton side scattering according to an embodiment of the invention. In this embodiment, an object 505 is burred in clutter behind a front clutter plane 530. This embodiment illustrates that the plane of incidence, as defined by points: A, O, C for example, is not perpendicular to the front plane 530. In some embodiments, this slanted 3D geometry can be used to realize the a Compton transverse scattering type-effect with only one access direction; i.e., without the side-angle access, as in FIG. 39.

Figure 43:
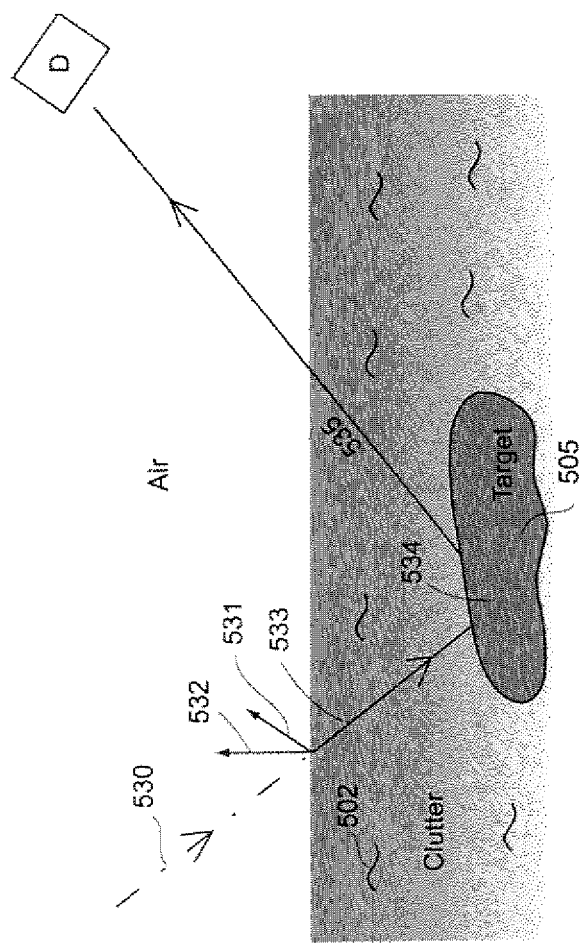
FIG. 43 illustrates a method of using particle beams to create x-rays for use in imaging according to embodiments of the invention.

In some embodiments, particle beam sources such as electron beams, or β-particles; neutron beams; proton beams; ion beams; etc. may be used for x-ray volume imaging, profilometry, or tomography. In these embodiments, the particle beams may interact with the clutter surrounding the object to create x-rays that can have kinetic energy of the order of few MeV. For example, an electron beam, or β-particle beam with high electron kinetic energies (e.g., 10 MeV) may produce forward-scattered x-rays with energies of a few MeV under the bremsstrahlung effect at the air-clutter interface. In these embodiments, high-energy x-ray beams with energies of 1 to 5 MeV, or even higher, may be produced without specialized high-energy x-ray sources. These high-energy beams may have advantages such as increased penetration depth through the clutter and into the object. This penetration into the target may assist in volume imaging, as described herein. Various embodiments may utilize various geometries for particle beam source and detector. For example, the incident beam geometry may be similar to the geometries illustrated FIG. 24, 28, or 36-41. FIG. 43 illustrates one such geometry. In the illustrated embodiment, the incident particle beam 530 is scattered at air-clutter interface 531, producing, statistically, backscattered γ-photons 532 and forward scattered γ-photons 533. These forward scattered γ-photons 533 may be used for object imaging, as described herein. In some applications, the production of backscattered γ-photons at the interface may result in a high intensity noise source at that location. Accordingly, off-axis detector locations may be used to image objects without the noise from the interface interfering with the imaging process.

In these embodiments, for calculation purposes, Eqs. (139) and (141) remain valid, for forward scattered γ-photons 533 and other high energy photons created through particle beam interaction. As described herein, the approximate exponential term $\exp(-2\beta_1 z)$ in Eq. (139) may be replaced by a more precise factor:

$$\exp(-2\beta_1 z) \Rightarrow \exp[-(\beta_1+\beta_1')z] \tag{147}$$

where $\beta_1$ is for $E_{ph}$-photon energy of incident γ-ray beam (such as beam 533) and $\beta_1'$ is for $E_{ph}'$-photon energy of Compton-scattered beam 535 (for example, the beam scattered from point 534) where $E_{ph}' < E_{ph}$, due to the Compton effect.

With the use of appropriately modified the materials constants, all methods and processes described herein may be employed with such particle beams. For example, the $\beta_1$ value, representing the attenuation constant in $cm^{-1}$ through clutter (e.g., soil) may be determined as follows: forward propagation is calculated for a penetrating electron beam while backward propagation is calculated for a produced $E_{ph}$-photon energy, produced from the bremsstrahlung backscattering effect. Also, instead of the $\chi$ coefficient, the equivalent backscattering coefficient for $\theta = 180°$ under the bremsstrahlung backscattering effect may be applied.

In other embodiments, other beam sources that produce x-rays upon interaction with a particular medium or material may be used as an imaging energy source. For example, other types of ionizing radiation, such as neutron breams or alpha particle beams may be used to produce x-rays at an air/clutter interface. As discussed herein, these produced x-rays may then be used for imaging purposes.

In further embodiments, the methods described herein may be implemented with an energy source that provides any type of propagating wave that has an index of refraction close enough to one to prevent meaningful refractive wave manipulation and is attenuated relatively rapidly. For example, such methods may directed to imaging using acoustics or other vibrations at certain frequencies that are rapidly attenuated in the propagation medium.

Figure 44:
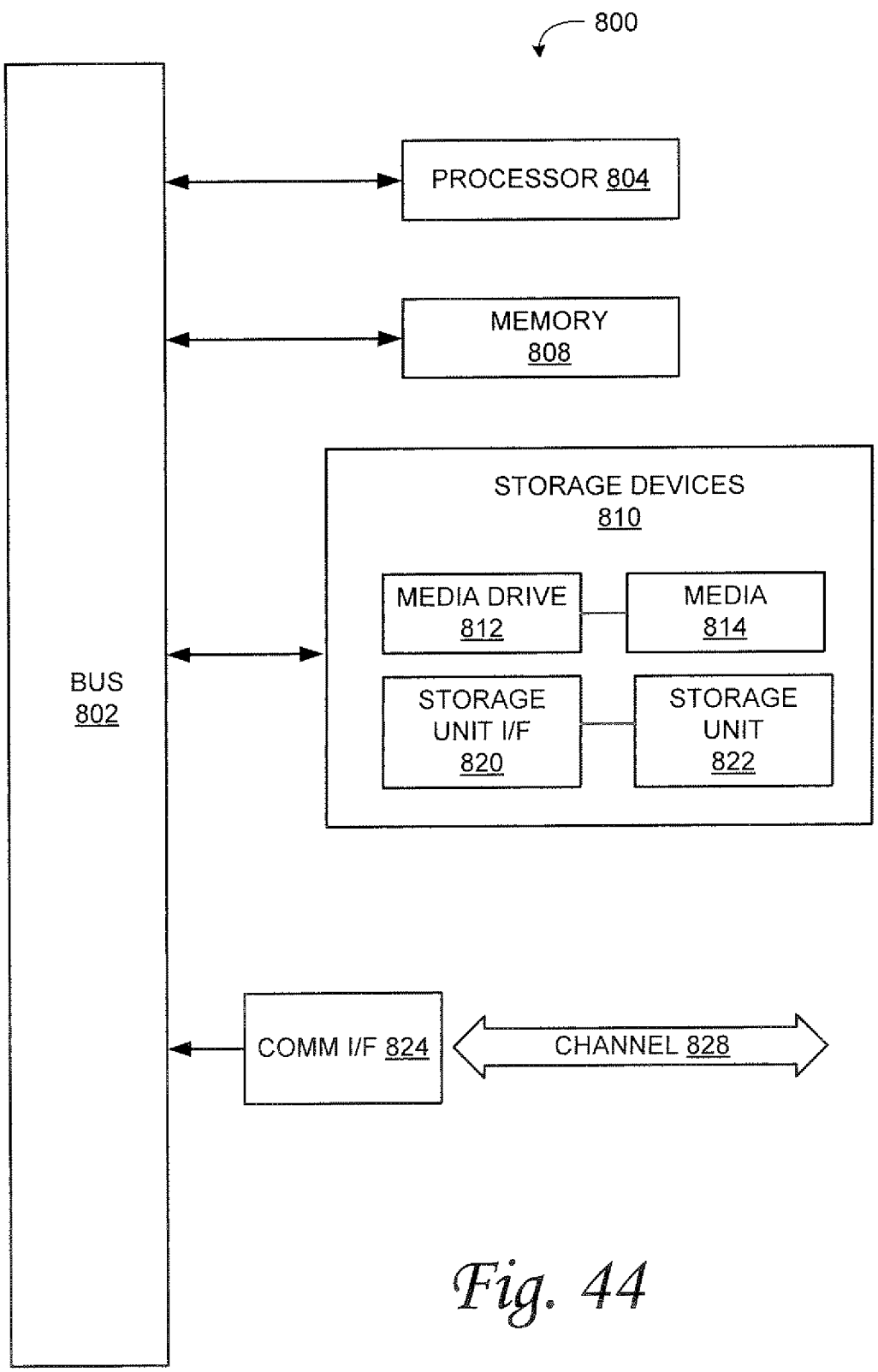
FIG. 44 illustrates an example computing module that may be used to implement various features of some embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 44. Various embodiments are described in terms of this example-computing module 800. After reading this description, it will become apparent to a person skilled in the relevant art how to implement the invention using other computing modules or architectures.

Referring now to FIG. 44, computing module 800 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port. RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, not real, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An apparatus for x-ray imaging, comprising:
a structure for x-ray imaging including an aperture defining a volume extending from a first surface of the structure to a second surface of the structure and having a shape that varies with depth;
wherein the volume is configured to provide an image transfer function; and
wherein the image transfer function lacks a zero in a predetermined spatial frequency range.

2. The apparatus of claim 1, wherein the shape of the aperture provides an image having a Gaussian form.

3. The apparatus of claim 2, wherein the profile of the aperture has a parabolic cross-section.

4. The apparatus of claim 1, wherein the volume profile has a cross-section comprising an asymmetric parabolic profile, a symmetric Gaussian profile, an asymmetric Gaussian profile, an asymmetric Lorentzian profile, or a symmetric Lorentzian profile.

5. The apparatus of claim 1, wherein the aperture has a point spread function that locally satisfies a spatial invariance condition.

6. The apparatus of claim 1, wherein an outer circumference of the aperture is composed of a material that is substantially opaque to x-rays within a predetermined range of energy.

7. The apparatus of claim 6, wherein the predetermined range of energy is selected according to backscattering properties of a predetermined variety of materials.

8. The apparatus of claim 1, wherein the usable spatial frequency range is further configured such that resolution of the apparatus is maximized according to a diameter of the aperture.

9. The apparatus of claim 1, wherein the shape is configured according to a predetermined peak transmission value at a predetermined incident angle and a predetermined full width at half maximum value at the predetermined incident angle.

10. The apparatus of claim 9, wherein the aperture is further configured according to a predetermined range of peak transmission values and a predetermined range of full width at half maximum values at a predetermined range of incident angles.

11. The apparatus of claim 1, further comprising:
an x-ray emitter to emit x-rays;
and a sensor disposed a predetermined distance from the aperture;
wherein the apparatus is configured such that x-rays emitted from the x-ray emitter and scattered off of an object pass through the aperture and form an image on the sensor.

12. The apparatus of claim 11, wherein the x-ray emitter is configured to emit an x-ray beam having a spherical wavefront.

13. The apparatus of claim 11, wherein the x-ray emitter is configured to emit an x-ray beam having a substantially collimated wavefront.

14. The apparatus of claim 13, further comprising a second aperture and a second sensor disposed at a second distance from the first aperture and sensor.

15. The apparatus of claim 11, wherein the apparatus is configured to gate the sensor at a predetermined time interval to enable three-dimensional imaging of an object.

16. The apparatus of claim 15, wherein the x-ray emitter is configured to emit an x-ray pulse at a second predetermined time interval.

17. The apparatus of claim 16, further comprising an image processor and wherein the apparatus is further configured to receive a reflected x-ray pulse and the image processor is configured to compensate for a delayed x-ray scattering time interval.

18. The apparatus of claim 1, further comprising a particle emitter configured to emit a particle beam configured to create x-rays at an interface between a volume to be imaged and a transmission medium.

* * * * *